US006452809B1

(12) United States Patent
Jackson et al.

(10) Patent No.: US 6,452,809 B1
(45) Date of Patent: Sep. 17, 2002

(54) SCALABLE INTERNET ENGINE

(75) Inventors: Russell A. Jackson, Calabasas; Steve S. Chen, San Jose; Philip S. Smith, Monterey, all of CA (US)

(73) Assignee: Galactic Computing Corporation (HK)

( * ) Notice: Subject to any disclaimer, the term of this patent is extended or adjusted under 35 U.S.C. 154(b) by 0 days.

(21) Appl. No.: 09/709,820

(22) Filed: Nov. 10, 2000

(51) Int. Cl.[7] .............................. H05K 7/00; H05K 7/14
(52) U.S. Cl. .................. 361/796; 361/724; 361/730; 361/752; 361/753; 361/797; 439/61
(58) Field of Search ................................. 361/728, 729, 361/724–727, 752, 753, 756, 759, 796, 797, 801, 683, 730; 439/61, 62; 312/223.2, 223.3; 211/41.17

(56) References Cited

U.S. PATENT DOCUMENTS

| 5,251,097 A | 10/1993 | Simmons et al. |
| 5,460,441 A | 10/1995 | Hastings et al. |
| 5,488,541 A | 1/1996 | Mistry et al. |
| 5,877,938 A | 3/1999 | Hobbs et al. |
| 5,912,802 A | 6/1999 | Roy et al. |
| 6,025,989 A | 2/2000 | Ayd et al. |
| 6,035,356 A | 3/2000 | Khan et al. |
| 6,094,351 A | 7/2000 | Kikinis |

FOREIGN PATENT DOCUMENTS

WO    WO/02/08891    1/2002

OTHER PUBLICATIONS

Web site print–out: table of contents and chapter abstracts for—*ISP Survival Guide: Strategies for Running a Competitive ISP*, Geoff Huston, Wiley Computer Publishing, 16 pgs.; Oct. 1998.

Web site print–out: *Cobalt RaQ*, Cobalt Network Systems, 2 pgs.; Copyrignt 2001.
Web site print–out: *HP's Answer for Portal Performance—A–class Servers*, Hewlett–Packard Company, 2 pgs.; Copyright 2000.
White paper: *IBM Netfinity X–architecture*, IBM Corporation; 22 pgs.; Copyright 1998.
Brochure: ChatCom's ChatterBox Products, ChatCom, Inc.; 2 pgs.; not dated.

*Primary Examiner*—Jayprakash N. Gandhi
(74) *Attorney, Agent, or Firm*—Patterson, Thuente, Skaar & Christensen, P.A.

(57) ABSTRACT

A scalable Internet engine is comprised of a large number of commercially available server boards each arranged as an engine blade in a power and space efficient cabinet. The engine blades are removably positioned in a front side of the cabinet in a vertical orientation. A through plane in the middle of a chassis assembly within the cabinet provides common power and control peripheral signals to all engine blades. I/O signals for each engine blade are routed through apertures in the through plane to interface cards positioned in the rear of the cabinet. The scalable engine can accommodate different types of server boards in the same chassis assembly because of a common blade carrier structure. Different types of commercially available motherboards are mounted in the common blade carrier structure that provides a uniform mechanical interface to the chassis assembly. A specially designed PCI host board that can plug into various types of motherboards has a first connector for connecting to the through plane and second connector for connecting to the interface cards. Redundant hot-swappable high-efficiency power supplies are connected to the common power signals on the through plane. The host board includes circuitry that distributes the power signals to the server board for that engine blade by emulating the ATX power management protocol. Replaceable fan trays are mounted below the engine blades to cool the engine. Preferably, the cabinet accommodates multiple rows of engine blades each in a sub-chassis that are stacked on top of each other, as well as rack mounted networks switches and disk drives.

15 Claims, 58 Drawing Sheets

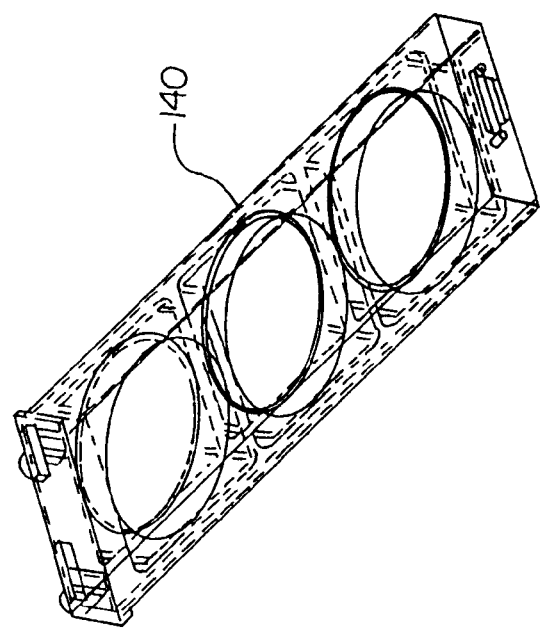
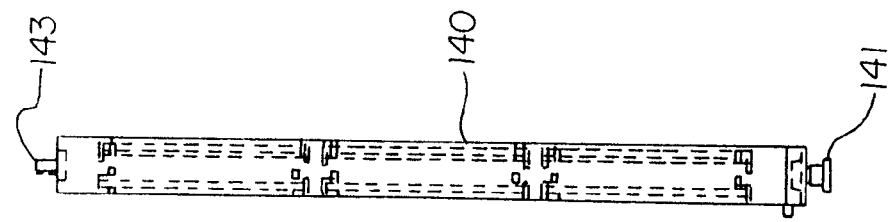
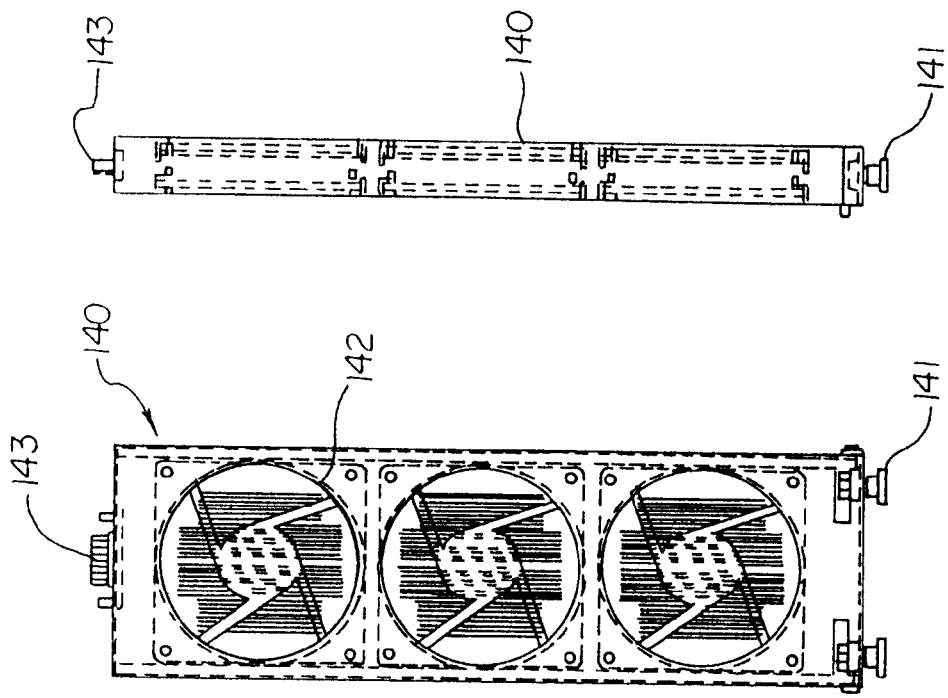

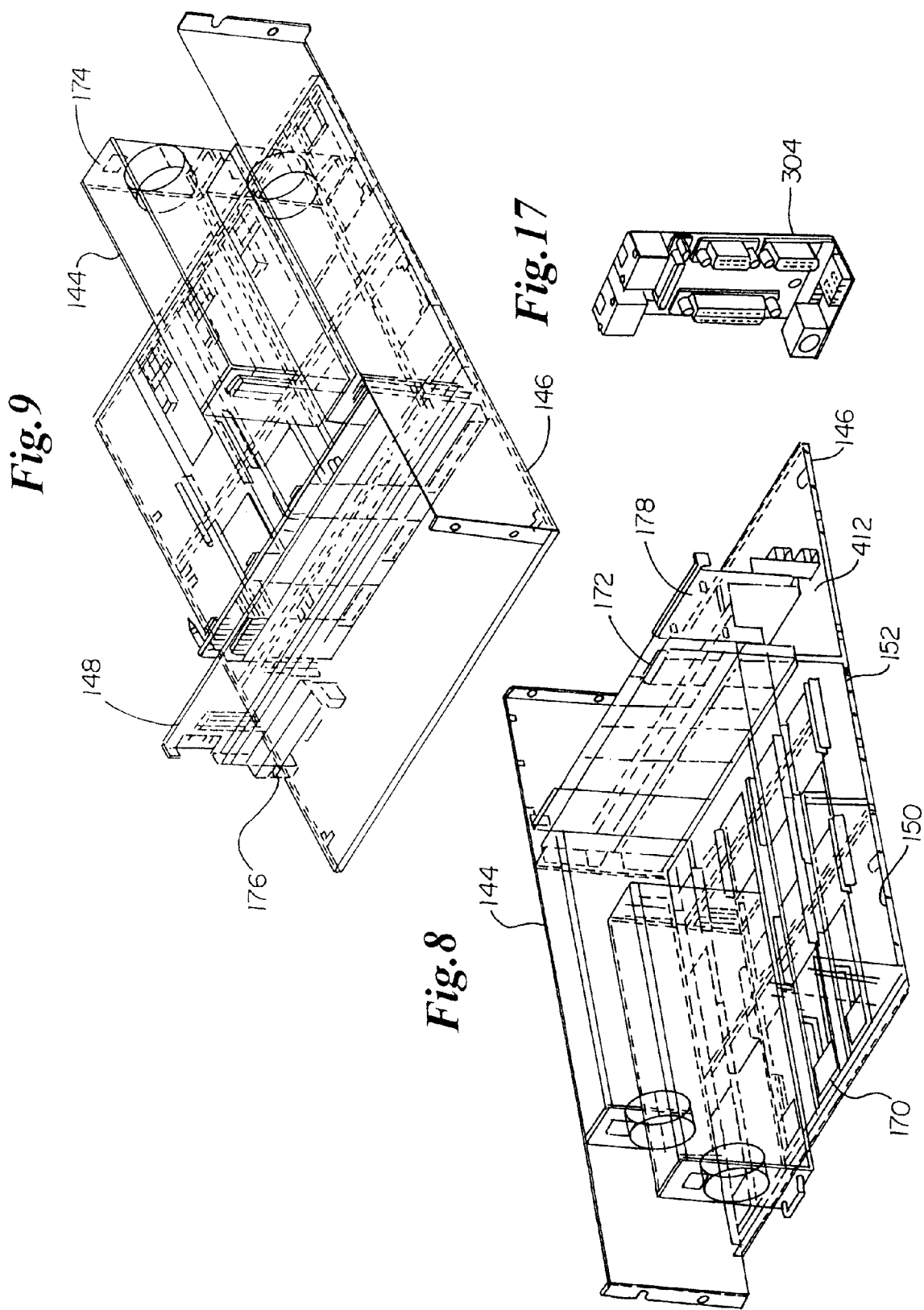

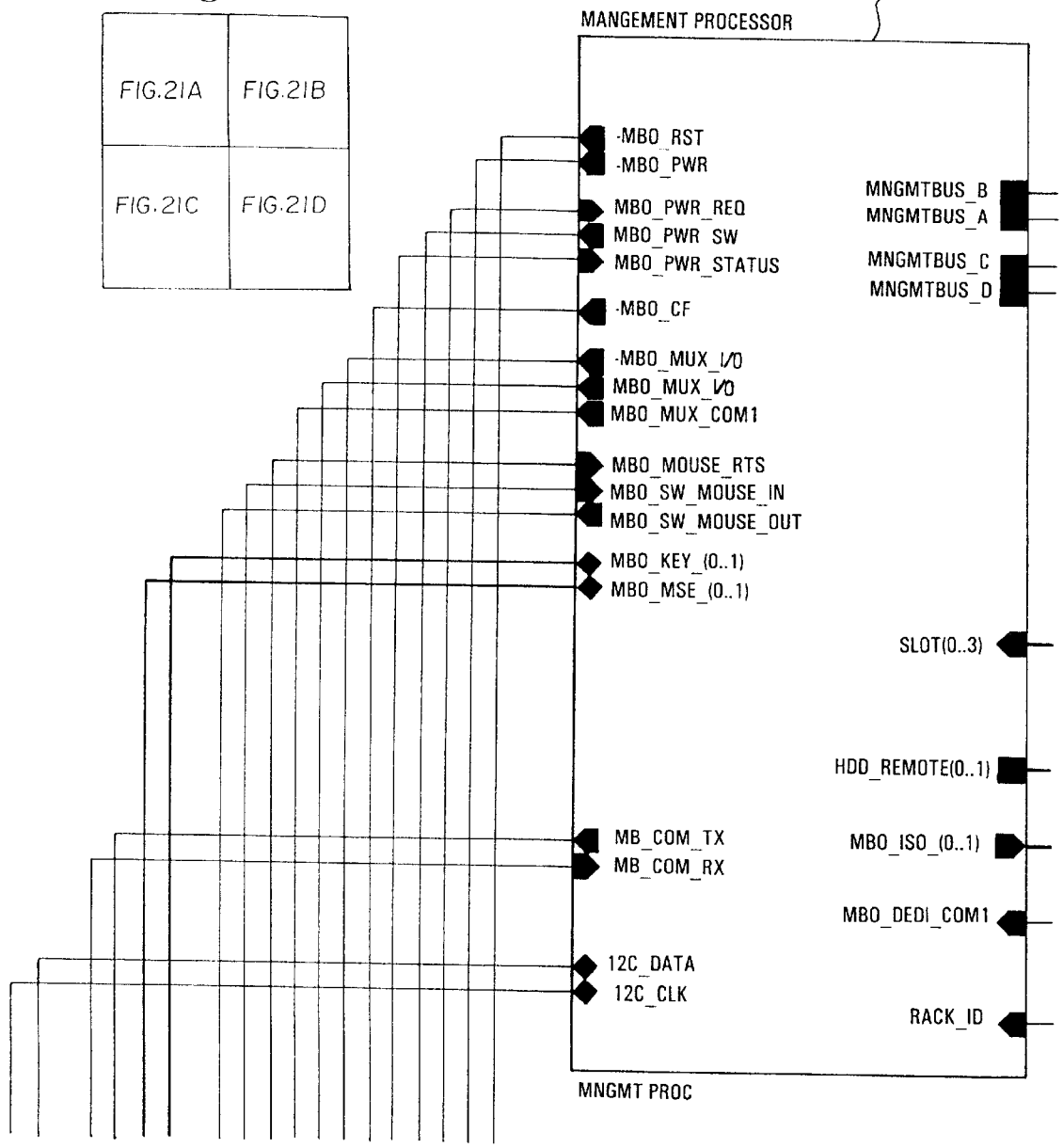

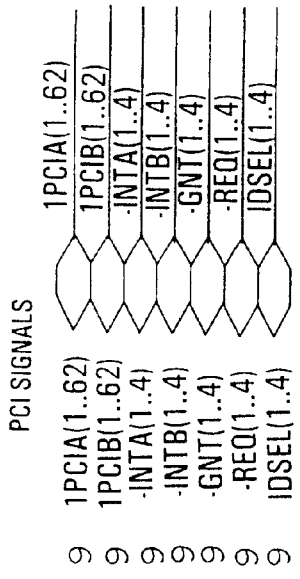
*Fig.22A*
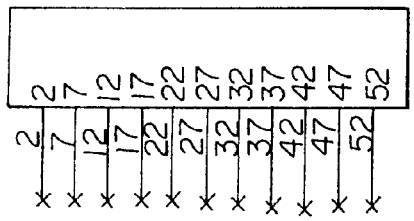
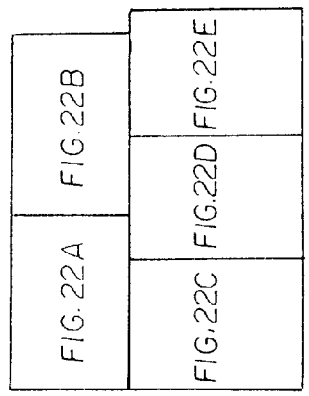
*Fig.22*
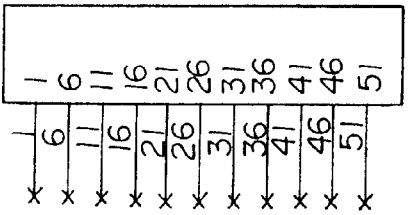

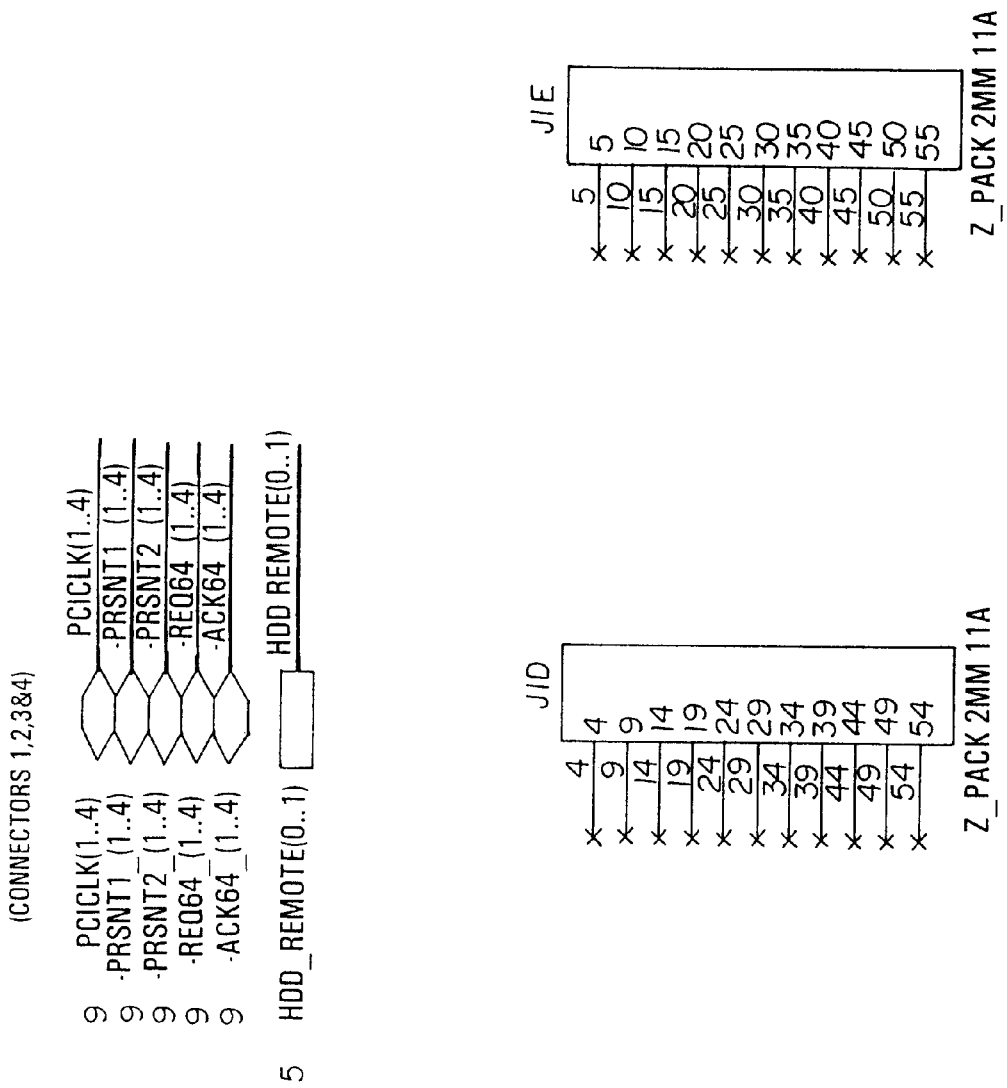

*Fig.22C*

| J2A | | J2B | |
|---|---|---|---|
| × 1 | 1 | × 2 | 2 |
| × 6 | 6 | × 7 | 7 |
| 11 | 11 | 12 | 12 |
| 16 | 16 | 17 | 17 |
| 21 | 21 | 22 | 22 |
| 26 | 26 | 27 | 27 |
| 31 | 31 | 32 | 32 |
| 36 | 36 | 37 | 37 |
| 41 | 41 | 42 | 42 |
| 46 | 46 | 47 | 47 |
| 51 | 51 | 52 | 52 |
| 56 | 56 | 57 | 57 |
| 61 | 61 | 62 | 62 |
| 66 | 66 | 67 | 67 |
| 71 | 71 | 72 | 72 |
| 76 | 76 | 77 | 77 |
| 81 | 81 | 82 | 82 |
| 86 | 86 | 87 | 87 |
| 91 | 91 | 92 | 92 |
| 96 | 96 | 97 | 97 |
| 101 | 101 | 102 | 102 |
| 106 | 106 | 107 | 107 |
| 111 | 111 | 112 | 112 |
| 116 | 116 | 117 | 117 |
| 121 | 121 | 122 | 122 |

Z_PACK 2MM 25      Z_PACK 2MM 25

| | J3A | | | J3B |
|---|---|---|---|---|
| × | 1 | × | 2 | |
| -REQ64 4 | 6 | HDD REMOTE1 | 7 | |
| 1PCIA58 | 11 | 1PCIA55 | 12 | |
| -REQ64 2 | 16 | 1PCIA52 | 17 | |
| 1PCIA57 | 21 | 1PCIA46 | 22 | |
| 1PCIA54 | 26 | 1PCIA49 | 27 | |
| 1PCIA47 | 31 | 1PCIA43 | 32 | |
| 1PCIA44 | 36 | 1PCIA41 | 37 | |
| 1PCIA40 | 41 | -REQ64 3 | 42 | |
| 1PCIA38 | 46 | -REQ64 1 | 47 | |
| 1PCIA36 | 51 | 1PCIA34 | 52 | |
| 1PCIA32 | 56 | 1PCIA31 | 57 | |
| 1PCIA29 | 61 | 1PCIA28 | 62 | |
| IDSEL4 | 66 | IDSEL1 | 67 | |
| IDSEL3 | 71 | IDSEL2 | 72 | |
| 1PCIA25 | 76 | HDD REMOTE0 | 77 | |
| 1PCIA22 | 81 | 1PCIA23 | 82 | |
| 1PCIA19 | 86 | 1PCIA20 | 87 | |
| -GNT3 | 91 | -GNT1 | 92 | |
| -GNT4 | 96 | -GNT2 | 97 | |
| 1PCIA15 | 101 | 1PCIA14 | 102 | |
| 1PCIA9 | 106 | 1PCIA11 | 107 | |
| -INTA4 | 111 | -INTA1 | 112 | |
| -INTA2 | 116 | -INTA3 | 117 | |
| | 121 | | 122 | |

Z_PACK 2MM 25      Z_PACK 2MM 25

Fig.22D

J2C Z_PACK 2MM 25
Pins: 3, 8, 13, 18, 23, 28, 33, 38, 43, 48, 53, 58, 63, 68, 73, 78, 83, 88, 93, 98, 103, 108, 113, 118, 123

J2D Z_PACK 2MM 25
Pins: 4, 9, 14, 19, 24, 29, 34, 39, 44, 49, 54, 59, 64, 69, 74, 79, 84, 89, 94, 99, 104, 109, 114, 119, 124

J3C Z_PACK 2MM 25
Pins: 3, 8, 13, 18, 23, 28, 33, 38, 43, 48, 53, 58, 63, 68, 73, 78, 83, 88, 93, 98, 103, 108, 113, 118, 123 (all tied to ground)

J3D Z_PACK 2MM 25

| Signal | Pin |
|---|---|
| -ACK64 3 | 4 |
| -ACK64 2 | 9 |
| 1PCIB53 | 14 |
| 1PCIB48 | 19 |
| 1PCIB47 | 24 |
| 1PCIB42 | 29 |
| 1PCIB44 | 34 |
| -PRSNT2 4 | 39 |
| -PRSNT2 3 | 44 |
| -PRSNT2 2 | 49 |
| -PRSNT2 1 | 54 |
| 1PCIB39 | 59 |
| 1PCIB35 | 64 |
| 1PCIB33 | 69 |
| 1PCIB29 | 74 |
| 1PCIB26 | 79 |
| 1PCIB23 | 84 |
| 1PCIB20 | 89 |
| -REQ4 | 94 |
| -REQ3 | 99 |
| PCICLK4 | 104 |
| PCICLK3 | 109 |
| 1PCIB10 | 114 |
| -INTB4 | 119 |
| -INTB2 | 124 |

Fig. 22E

| FIG. 23B | |
|---|---|
| FIG. 23A | FIG. 23C |

| Pin | Signal | | Pin | Signal | Net |
|---|---|---|---|---|---|
| 4 | NC | | 1 | TEST_NC | |
| 8 | NC | | 5 | +5V_NC | |
| | | | 7 | +5V_NC | |
| 14 | INTB_NC | | 11 | INTA_NC | |
| 16 | INTD_NC | | 13 | INTC_NC | |
| 18 | PRSNT1_NC | | 17 | RESERVED | 1PCIA9 |
| 20 | RESERVED | | | | |
| 22 | PRSNT2_NC | | 21 | RESERVED | 1PCIA11 |
| 28 | RESERVED | 1PCIB10 | 27 | RESERVED | 1PCIA14 |
| | | | 29 | RST | 1PCIA15 |
| 32 | CLK_NC | | | | |
| 36 | REQ_NC | | 33 | GNT_NC | |
| 40 | AD(31) | 1PCIB14 | 37 | RESERVED | 1PCIA19 |
| 42 | AD(29) | | 39 | AD(30) | 1PCIA20 |
| 45 | AD(27) | 1PCIB20 | 43 | AD(28) | 1PCIA22 |
| 48 | AD(25) | 1PCIB21 | 45 | AD(26) | 1PCIB23 |
| 52 | C/BE3 | 1PCIB23 | 49 | AD(24) | 1PCIA25 |
| 54 | AD(23) | 1PCIB24 | 51 | IDSEL_NC | |
| 58 | AD(21) | 1PCIB26 | 55 | AD(22) | 1PCIA28 |
| 60 | AD(19) | 1PCIB27 | 57 | AD(20) | 1PCIA29 |
| | | 1PCIB29 | | | |
| | | 1PCIB30 | | | |

Fig. 24

| FIG.24A | FIG.24B |
|---|---|
| FIG.24C | FIG.24D |

Fig.24B
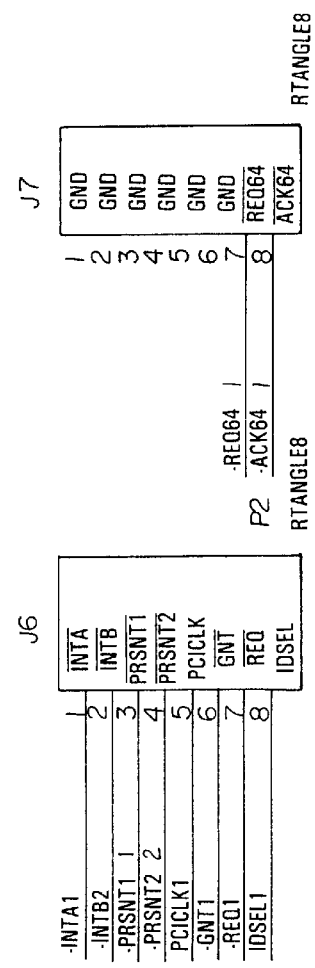
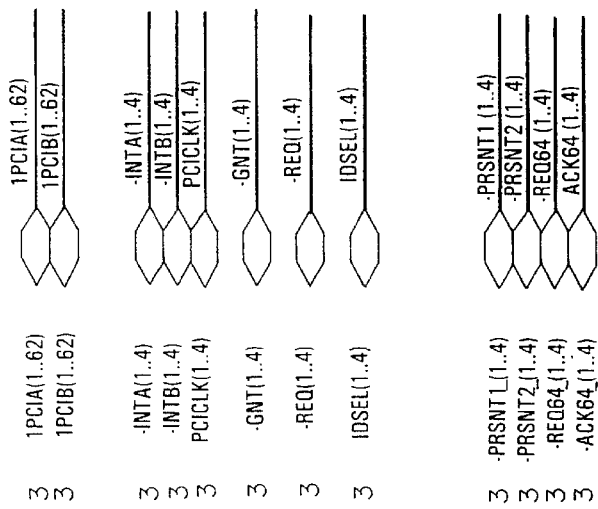

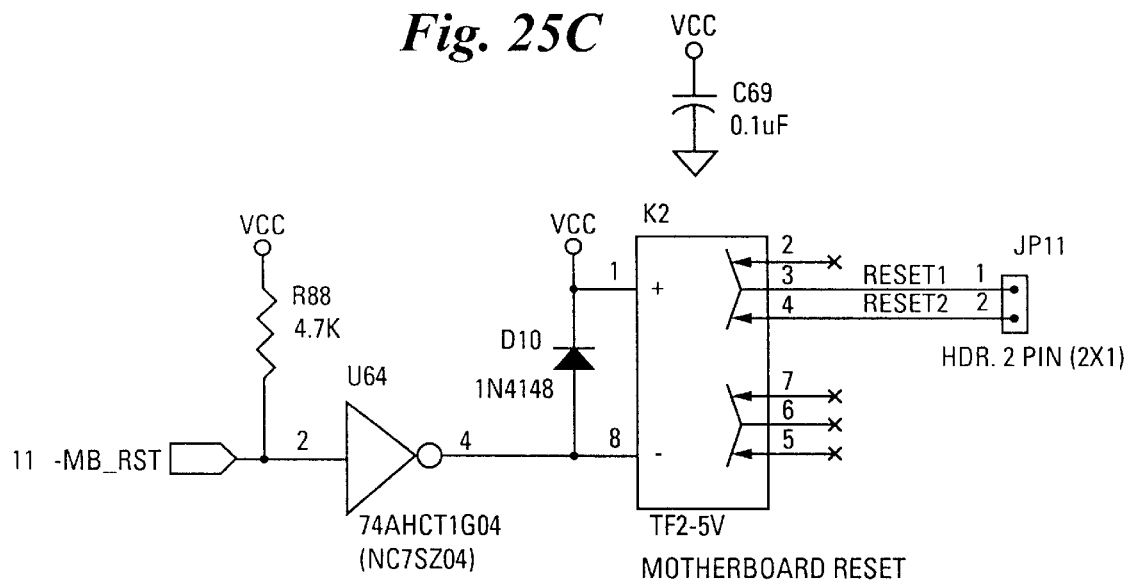
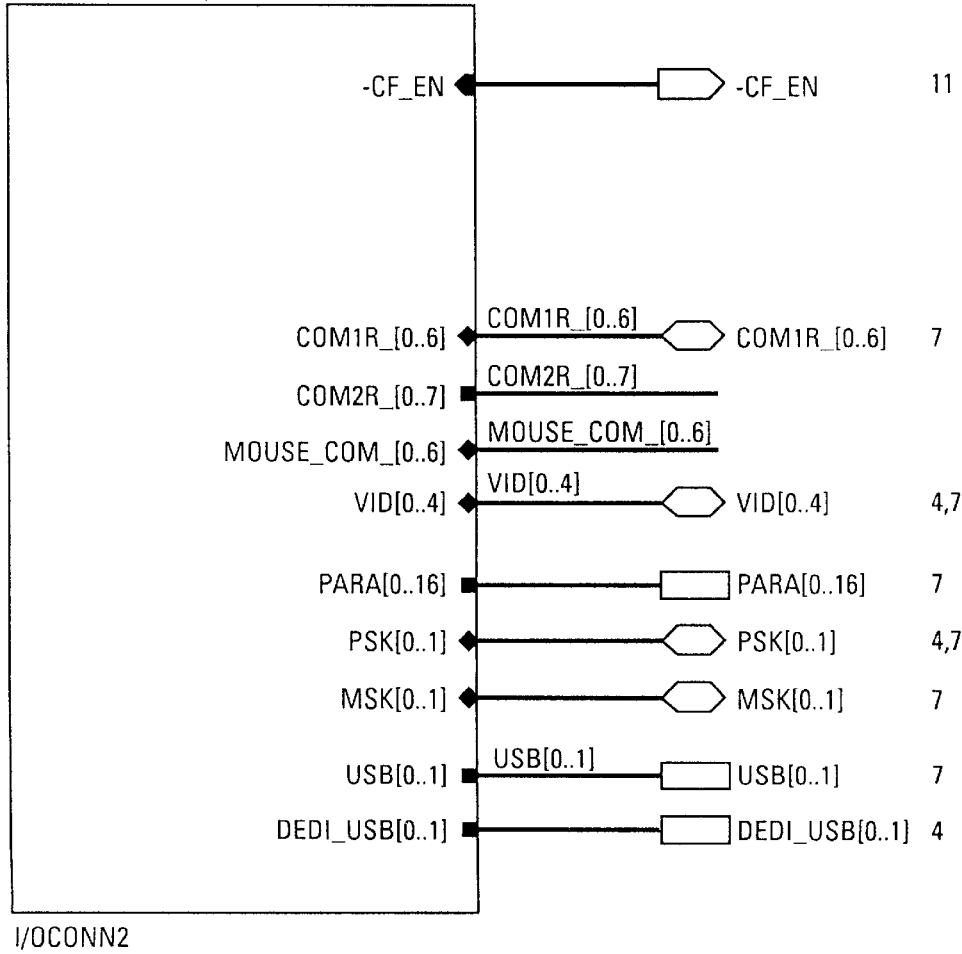
*Fig. 25C*

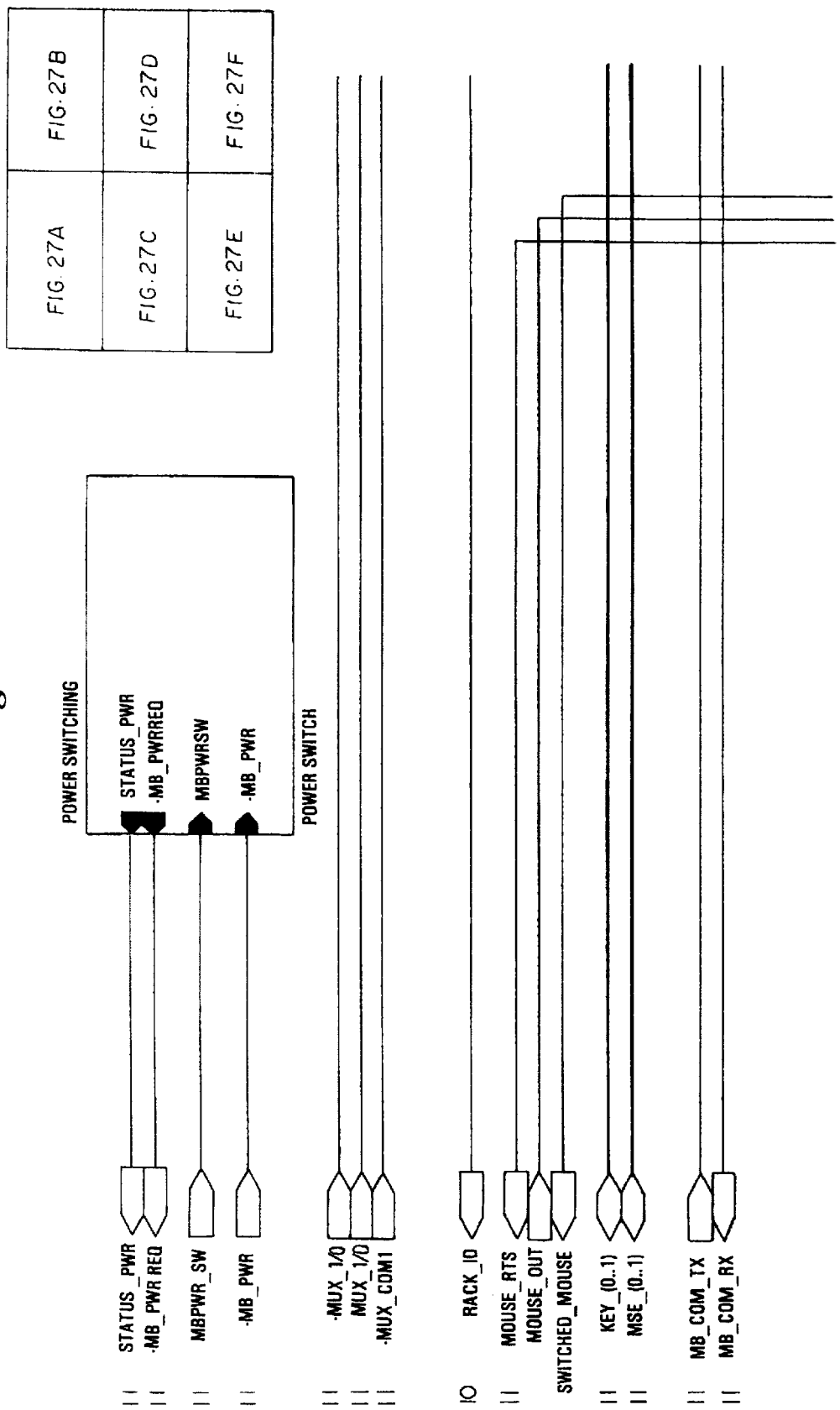

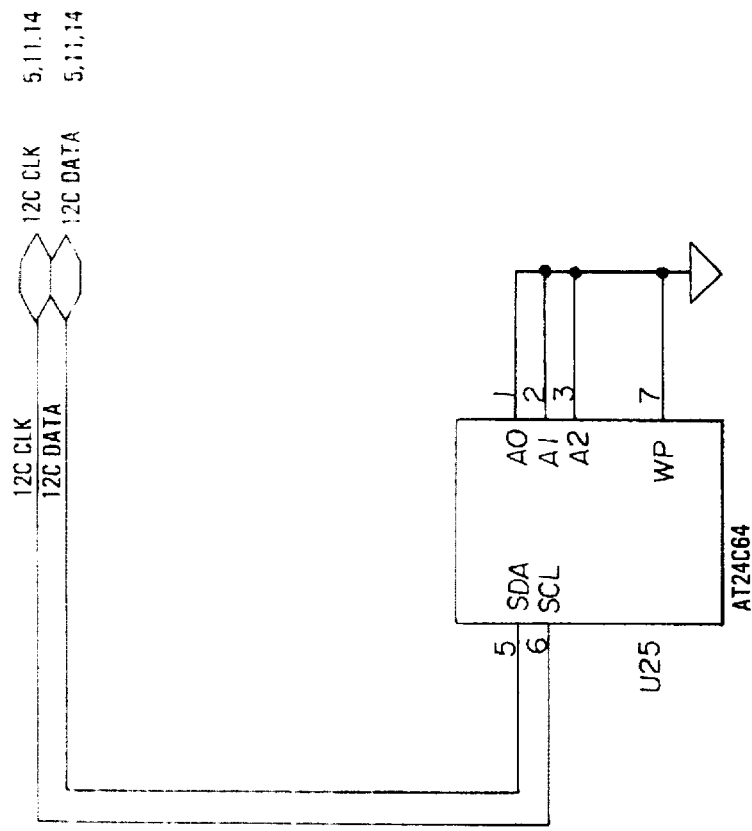
*Fig.27B*
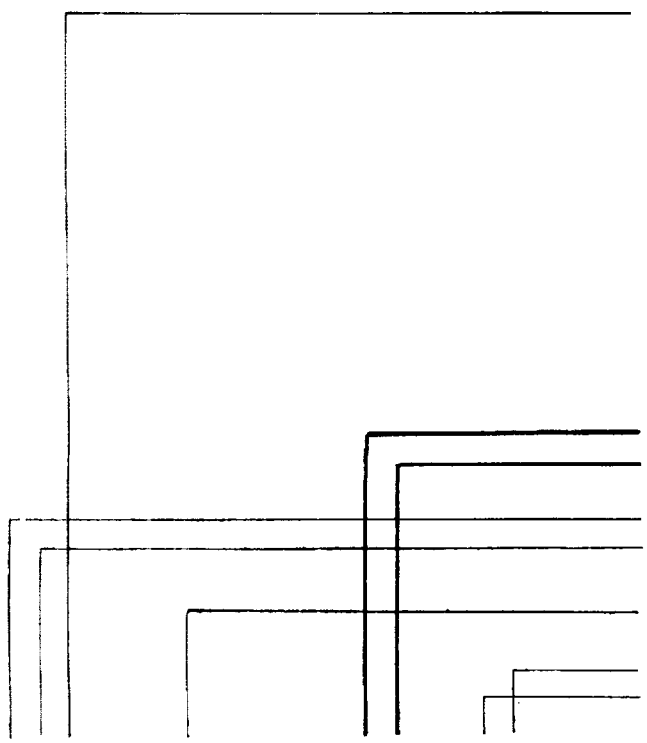

Fig. 28B
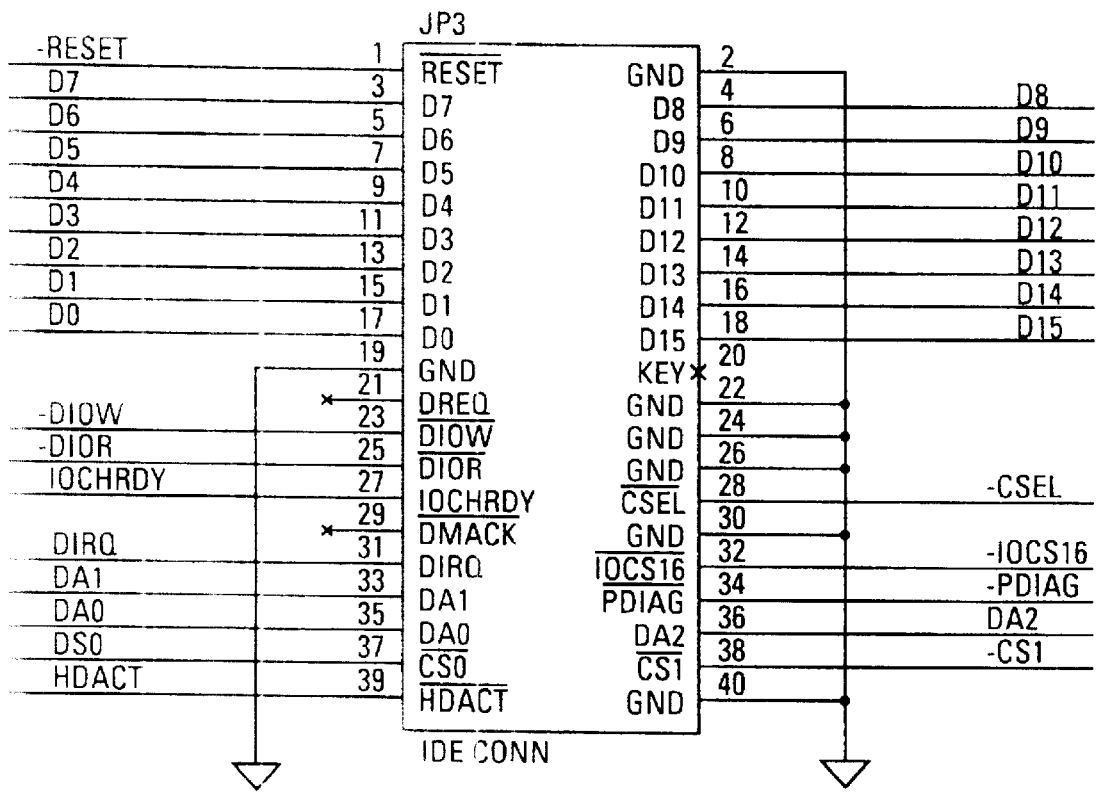
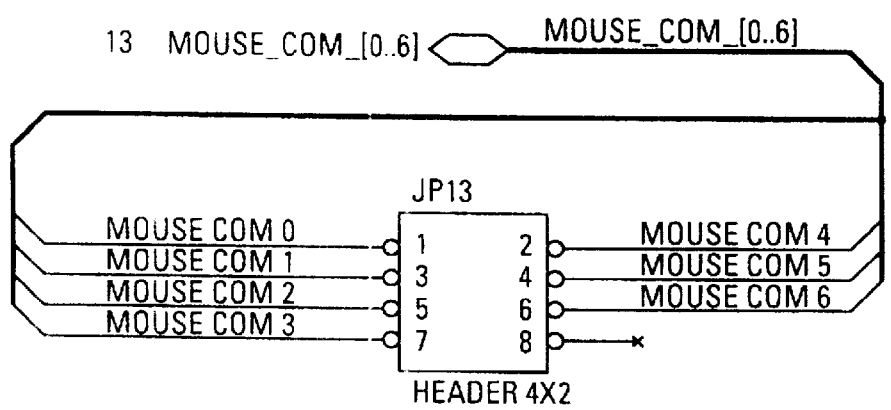

*Fig. 29E*
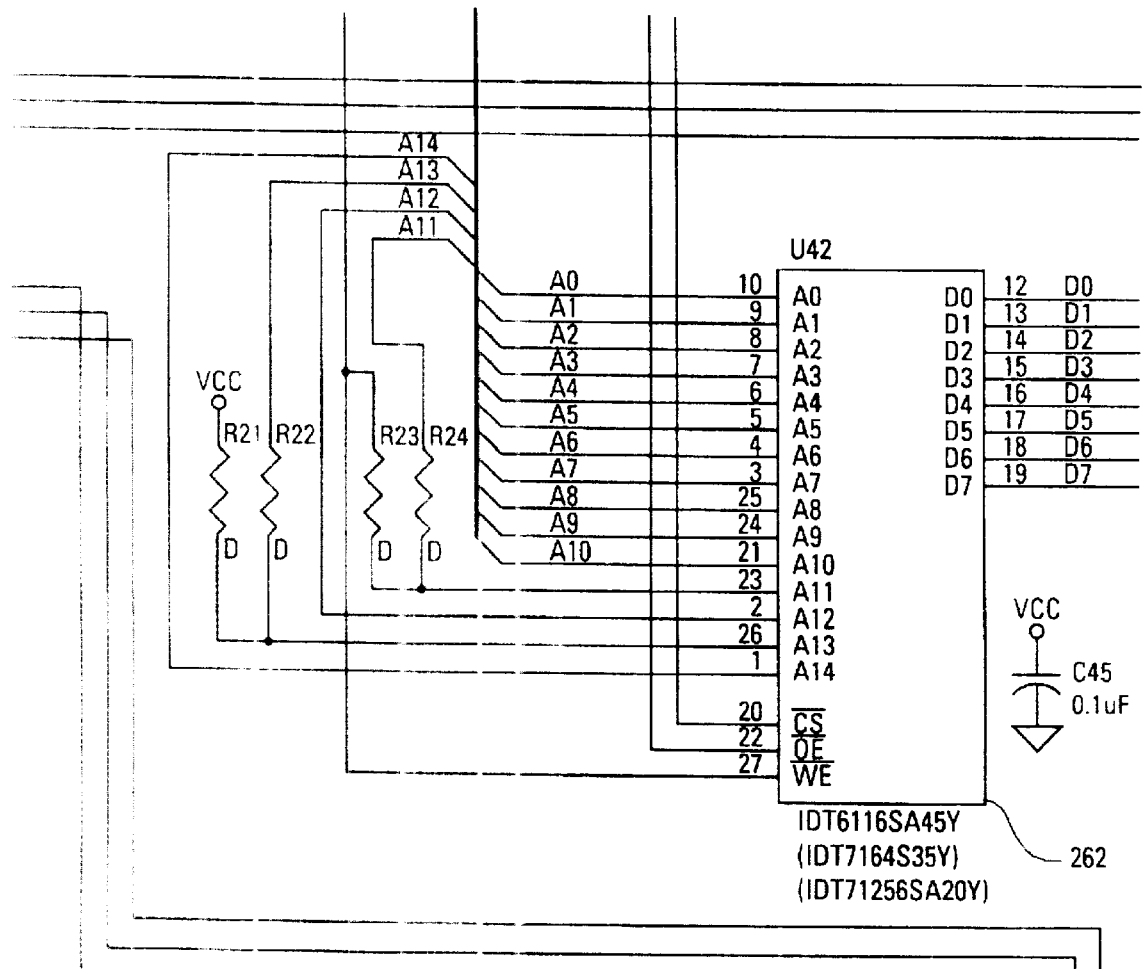
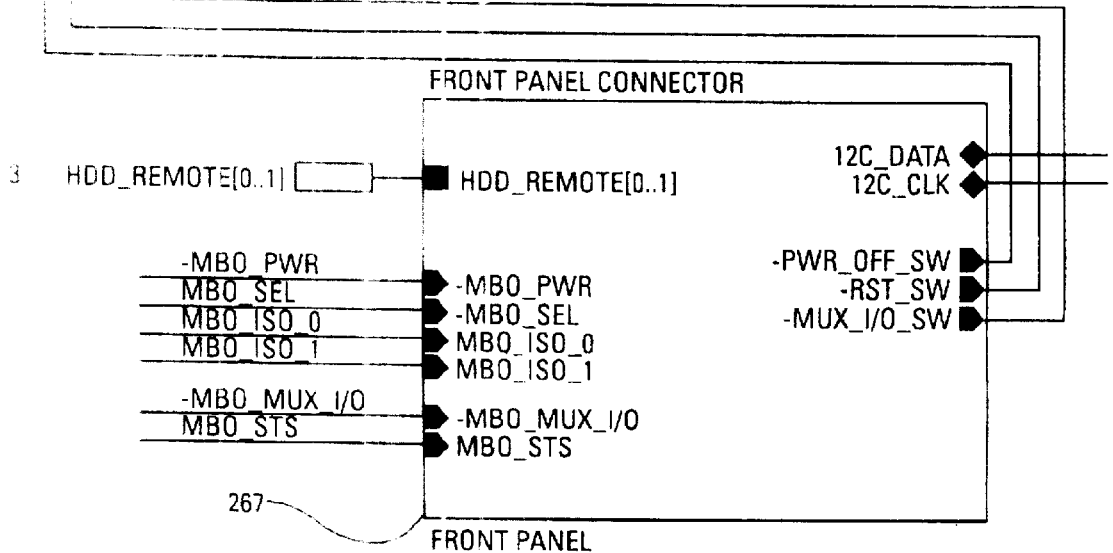

*Fig.30C*
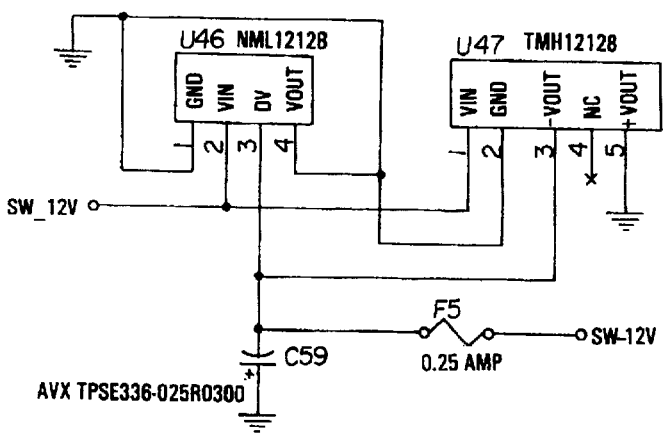
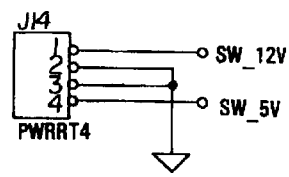
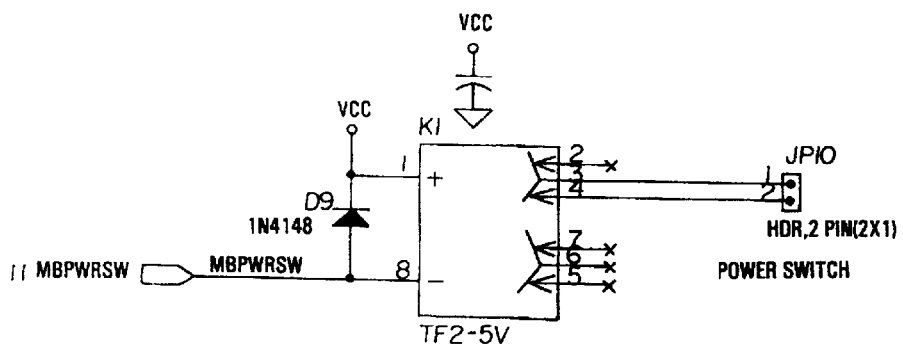

SCALABLE INTERNET ENGINE

RELATED APPLICATION

The present invention is related to a co-pending application filed concurrently herewith and entitled "Method and System For Providing Dynamic Hosted Service Management Across Disparate Accounts/Sites," a copy of which is attached hereto and the disclosure of which is hereby incorporated by reference.

FIELD OF THE INVENTION

The present invention relates generally to the field of computer processing systems. More specifically, the present invention relates to a scalable server engine comprised of a large number of commercially available server boards each arranged as an engine blade in a power and space efficient chassis.

BACKGROUND OF THE INVENTION

The explosive growth of the Internet has been driven to a large extent by the emergence of commercial service providers and hosting facilities, such as Internet Service Providers (ISPs), Application Service Providers (ASPs), Independent Software Vendors (ISVs), Enterprise Solution Providers (ESPs), Managed Service Providers (MSPs) and the like. Although there is no clear definition of the precise set of services provided by each of these businesses, generally these service providers and hosting facilities provide services tailored to meet some, most or all of a customer's needs with respect to application hosting, site development, e-commerce management and server deployment in exchange for payment of setup charges and periodic fees. In the context of server deployment, for example, the fees are customarily based on the particular hardware and software configurations that a customer will specify for hosting the customer's application or website. For purposes of this invention, the term "hosted services" is intended to encompass the various types of these services provided by this spectrum of service providers and hosting facilities. For convenience, this group of service providers and hosting facilities shall be referred to collectively as Hosted Service Providers (HSPs).

Commercial HSPs provide users with access to hosted applications on the Internet in the same way that telephone companies provide customers with connections to their intended caller through the international telephone network. The computer equipment that HSPs use to host the applications and services they provide is commonly referred to as a server. In its simplest form, a server can be a personal computer that is connected to the Internet through a network interface and that runs specific software designed to service the requests made by customers or clients of that server. For all of the various delivery models that can be used by HSPs to provide hosted services, most HSPs will use a collection of servers that are connected to an internal network in what is commonly referred to as a "server farm", with each server performing unique tasks or the group of servers sharing the load of multiple tasks, such as mail server, web server, access server, accounting and management server. In the context of hosting websites, for example, customers with smaller websites are often aggregated onto and supported by a single web server. Larger websites, however, are commonly hosted on dedicated web servers that provide services solely for that site. For general background on the Internet and HSPs, refer to Geoff Huston, *ISP Survival Guide: Strategies For Running A Competitive ISP,* (1999).

As the demand for Internet services has increased, there has been a need for ever-larger capacity to meet this demand. One solution has been to utilize more powerful computer systems as servers. Large mainframe and midsize computer systems have been used as servers to service large websites and corporate networks. Most HSPs tend not to utilize these larger computer systems because of the expense, complexity, and lack of flexibility of such systems. Instead, HSPs have preferred to utilize server farms consisting of large numbers of individual personal computer servers wired to a common Internet connection or bank of modems and sometimes accessing a common set of disk drives. When an HSP adds a new hosted service customer, for example, one or more personal computer servers are manually added to the HSP server farm and loaded with the appropriate software and data (e.g., web content) for that customer. In this way, the HSP deploys only that level of hardware required to support its current customer level. Equally as important, the HSP can charge its customers an upfront setup fee that covers a significant portion of the cost of this hardware. By utilizing this approach, the HSP does not have to spend money in advance for large computer systems with idle capacity that will not generate immediate revenue for the HSP. The server farm solution also affords an easier solution to the problem of maintaining security and data integrity across different customers than if those customers were all being serviced from a single larger mainframe computer. If all of the servers for a customer are loaded only with the software for that customer and are connected only to the data for that customer, security of that customer's information is insured by physical isolation.

Up to now, there have been two approaches with respect to the way in which HSPs built their server farms. One approach is to use a homogenous group of personal computer systems (hardware and software) supplied from a single manufacturer. The other approach is to use personal computer systems supplied from a number of different manufacturers. The homogeneous approach affords the HSP advantages in terms of only having to support a single server platform, but at the same time it restricts the HSP to this single server platform. The heterogeneous approach using systems supplied from different manufacturers is more flexible and affords the HSP the advantage of utilizing the most appropriate server hardware and software platform for a given customer or task, but this flexibility comes at the cost of increased complexity and support challenges associated with maintaining multiple server platforms.

As HSPs increased their capacity, the number of servers in their computer room or data center also increased. To conserve on floor space in the computer room or data center, an HSP would install rack mounted cabinets to allow multiple servers to be stacked together on the same amount of floor space. Individual personal computer servers could then be stacked either vertically or horizontally in these rack mounted cabinets together with switching equipment and modems. As a further improvement on the conventional power packaging enclosure of a typical personal computer server, servers have been developed specifically for rack mounting in what are referred to as "pizza box" or "U" formats where each server slides horizontally into one or more slots in a rack mounted cabinet. Examples of homogeneous servers packaged in this type of a rack mounted configuration include the RaQ server line from Cobalt Network Systems, the Netfinity server line from IBM and the A-class server line from Hewlett-Packard.

Although rack mounted servers offer a considerable improvement in terms of space efficiency as compared to conventional tower cabinet personal computer servers, installing or adding new rack mounted servers to a server farm continues to be a manual operation involving significant amounts of cabling and wire connection, as well as software and network configuration. In addition, because the rack-mounted server is designed as an independent computer system, each server is provided with its own power supply. In order to keep the overall cost of the servers reasonable, these individual power supplies are inexpensive and therefore relatively inefficient. As a result, a server farm consisting of several rack-mounted servers consumes a large amount of electricity and dissipates a large quantity of waste heat. This problem is particularly acute in the thinnest 1U form factor that would allow for the greatest number of servers to be stacked on top of each other. Because each of the 1U servers is positioned horizontally in the rack cabinet, air flow within the cabinet is severely restricted and the height of the 1 U servers prevents the use of a large enough fan to overcome these air flow restrictions.

One approach to making a server arrangement more efficient was the Chatterbox server line from ChatCom, Inc. The chassis for the Chatterbox system supported a number of front-loading, hot-swappable modules, including server motherboards, power supplies and RAID drives. In this system, specially designed server motherboards were slid into a chassis in a vertical orientation, as compared to the horizontal orientation of the motherboards for rack-mounted servers. The motherboards modules also were designed to accommodate different versions of the early Intel processors as the main CPU, and included a monitored COM port to which a modem was connected and a microcontroller and associated software that monitored the modem and managed the connection of the I/O port to the main CPU on the motherboard. The main CPU was an Intel or Intel compatible 386, 486, Pentium or Pentium Pro processor. The motherboard was either a proprietary design of ChatCom or a generic AT style board available from one of the early PC motherboard manufacturers. Power could be distributed directly from the hot swappable power supplies in the chassis to the motherboard for these early servers because, unlike current generation servers that use standard ATX power supplies with integrated power management and control, these early servers had no power management and control systems incorporated into the standard circuitry for the motherboard.

Although the Chatterbox server line allowed for more convenient access to the hot-swappable modules, cabling connections for the modem and network cards had to be routed along the back edge of the hot-pluggable unit and har to be removed prior to removal of the unit. In a convention tower chasses personal computer server, the network and modem cards are inserted in connector slots such that they are oriented perpendicular to the surface of the motherboard. In the Chatterbox server line, these cards had to be positioned parallel to the surface of the motherboard in order to allow the motherboard module to fit vertically into the chassis. This made accessing the cabling connections difficult as the motherboard module needed to be removed from the chassis in order to make any cabling changes.

Other packaging arrangements have been proposed for servers. In U.S. Pat. No. 5,877,938, a packaging system for a server provides for hot swappable disk drives and power supply modules and uses a horizontal tray compartment at the top of the chassis to contain the server motherboards stacked in a horizontal orientation in the slide out tray. In U.S. Pat. No. 6,025,989 a modular arrangement for a rack mounted computer processor is described in which the disk drive, fan, motherboard and power supply are arranged in side-by-side sub modules within a rack mounted horizontally oriented housing.

Packaging arrangements for other types of multiple computer processor systems have sought to solve some of the problems of locating and accessing multiple components in a cabinet by using a midplane arrangement that effectively divides the circuitry for each component into a front processor portion and a rear I/O portion that are separated by a midplane. U.S. Pat. No. 5,251,097 describes a supercomputer packaging architecture with orthogonal midplanes where the I/O portion is connected at the front to the midplane and at the rear to a backplane. U.S. Pat. No. 5,488,541 describes a VME backplane arrangement with a connectorized midplane to connect multiple processors together. U.S. Pat. No. 5,912,802 describes a midplane telecommunication switch cabinet that houses multiple telephony switching components.

The issue of being able to use different types of motherboards in a common tower-type cabinet for a personal computer has been addressed in U.S. Pat. Nos. 6,035,356 and 6,094,351. In U.S. Pat. No. 6,035,356 a cross-platform architecture for tower-type personal computers uses two boards in place of a conventional single motherboard. The first board is a processor board and the second board is the I/O board. The boards are oriented in a vertical position and arranged within an elongated housing in an offset end-to-end parallel orientation and connected by a pair of connectors. In this way different motherboards can be connected to a common design for the I/O board through the pair of connectors. In U.S. Pat. No. 6,094,351 two different kinds of removable backpanels are used to accommodate different types of motherboards in a common tower-type cabinet.

Although numerous enhancements and improvements have been made to the way in which computer processors, and servers in particular, are packaged, it would be desirable to provide an arrangement for a scalable Internet engine that could accommodate a large number of commercially available server boards in a power and space efficient cabinet.

SUMMARY OF THE INVENTION

The present invention is a scalable Internet engine comprised of a large number of commercially available server boards each arranged as an engine blade in a power and space efficient cabinet. The engine blades are removably positioned in a front side of the cabinet in a vertical orientation. A through plane in the middle of a chassis assembly within the cabinet provides common power and control peripheral signals to all engine blades. I/O signals for each engine blade are routed through apertures in the through plane to interface cards positioned in the rear of the cabinet. The scalable engine can accommodate different types of server boards in the same chassis assembly because of a common blade carrier structure. Different types of commercially available motherboards are mounted in the common blade carrier structure that provides a uniform mechanical interface to the chassis assembly. A specially designed PCI host board that can plug into various types of motherboards has a first connector for connecting to the through plane and second connector for connecting to the interface cards. Redundant hot-swappable high-efficiency power supplies are connected to the common power signals on the through plane. The host board includes management circuitry that distributes the power signals to the server board for that engine blade by emulating the ATX power management protocol. Replaceable fan trays are mounted below the engine blades to cool the engine. Preferably, the cabinet accommodates multiple rows of engine blades each in a sub-chassis that are stacked on top of each other, as well as rack mounted networks switches and disk drives.

The scalable engine of the present invention has numerous advantages over the designs of existing servers. Unlike existing homogenous server configurations that rely on similar server boards from the same manufacturer, the scalable Internet engine supports many different types of commercially available server boards that can all be mounted in the same uniform chassis. This allows an HSP to utilize different server boards for different applications within the same chassis. It also enables the use of state-of-the-art ATX motherboards as soon as these boards are available, and takes advantage of the reduced costs and increased reliability of mass-produced, commodity ATX motherboards.

The unique through plane arrangement allows for true hot swappable capabilities for both the engine blades and the interface cards. Individual engine blades can be removed and replaced without the need to unplug interface cards or network cabling. This eliminates one of the highest points of failure in maintaining any computer system, namely problems caused by the disconnection and reconnection of I/O cables. Connections for all of the data paths are isolated to protect against data faults during removal or insertion of an engine blade. In one embodiment, a passive I/O backplane is interposed between the second connector of the host board and the interface card on the rear side of the through plane. The I/O backplane routes the PCI signals to allow for side-by-side installation of two or more interface cards per engine blade.

The scalable engine allows for multi-level fault tolerance and redundancy to be implemented across all components in a highly effective manner. As described in more detail in the co-pending application entitled "Method and System For Providing Dynamic Hosted Service Management Across Disparate Accounts/Sites", engines blades can be assigned from one customer to another customer easily and automatically without the need for manual intervention. This enables the dynamic allocation of blades in response to changing customer requirements and allows the HSP to make use of excess server resources that otherwise would be statically assigned to a single customer domain. Redundant engine blades can be assigned to a particular customer and quickly and automatically brought online in the event of an engine blade failure. The power supplies preferably are highly efficient and triple redundant (N+2). Similarly, the use of multiple fan trays provides for redundant cooling protection for each row of engine blades. Maintenance requirements are greatly simplified by the overall design of the scalable engine.

In a preferred embodiment that uses a 19 inch NEBS compliant cabinet, a single cabinet engine can support up to 32 engine blades. This scalable engine provides the same server capacity as conventional 2U rack mounted servers in half the floor space with savings of 75 percent in both power and air-conditioning requirements.

The management circuitry associated with each engine blade allows for efficient management and control of the scalable engine outside of the I/O network of the server engine. This circuitry reports status and error conditions, controls power up and power down operations by emulating the standard ATX power management protocol and communicates with an agent executing on the processor in the motherboard.

All of the engine blades can be connected to and controlled from a single console and keyboard, even when multiple cabinets are arranged in the side-by-side configuration. Common peripheral devices, such as a keyboard, video, mouse, diskette drive, can be selectively switched by the system operator to any of the engine blades.

BRIEF DESCRIPTION OF THE DRAWINGS

FIGS. 5, 6 and 7 are a top, side and perspective view of the fan tray.

FIGS. 8 and 9 are front and rear cutaway perspective views of the redundant power supplies.

FIG. 17 is a perspective view of a shared peripheral connector for the rear of the power system.

FIGS. 21–31 are schematic diagrams of a preferred embodiment of the host board of the present invention.

DETAILED DESCRIPTION OF THE PREFERRED EMBODIMENT

Figure 1:
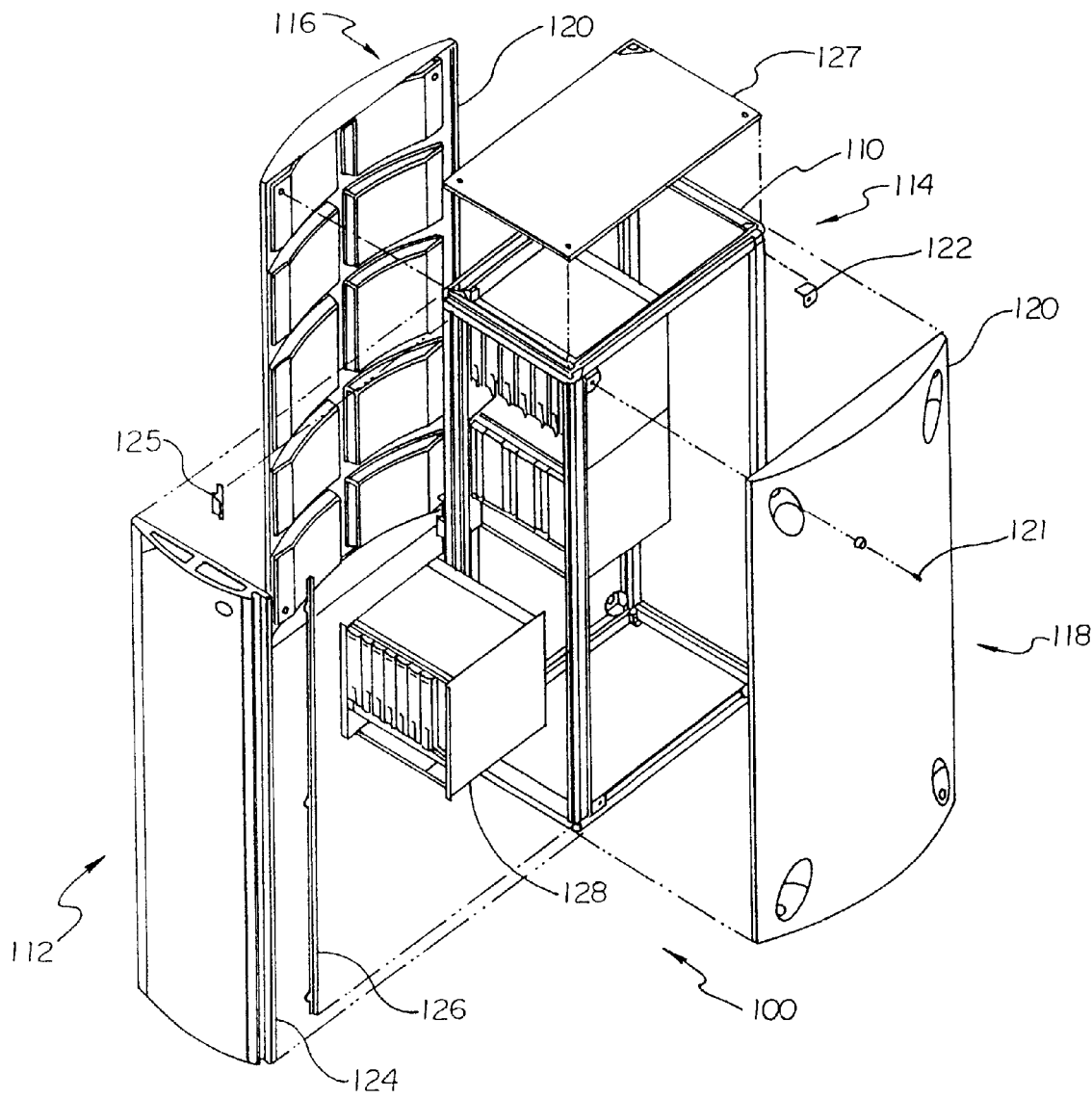
FIG. 1 is an exploded perspective view of one embodiment of a single cabinet scalable engine with skins and doors.

Referring to FIG. 1, an overview of a scalable engine 100 in accordance with a preferred embodiment the present invention will now be described. For ease of description, a server 100 housed in a single cabinet 110 will be described first, although it will be recognized that the scalability of the server of the present invention allows for a very large number of cabinets 110 to be configured together as a single engine server 100.

The cabinet 110 has a front side 112, a rear side 114, a left side 116 and a right side 118. In a single cabinet embodiment, each of the left side 116 and right side 118 has a corresponding side panel or skin 120 rigidly mounted to the cabinet 110 with screws, bolts or similar fastening mechanisms 121 that preferably connect to a bracket 122 in each corner of the frame 110. Alternatively, the side panels 120 could be welded onto the cabinet 110 so as to form an integral assembly. In a multiple cabinet embodiment, one or both of side panels 120 may be absent depending upon the position of the cabinet 110 within an overall side-by-side arrangement. Preferably, at least the front side 112 is provided with a door panel 124 attached to the front side 112 by hinges 125. Optionally, the rear side 114 may be provided with a similar door panel 124. The door panel 124 is latched and preferably lockable to the cabinet 110 by a latch bar 126. Alternatively, other forms of attaching and securing door panel 124 to the front side 112 or rear side 114 could be utilized, such as sliding attachment, hanging attachment, or removable attachment. Optionally, a panel 127 may be installed on either or both of the top and bottom of the cabinet 110, depending upon structural, cooling and electrical isolation requirements. Preferably, the cabinet 110 is a 19" NEBS compliant metal rack that is 19" wide, 1000 mm deep and up to 84" tall. The cabinet 110 is preferably constructed of metal. The side panels 120 and door panels 124 may be metal, fiberglass or plastic depending upon weight, cost and electrical isolation considerations. Unlike most rack mounted cabinets for existing personal computer servers, the NEBS compliant cabinet of the present invention meets applicable NEBS standards for airflow, dust, shock and vibration limits for cabinetry housing electrical equipment.

Figure 2:
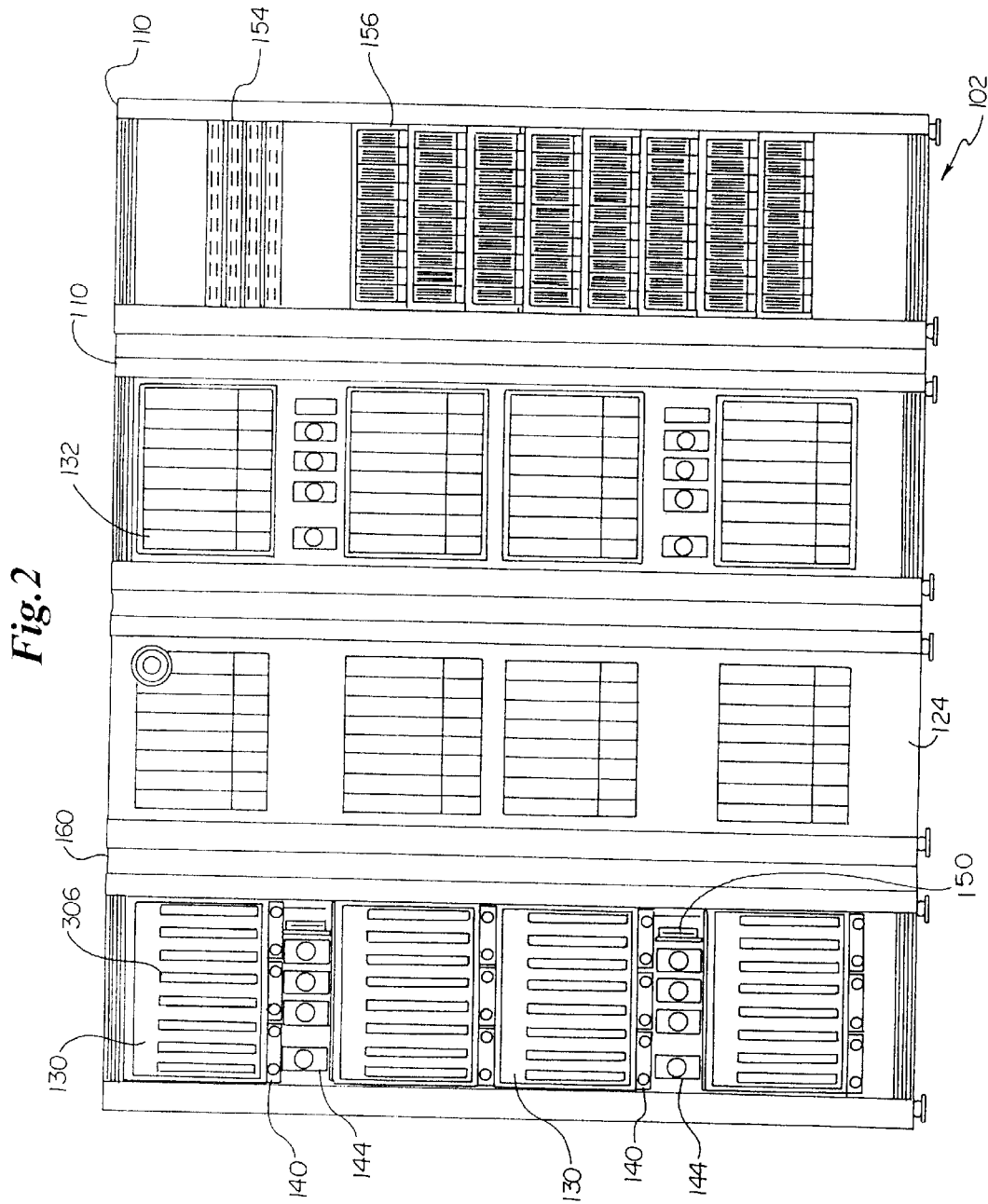
FIG. 2 is a front view of another embodiment of the scalable engine with four cabinets in a side-by-side arrangement.
Figure 3:
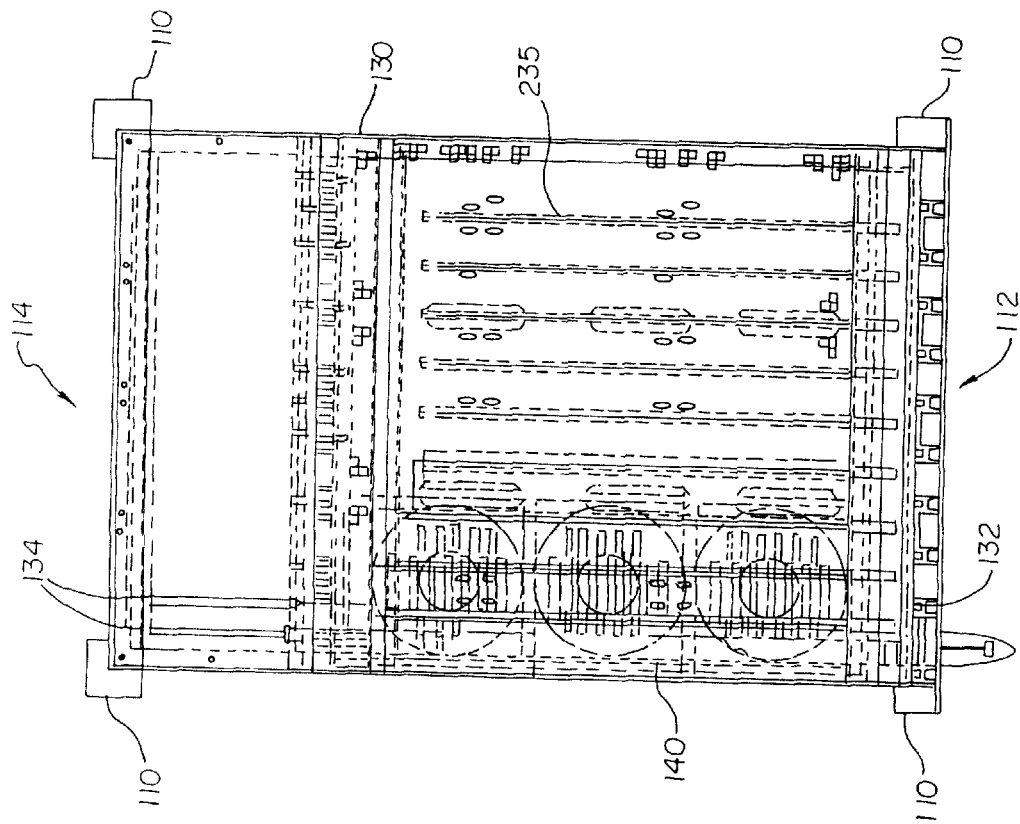
FIG. 3 is a top view sectional view of a chassis assembly for the scalable engine.

Referring to FIGS. 1–3, a through plane 130 separates the front side 112 from the rear side 114 in that portion of the cabinet 110 that houses a plurality of engine blades 132 and a plurality of interface cards 134. Each engine blade 132 contains at least one processor and each interface card 134 manages at least one input/output (I/O) communication channel for the associated processor with either disk storage (e.g., an array of SCSI disks, a Storage Array Network (SAN) unit or a Fibre Channel (FC) disk array) or communication switches (e.g., FC switches, ATM switches, Ethernet switches or modems). The front door panel 124 allows access to the engine blades 132 from the front side 112 and the rear door panel 124 (if present) allows access to the interface cards 134 from the rear side 114. Cabling (not shown) for interconnecting the interface cards 134 with the associated disk storage or communication switching equipment is conveniently accessible from the rear side 114 without the need for disturbing the engine blades 132 on the front side 112. Similarly, engine blades 132 can be replaced without any need for disconnecting or otherwise disturbing the interface cards 134 or the cabling connected to those cards.

In one embodiment as shown best in FIG. 2, two separate chassis assemblies 128 can be arranged in a stacked fashion within a single cabinet 110, with each chassis assembly 128 providing space for up to sixteen (16) engine blades 132. In this embodiment, each chassis assembly 128 includes two sub-chassis 129 arranged one on top of the other and each providing space for up to eight (8) engine blades per sub-chassis 129. A power frame 144 as will be described is mounted below the pair of sub-chassis 129 to form the completed chassis assembly 128. In the embodiment having two chassis assemblies 128, a total of thirty-two engine blades 132 may be housed in a single cabinet 110. Although the preferred embodiment is described with respect to a pair of sub-chassis 129 and a pair of chassis assemblies 128 per cabinet, it will be understood that other arrangements of the numbers of engine blades 132, sub-chassis 129 and chassis 128 is contemplated by the present invention. It will also be understood that while the preferred embodiment of the invention is described in terms of an outer cabinet 110 having multiple chassis assemblies 128 positioned therein, any type of chassis arrangement involving a frame, cabinet or housing for configuring the engine blades 132 in accordance with the present invention is intended to be within the scope of the present invention. Preferably, the engine blades 132 of the present invention are positioned vertically within each sub-chassis 129. Preferably, additional components can also be housed in the chassis 110.

As shown in FIGS. 2 and 3, a plurality of fan trays 140 are removably mounted on the bottom of each chassis assembly 128 to cool the engine blades 132 in that chassis assembly 128. Referring to FIGS. 5, 6 and 7, each fan tray 140 has a plurality of individual fan units 142 such that a single fan unit 142 can fail and the fan tray can still create sufficient air movement to adequately cool the engine blades 132. A plug-in power connection 143 is provided at a rear of each fan tray 140. Preferably, the fan trays 140 are secured in the sub-chassis 128 by hand-operated oversized screws 141 or other forms of latching means. In a preferred embodiment, there are three (3) fan trays 140 per sub-chassis 128 and three (3) fans 142 per fan tray 140.

As shown in FIGS. 8 and 9, a plurality of power supplies 144 are removably housed in a frame 146 that is mounted in the chassis assembly 128 separately from the sub-chassis 129. The power frame 146 includes an AC/DC board 148 that coordinates power supplied from the power supplies 144 and routes this power to the through plane 130. In a preferred embodiment, at least three (3) removable power supplies 144 are installed in the power frame 146, even though only two (2) would be required to power a fully populated cabinet 110. This feature provides for redundancy in the event of a failure of any one of the power supplies 144.

Up to four (4) power supplies 144 are slidably mounted on the power frame 146 via tracks 170. The power supplies 144 in a preferred embodiment are high efficiency 400 watt multiple power output power supplies, such as the HP3 available from Magnetec. Connectors 172 on the front side of the AC/DC board 148 attach to connectors 174 on the rear of the power supplies to allow the power supplies to be hot swappable. Standard peripheral connectors 176 for plug-in CD drives or hard drives are provided on the front side of portion 178 of the AC/DC board 148. A set of shared peripheral connections 179 are mounted on the rear of the AC/DC board 148. The shared peripheral connections 179 preferably provide similar functionality as the direct peripheral connections 304 shown in FIG. 15. It is preferred that electronic quick switches be used to isolate the peripherals from each blade 132 and connect them to one blade 132 at a time when a select button is pressed for that blade 132.

In a preferred embodiment, the AC/DC board 148 also includes connections for common peripheral devices, such as a CD drive 150 and a boot disk drive 152. External connections for other common peripheral devices, such as a common control console having a keyboard, mouse and display (not shown) are also provided, either on the AC/DC board 148 or on the through plane 130.

In the embodiment shown in FIG. 2, each chassis assembly 128, including two sub-chassis 129, a power frame 146 and a row of fan trays 140, is approximately 37" high. In an alternate embodiment adapted to accommodate quad processor servers, the chassis assembly 128 is approximately 40" high. In another embodiment as shown in FIG. 1, each chassis assembly 128 holds up to eight (8) engine blades 132 in a single sub-chassis 129, with space at the bottom of each sub-chassis 129 for the fan trays 140 and the power frame 146.

Rack mounted switching equipment 154, such as a Fibre Channel switch or a cross point circuit switch, also can be housed in the cabinet 110. In a preferred embodiment, the depth of cabinet 110 and the ability to access cabinet 110 from both the front and rear allows for two standard 1 U switches to be mounted front and rear in a single slot within the cabinet. In another embodiment, one or more of the chassis assemblies 128 can be replaced by rack mounted disk storage units 156. Again, the depth and the ability to access cabinet 110 from both the front and rear allows for a potential doubling up of individual disk storage units 156 in the same slot, depending upon the depth of such units.

It will be understood that numerous configurations of components within rack mounted cabinet 110 can be accomplished and that other types of peripheral components, such as alternative kinds of storage devices, different kinds of switching equipment, modems or the like, and different common peripherals like floppy disks or tape drives, may be housed within chassis 110 as long as such components support rack mounting, either directly or with the use of a sub-frame.

Figure 4:
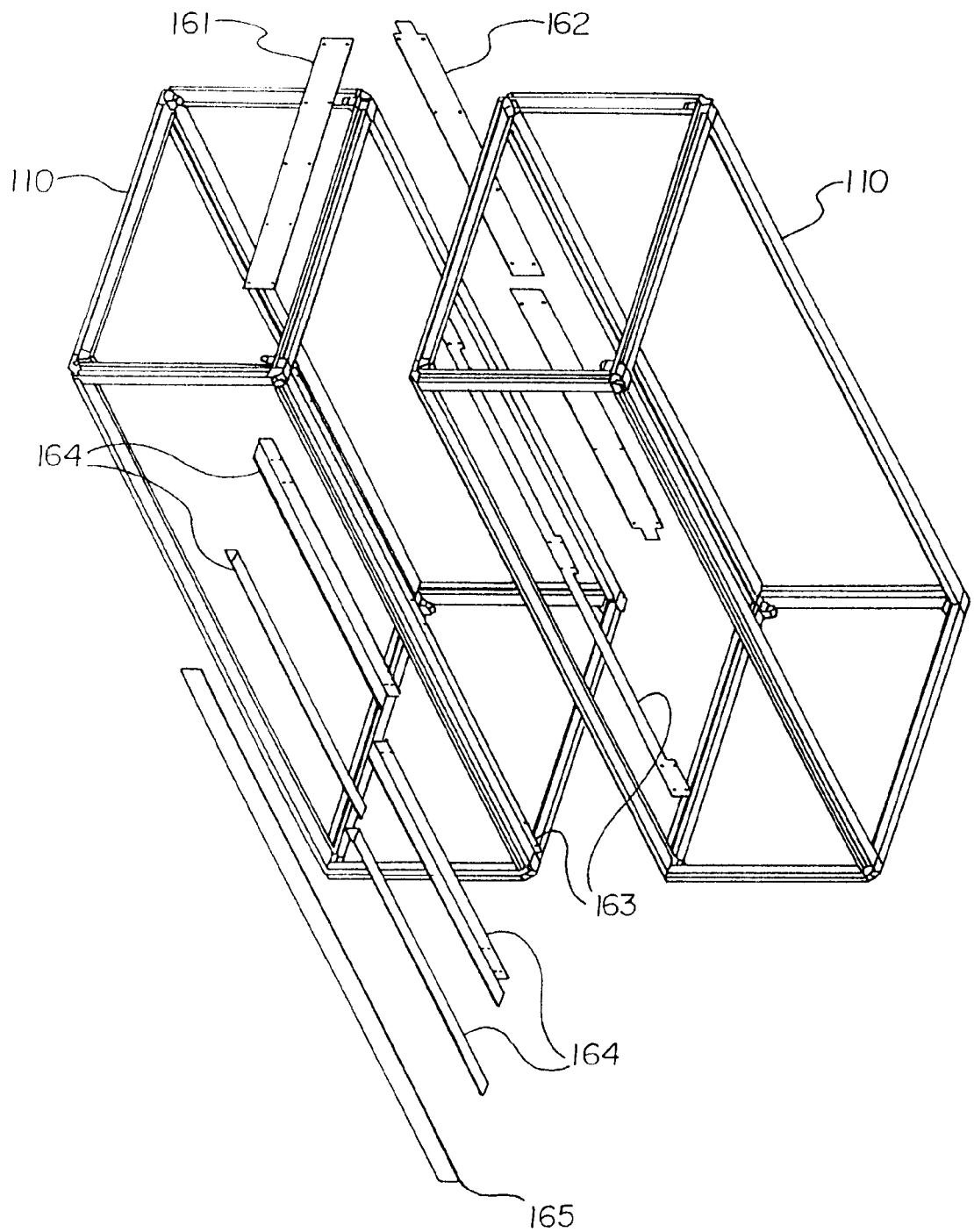
FIG. 4 is an exploded perspective view of the detail of two cabinets for the scalable engine in a side-by-side arrangement.

Referring now to FIGS. 2 and 4, a scalable engine 102 comprising multiple cabinets 110 will be described. In this embodiment, two or more cabinets 110 are combined together to form one scalable engine 102. Preferably, at least one of the side panels 120 of each cabinet 110 is removed to allow secure bolting of frames together and provide convenient access of cabling between adjacent cabinets 110 when the cabinets 110 are positioned in a side-by-side arrangement. Although such a side-by-side arrangement is the more efficient in terms of floor space usage, it should be understood that multiple cabinets 110 may be cabled together with each cabinet arranged in a freestanding manner. Depending upon the layout of a computer room in which the scalable engine 102 is located, two or more rows of cabinets 110 may be considered as part of a single engine 102. Alternatively, one or more circles or partial circles of cabinets 110 may be created as a configuration for a single engine 102 where, for example, the cabinets with engine blades 132 are arranged in an outer circle with the front door panels 124 facing outward and the DASD, SAN and Network cabinets are arranged in the center of the outer circle In one embodiment, up to 1024 engine blades 132 can be organized as part of a single scalable engine 102 comprised of four rows of sixteen cabinets 110 which also includes up to 16 terrabytes of rack mounted disk storage. Depending upon the communication channels used to connect multiple chassis together, up to 1,000 cabinets 110 could be configured as a single scalable engine 100 providing as many as 100,000 servers. Technically, the size of a single scalable engine 102 will be a function of available floor space and is not necessarily limited by the technology utilized to implement the scalable engine 102. Practically, it is anticipated that the size of a single scalable engine 102 will be limited to a manageable number of cabinets 110 that can be arranged in a given computer room environment.

In this embodiment of server 102, the side-by-side arrangement of the cabinets 110 is supplemented with a separation structure 160 between adjacent cabinets 110 that affords easier access for cabling and an air passage for cooling. As shown in FIG. 4, the separation structure 160 preferably is also designed to enhance the aesthetic appearance of the server 102. In this embodiment, the structure 160 includes a top plate 161, removable rear plates 162, a pair of mounting brackets 163, structure 164 defining a light box and a light bar lens 165. Preferably, the light box structure 164 is wired to accommodate a pair of fluorescent bulbs (not shown) to illuminate the light bar lens 165.

Figure 10:
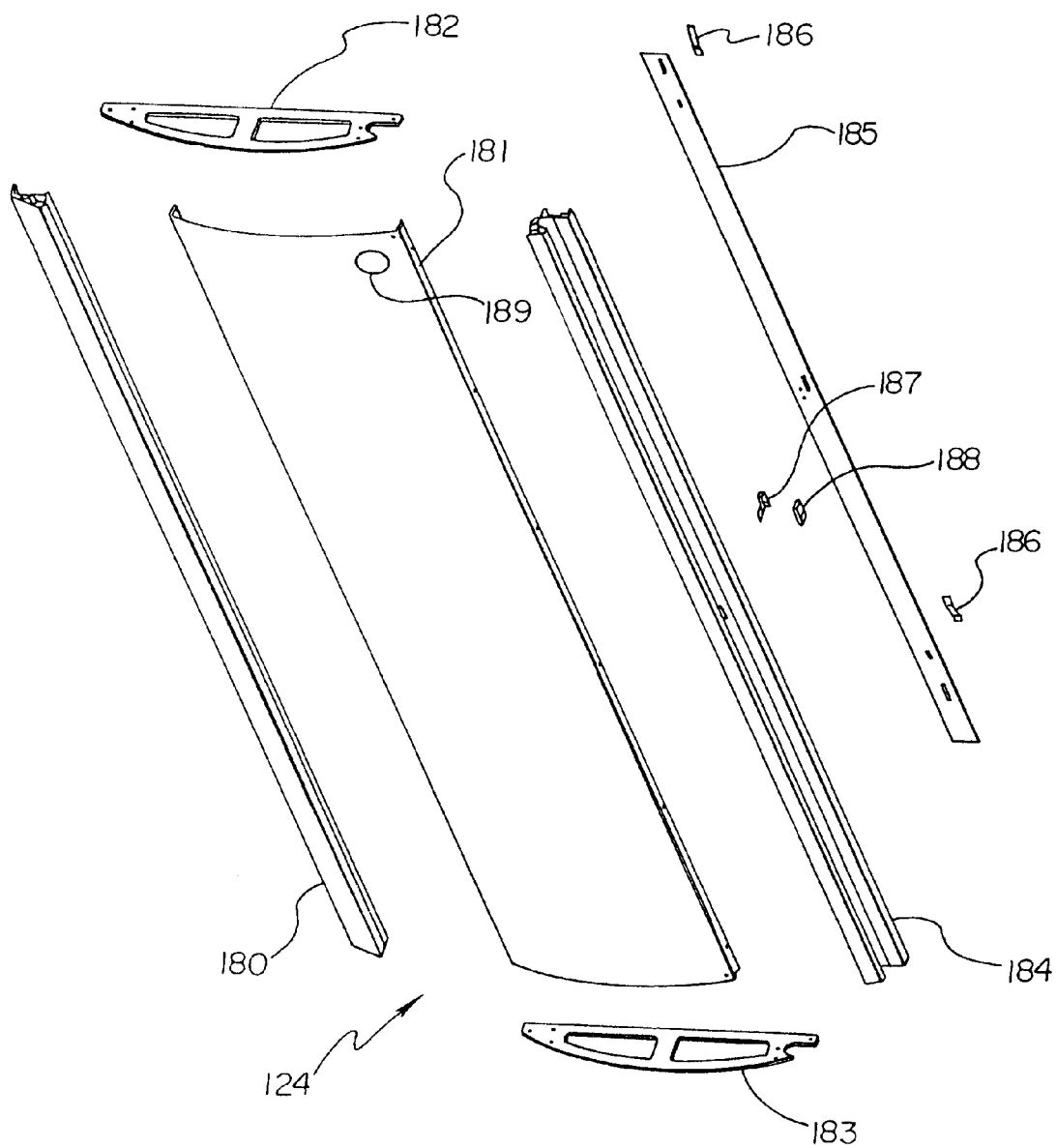
FIG. 10 is an exploded perspective view of the detail of a door for the scalable engine.
Figure 11:
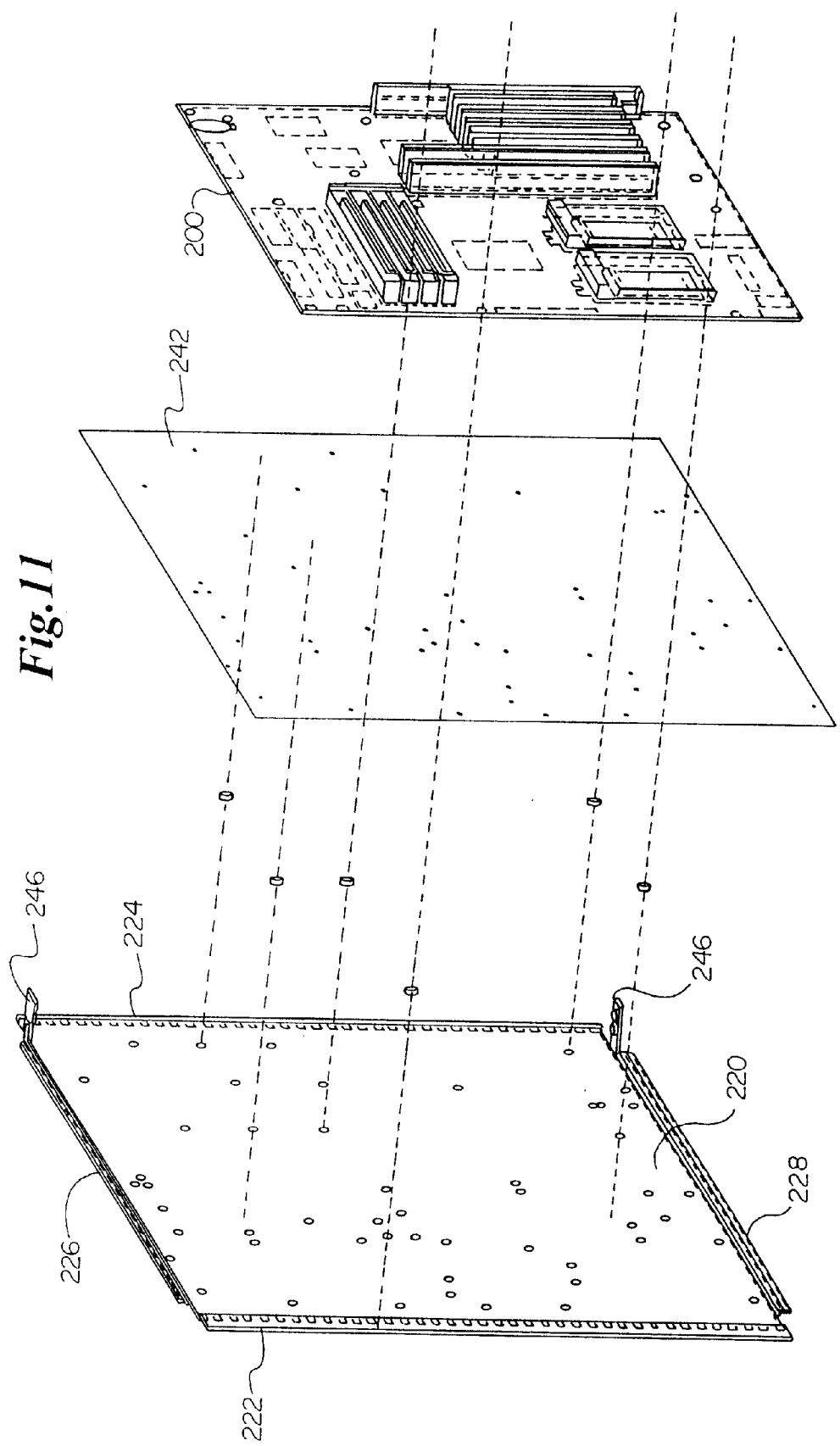
FIGS. 11–14 are exploded assembly views of the various assembly steps for an engine blade.
Figure 12:
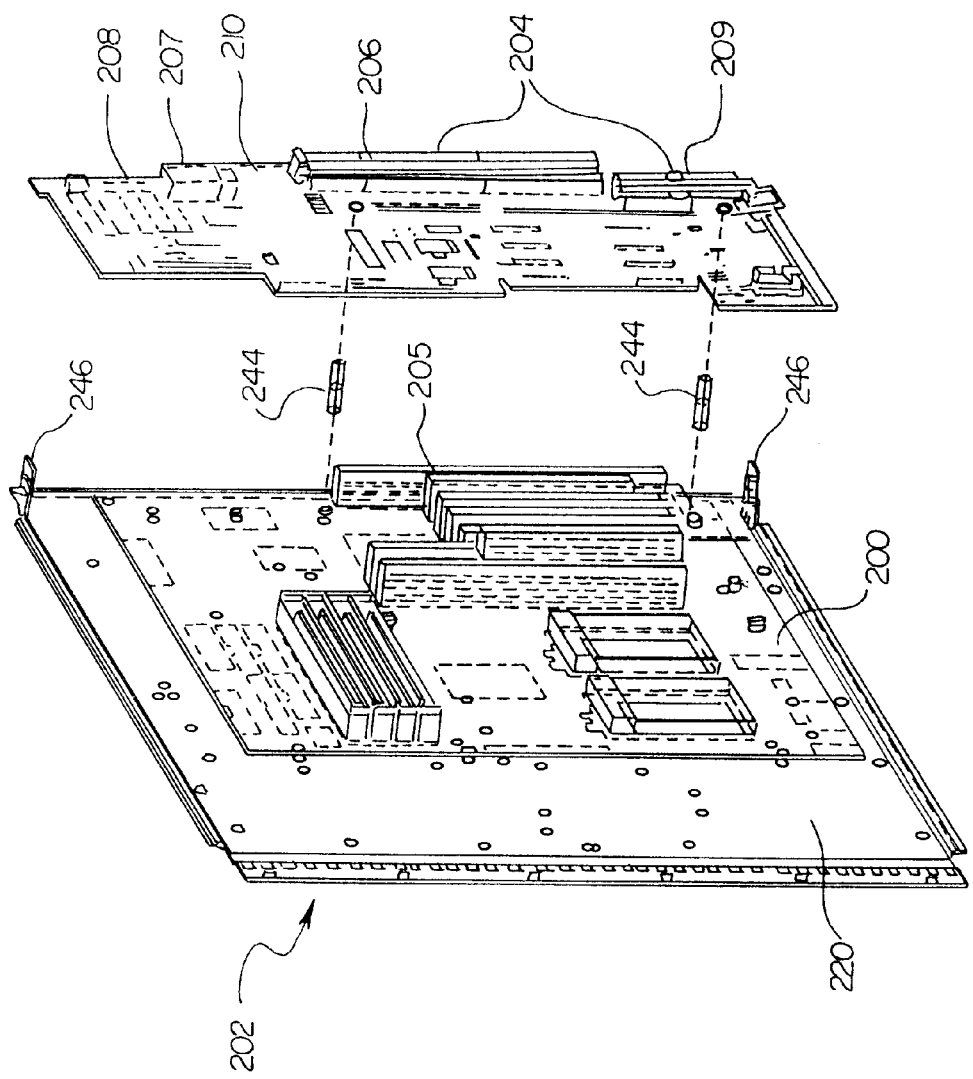

FIG. 10 shows a preferred embodiment of the front door panel 124. An extruded hinge piece 180 is attached to one side of a panel 181. Preferably, the panel 181 is slightly curved and is perforated to allow for air flow and to enable viewing of indicators on the engine blades 132 as shown in FIG. 2. The perforations also add to the distinctive appearance of the door panel 124. A top plate 182 and bottom plate 183 are attached to the panel 181 and provide further support structure. An extruded latch piece 184 is attached to the other side of the panel 181. A plate latch 185 is secured to the cabinet 110 and preferably includes springs 186 to provide a tolerance and give to a latching arrangement that includes a bracket 187 and knob 188. A logo or unit identifier can be attached as shown at 189.

Figure 15:
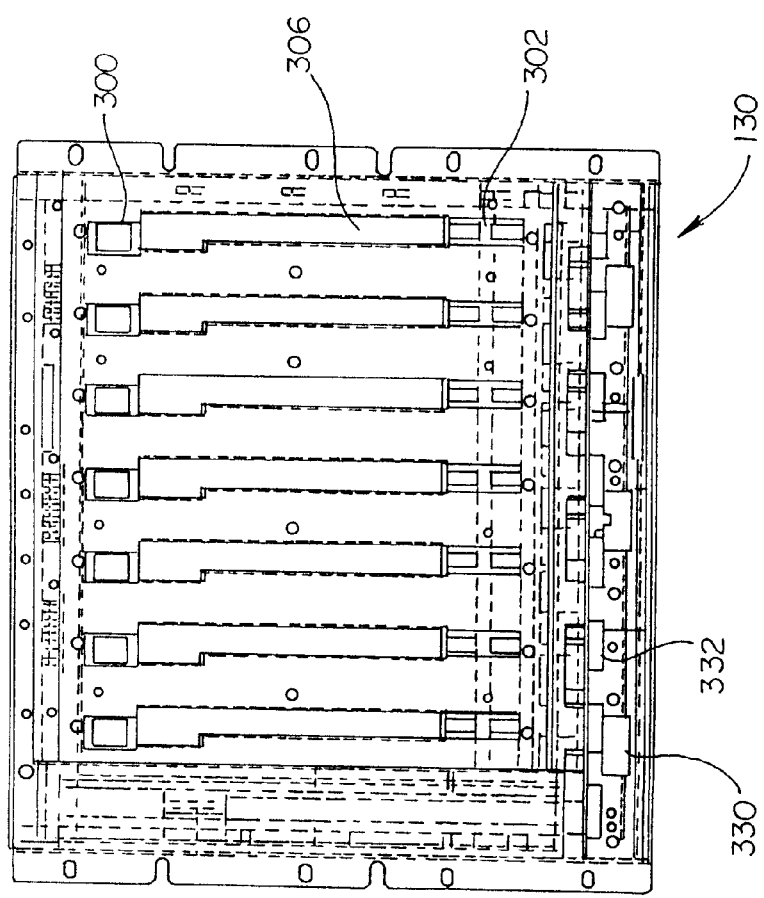
FIG. 15 is an exploded assembly view of the through plane.

Referring now to FIGS. 11–14, a preferred embodiment of an engine blade 132 will be described. Each engine blade 132 includes a motherboard 200 mounted in a common blade carrier structure 202 that provides a uniform mechanical interface to the cabinet 110. The blade carrier structure 202 is removably positioned in the front side 112 of the cabinet 110. As will be described in further detail, a group of connectors 204 are positioned along a rear edge of the engine blade 132. At least a first portion of these connectors 206, 207 will operably mate with an interface card connector 136 (FIG. 16) on an interface card 134. Preferably, a second portion of these connectors 208, 209 will mate with through plane connectors 300, 302 (FIG. 15).

The common blade carrier structure 202 is arranged to accommodate a planar surface of a motherboard 200 in a generally vertical orientation and is sufficiently oversized to accommodate the largest motherboard 200 with additional space reserved toward the front of the blade carrier structure 202 to accommodate an internal hard drive or other local peripheral device if desired. In one embodiment, the blade carrier structure 202 has dimensions of 16.5" long by 12" high. In another embodiment adapted to support a quad processor motherboard 200, the blade carrier structure has dimensions of 16.5" long by 13.75" high.

Preferably, each motherboard 200 is a commercially available motherboard that includes at least one PCI connector 205. Each engine blade 132 includes a host board 210 connected to the PCI connector 205 and oriented with a planar surface of the host board 210 generally parallel to the planar surface of the motherboard 200. In this embodiment, the host board 210 provides the group of connectors 204 on a rear edge of the host board 210. The use of a specially designed host board 210 with a standard PCI connection allows the engine blade 132 to accommodate a number of different commercially available motherboards 200 in the blade carrier structure 202 without requiring any modification to the motherboard so long as all of the different motherboards 200 have dimensions of their planar surface that are capable of being mounted in the blade carrier structure 202. Examples of commercially available motherboards 200 that can be used with the engine blade 132 of the present invention include Pentium® motherboards, Sparc® motherboards and Alpha® motherboards. This feature allows a single engine 100 to accommodate a first engine blade 132 that has a first type of motherboard 200 with a first type of processor and a second engine blade 132 that has a second type of motherboard 200 with a second type of processor that is different than the first type of motherboard 200 and first type of processor in the same cabinet 110, or even in the same chassis assembly 128.

In one embodiment, there are three types engine blades 132. The first type of engine blade 132 is optimized as a front-end server that hosts Web applications interfacing with consumers to respond to inquiries. The second type of engine blade 132 is a database blade optimized to search and mine the information warehouse of a customer. A third type of engine blade 132 is optimized to serve video streaming and graphic imaging. Any of these three types of engine blades 132 could utilize any type of motherboard, but the flexibility of the present invention allows for best-of-breed technology to be used for a given application without requiring that all of the technology be provided by a single manufacturer or run a single operating system, for example. In addition to being able to take advantage of continuing improvements in the technology for the motherboards, it will also be recognized that the present invention is intended to accommodate changes in the design of the busses, the host board and the I/O backplane as newer standards and technology evolve for these components as well.

Figure 13:
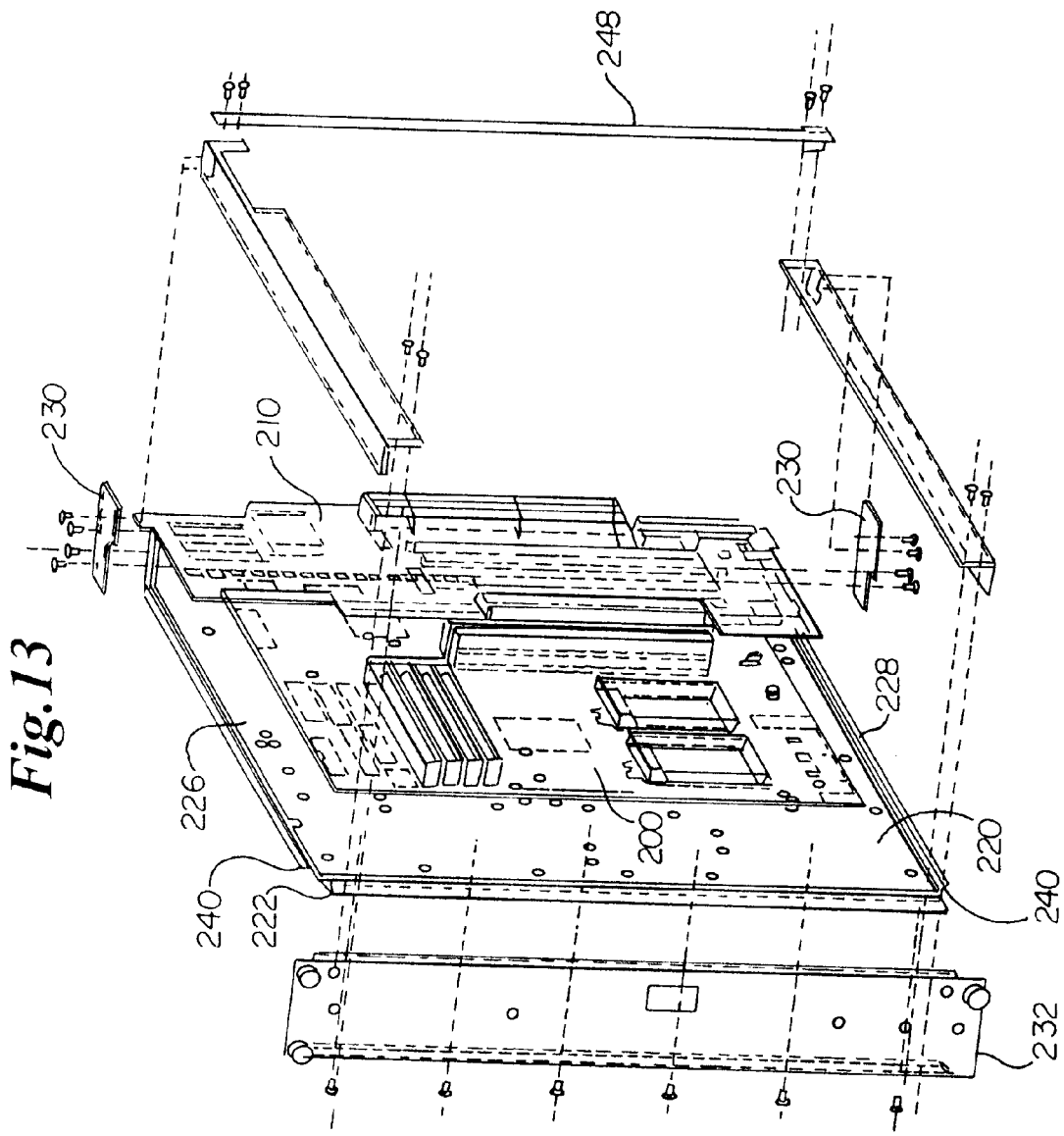
Figure 14:
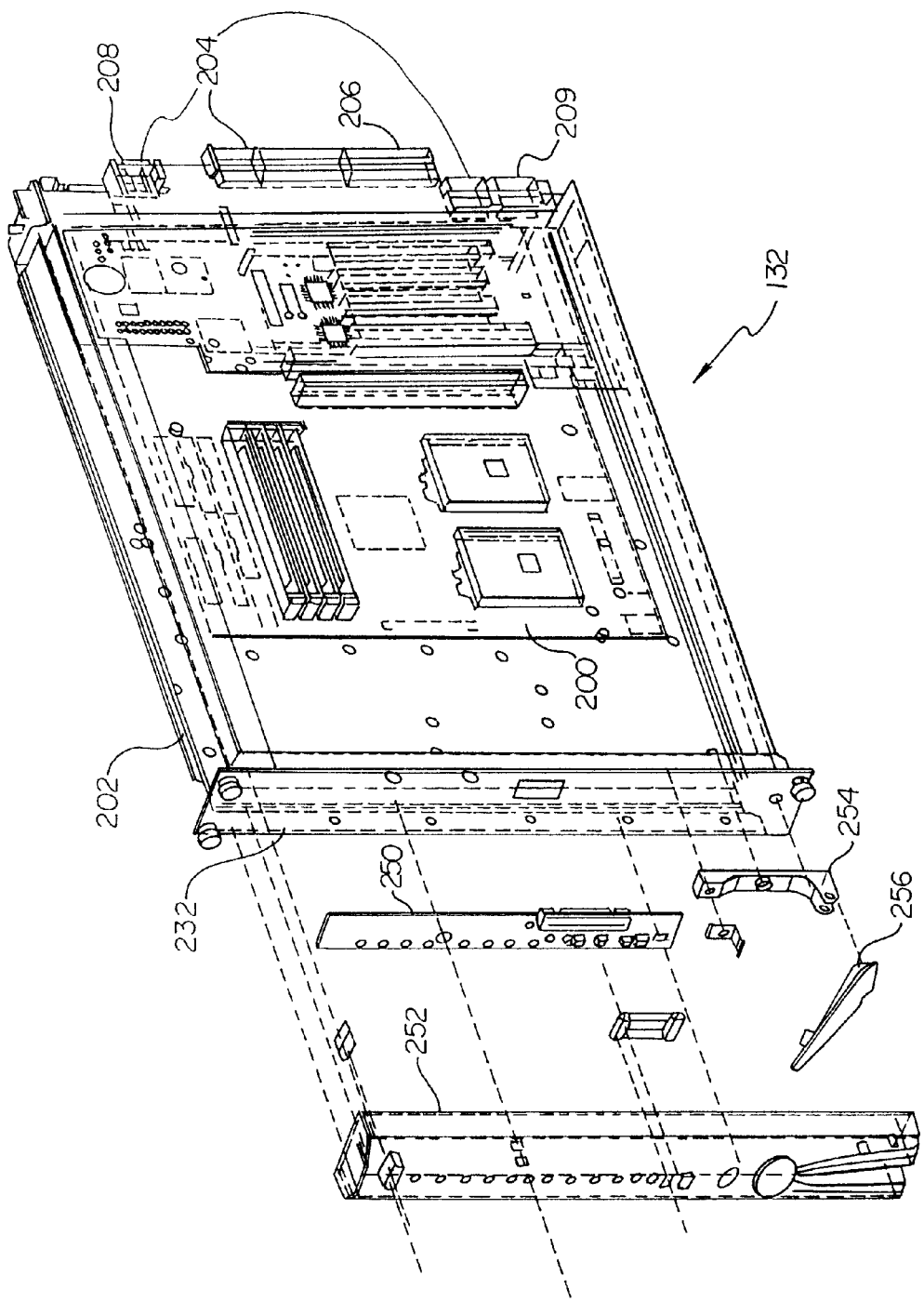

In a preferred embodiment as shown best in FIG. 13, the blade carrier structure 202 includes a base plate 220 having a front edge 222, a rear edge 224 and a pair of side edges 226, 228. A pair of supports 230 are operably attached to each side of the base plate proximate the rear edge 224 of the base plate 220, preferably by screws or the like. The supports 230 define a width of the blade carrier structure 202 that is larger than a distance between the planar surfaces of the motherboard 200 and the host board 210 and extends to a distance that is higher than a highest one of the components mounted on the host board 210. A front plate 232 is operably attached at one side along the front edge 222 of the base plate 220, preferably by screws or the like. The front plate 232 has a width substantially equal to the width of the blade carrier structure 202 as defined by the supports 230. A pair of rails 234, 236 are operably attached at a front end to the front plate 232 and at a rear end to one of the pair of supports 230, preferably by screws or the like. A projection defined along the pair of side edges 234, 236 is adapted to mate with a pair of tracks 235 (FIG. 3) in the sub-chassis 129 to provide the uniform mechanical interface to the cabinet 110. The base plate 220 is preferably metal that is grounded to the cabinet 110 to serve as an isolation for electrical interference. An insulation sheet 242 is positioned between the base plate 220 and the motherboard 200 and oriented parallel to the planar surfaces of the motherboard 200 and the host board 210. For additional support, the host board 210 is supported by standoffs 244 and a pair of projections 246. A cross member 248 provides additional dimensional stability to the rear of the blade carrier structure 202.

In a preferred embodiment, the face plate 232 is provided with a series of indicator lights and actuator buttons in a control/status panel 250 that extend through a decorative cover plate 252. A latch assembly 254 uses a latch 256 to cooperate with a projection below the bottom track in the sub-chassis 128 to urge the connectors 204 into mechanical and electrical connection with their corresponding mating connectors and removably secure the engine blade 132 in the sub-chassis 129. Wires (not shown) connect the control/status panel 250 to connectors on the host board 210.

Figure 16:
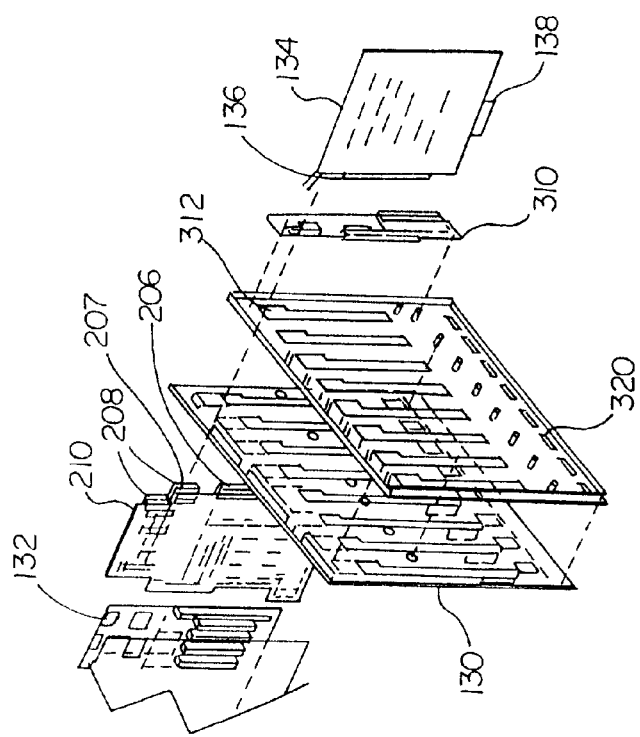
FIG. 16 is a front view of an assembled through plane.

Referring now to FIGS. 15 and 16, the details of the through plane 130 will be described. The through plane 130 is mounted in the sub-chassis 129 between the front side 112 and the rear side 116. Preferably, a separate through plane 130 is provided for each sub-chassis 129 with wire connections between provided as required between adjoining through planes 130 in the same chassis assembly 128 or cabinet 110. It will be understood that a single through plane 130 could be provided for the entire cabinet 110 as an alternative, or that separate through planes 130 could be provided for each chassis assembly 128. Preferably, at least two through plane connectors 300, 302 are provided for each engine blade 132 that is housed in the sub-chassis 129 that mate with the second portion 208, 209 of the group of connectors 204 on the rear edge of the host board 210. The connector 300 includes connections for power that is delivered to the through plane 130 from the AC/DC board 148 and mates with connector 208. The connector 302 includes connections for the control peripheral signals common to each of the plurality of engine blades and mates with the connector 209. In one embodiment, the connector 302 includes a set of switched connections that enable the engine blades 132 to share common peripherals such as console or boot drives and a second set of unswitched connections that allow an operator to directly connect a dedicated peripheral to a particular engine blade 132.

FIG. 15 shows a set of dedicated peripheral connections 304 that are mounted on the rear of the through plane 130 and allow for direct access to the peripheral connections of a particular engine blade 132 from the rear side 114 of the cabinet 110. To allow for the ability to update power and peripheral connectors without the need to replace the through plane 130, it is preferred that connectors 300, 302 and 304 can be unmounted and new connectors attached by having the connectors screwed onto the through plane 130, for example.

At least one aperture 306 is defined in the through plane 130 corresponding to each of the through plane connectors 300, 302. The apertures 306 permit the first portion 206, 207 of the group of connectors 204 on the rear edge of the host board 210 to be accessed from the rear side of the sub-chassis 128. This first portion 206 of the group of connectors 204 include connections for I/O signals to operably connect to the corresponding interface card 134 for that engine blade 132. It is preferably one or more high density signal connectors such as available from AMP. As will be described, in a preferred embodiment this is accomplished via a separate I/O backplane 310 that allows the interface card 134 to remain plugged into the rear side of the I/O backplane 310 when the engine blade 134 is removed and a portion 207 of the group of connectors 204 provides power to the I/O backplane 310. Alternatively, the interface cards 134 could be housed in a mechanical housing which secures the interface cards 134 in place within the cabinet 110 such that engine blades 132 could be directly plugged into the interface cards 134. This embodiment, however, does not as easily allow for the advantages of doubling up interface cards 134 per engine blade 132. There are also issues with respect to the routing of the I/O signals through the I/O backplane 310 that have other advantages.

In a preferred embodiment, the through plane 130 is mechanically attached by screws, welds or similar mechanisms to a metal midplane sub-frame 320 which also contains apertures 312 corresponding to apertures 310. Preferably, the midplane sub-frame 320 is mechanically attached to the sub-chassis 129 within the chassis assembly 128. The through plane 132 and midplane sub-frame 320 preferably allow for the support and connection of the fan trays 140 via electrical power connections 330 and control and sensor connections 332.

Figure 20:
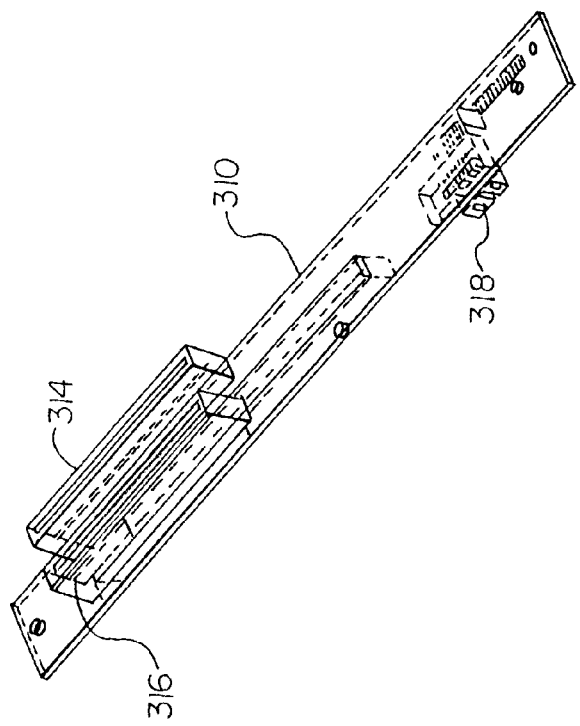
FIGS. 18, 19 and 20 are top, side and perspective views of a typical I/O backplane.
Figure 18:
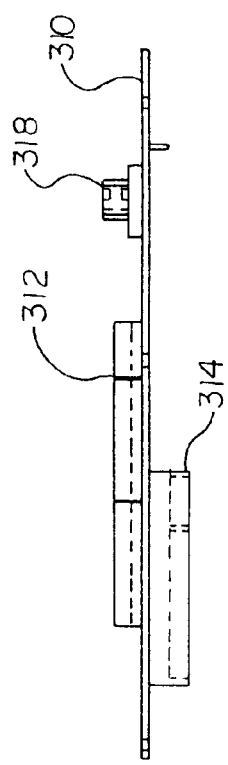
Figure 19:
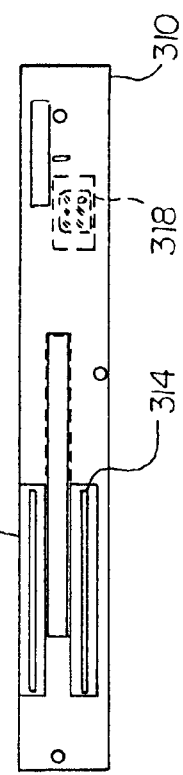

Referring to FIGS. 18, 19 and 20, the I/O backplane 310 will be described. In this embodiment, the I/O backplane 310 provides one connector 312 that connects with the first portion 206 of the group of connectors 204 on the host board 210. Some number of standard PCI connectors 314, 316 on the rear side of the I/O backplane 310 provide plug-in connections for a similar number of separate standard interface cards 134. A separate power connector 318 is provided on the front side of the I/O backplane 310 that extends through an upper portion of the aperture 306 in the through plane 130 to connect to a power connector 207 on the host board. In this way, either the engine blade 132 or interface card 134 can be disconnected from power by the power management circuitry on the host board without the need to interrupt power supplied to the other.

In one embodiment, in routing the signals through the I/O backplane 310 the generic PCI signals, minus all side band signals (signals which make each PCI slot unique) are routed up the PCI riser from the mother board 200 and across the host board 210. Each PCI slot's side-band signals are also routed using low profile plug boards straight across the host board 210 as well. These lines are basically equal length and routing them is fairly straightforward until the signals reach the high density connector 206 at the rear edge of the host board 210. The placement of the pins on the host board 210 that connect to the high density connector 206 must be chosen to insure equal lengths of the PCI signals with respect to their destination on the PCI connectors 314 and 316. The routing of the side band signals is done such that the PCI slot furthest from the host board 210 will be routed closest to the high density connector 206 and so on until the PCI slot closest to the host board 210 is routed to the furthest pins on the high density connector 206. In this embodiment, ISA bus signals are routed next to the PCI signals and over the through plane 130 to the I/O backplane 310.

Although the present invention has been described in terms of I/O backplanes that are designed for only a single aperture 306, it is also possible to construct an I/O backplane that would span multiple apertures 306 and distribute the PCI and other I/O signals along an arbitrated bus path across this larger I/O backplane. Alternatively, the host board and I/O backplane may use a PCI bridge such that a single PCI slot on the motherboard can be used to generate as many PCI signals on the I/O backplane as a necessary, regardless of the number of PCI slots on the motherboard.

Although the present invention has been described in terms of engine blades 132 that are arranged with one blade 132 per aperture 306, it is also possible to construction engine blades and blade carrier structures that are wider in that one such wider engine blade may occupy two or more apertures 206. This embodiment allows for each engine blade 132 to be comprised of multiple processors, or even multiple motherboards per engine blade, while still maintaining the advantages of the common blade carrier structure and the through plane as described.

Figure 21B:
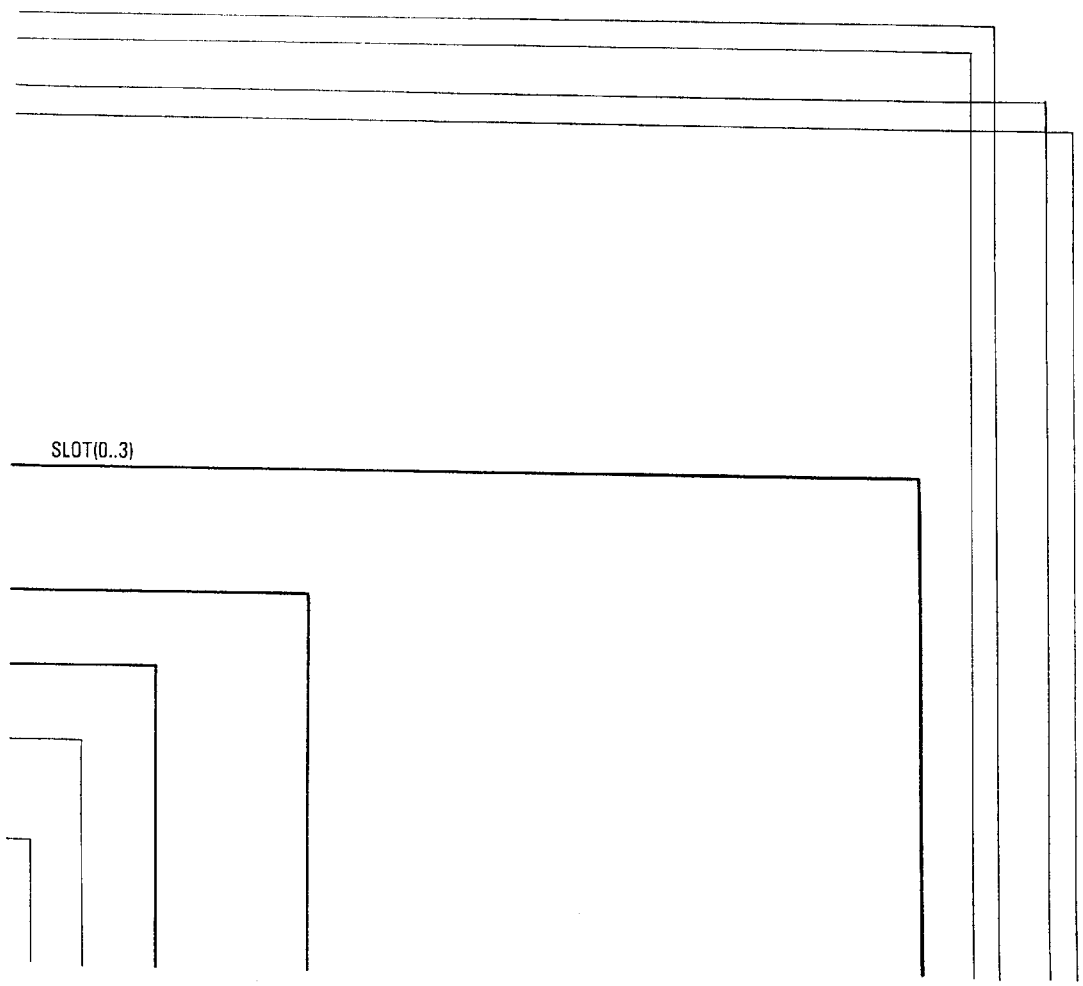
Figure 21C:
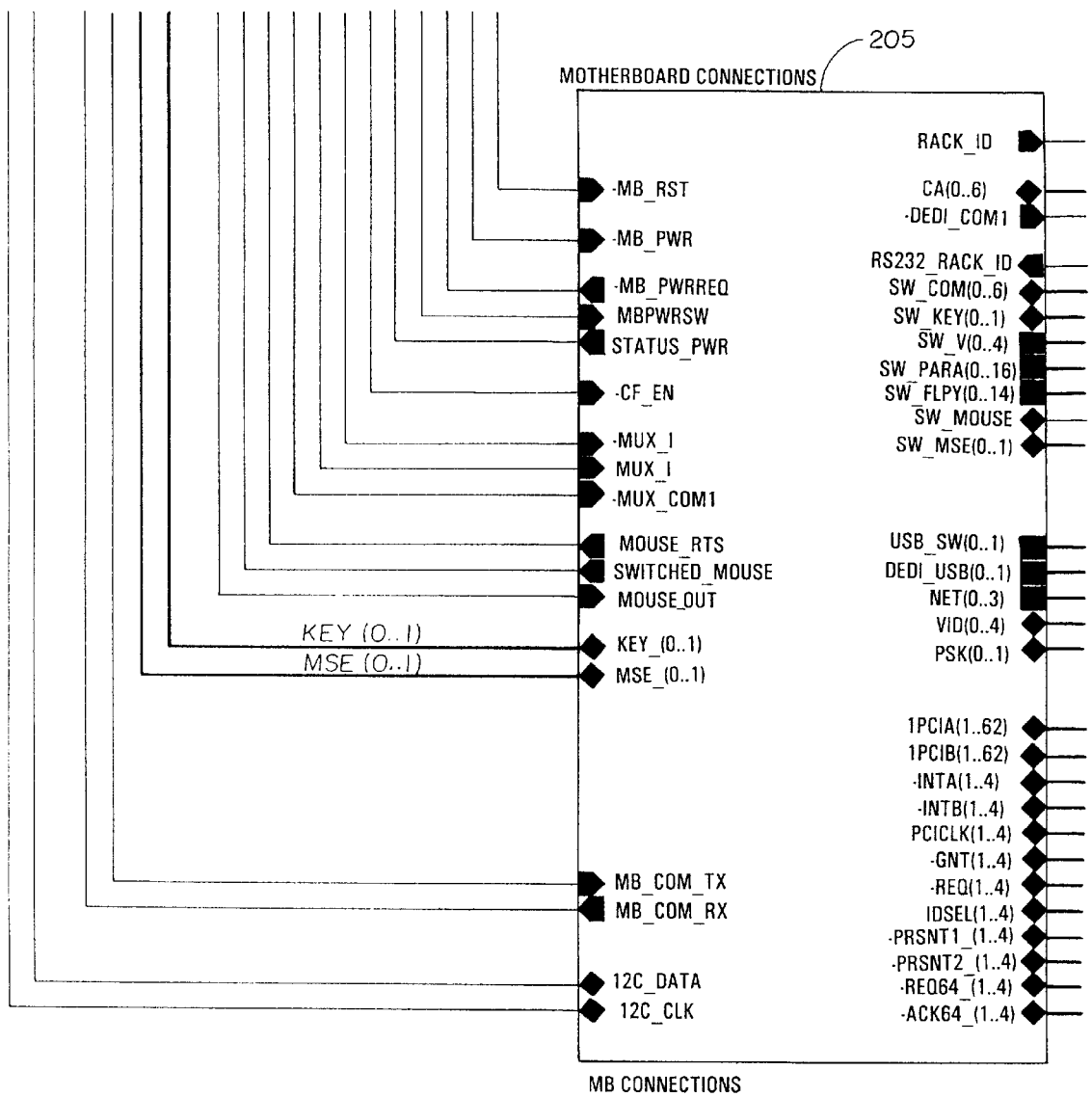
Figure 21D:
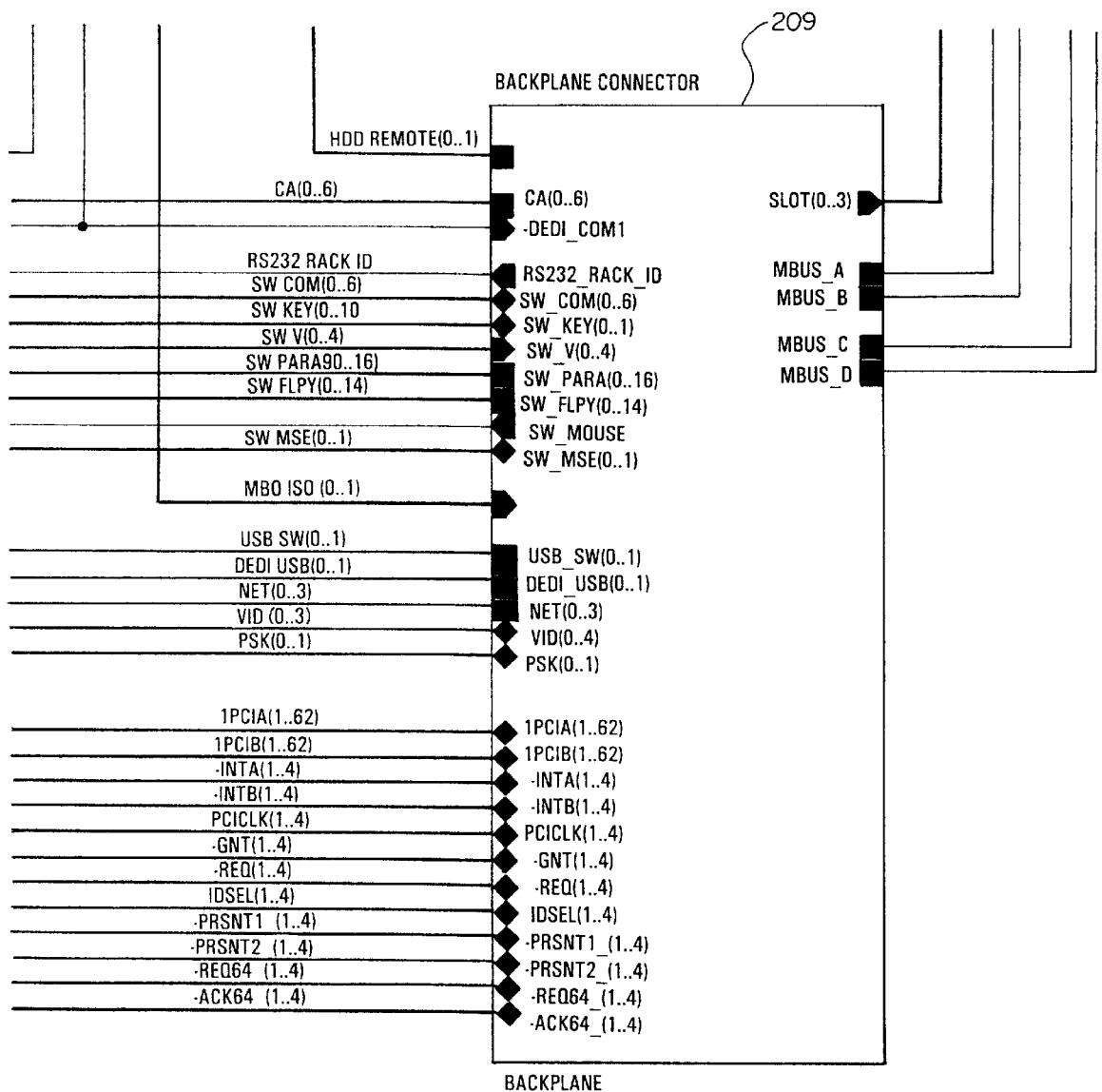
Figures 23, 23A:
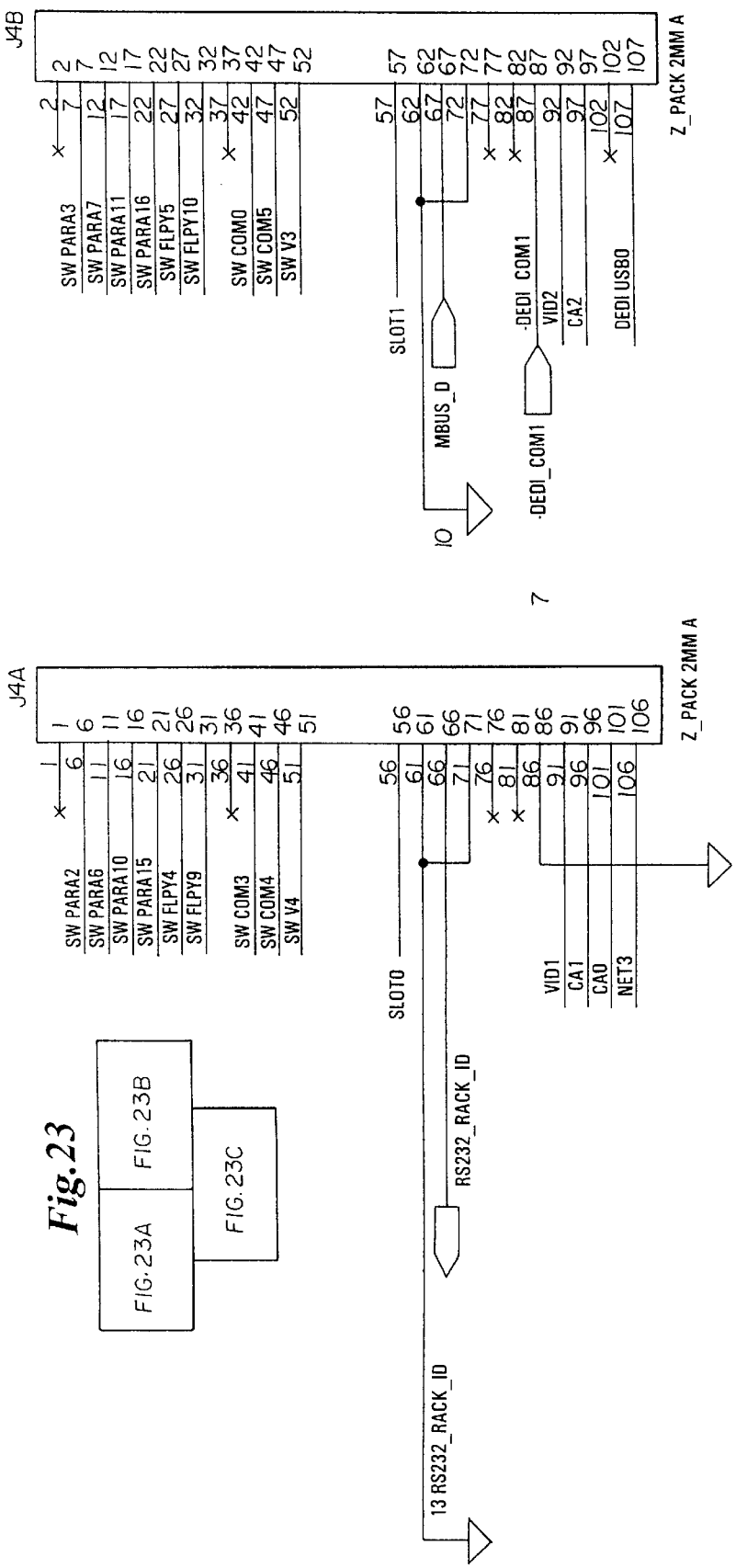
Figure 23B:
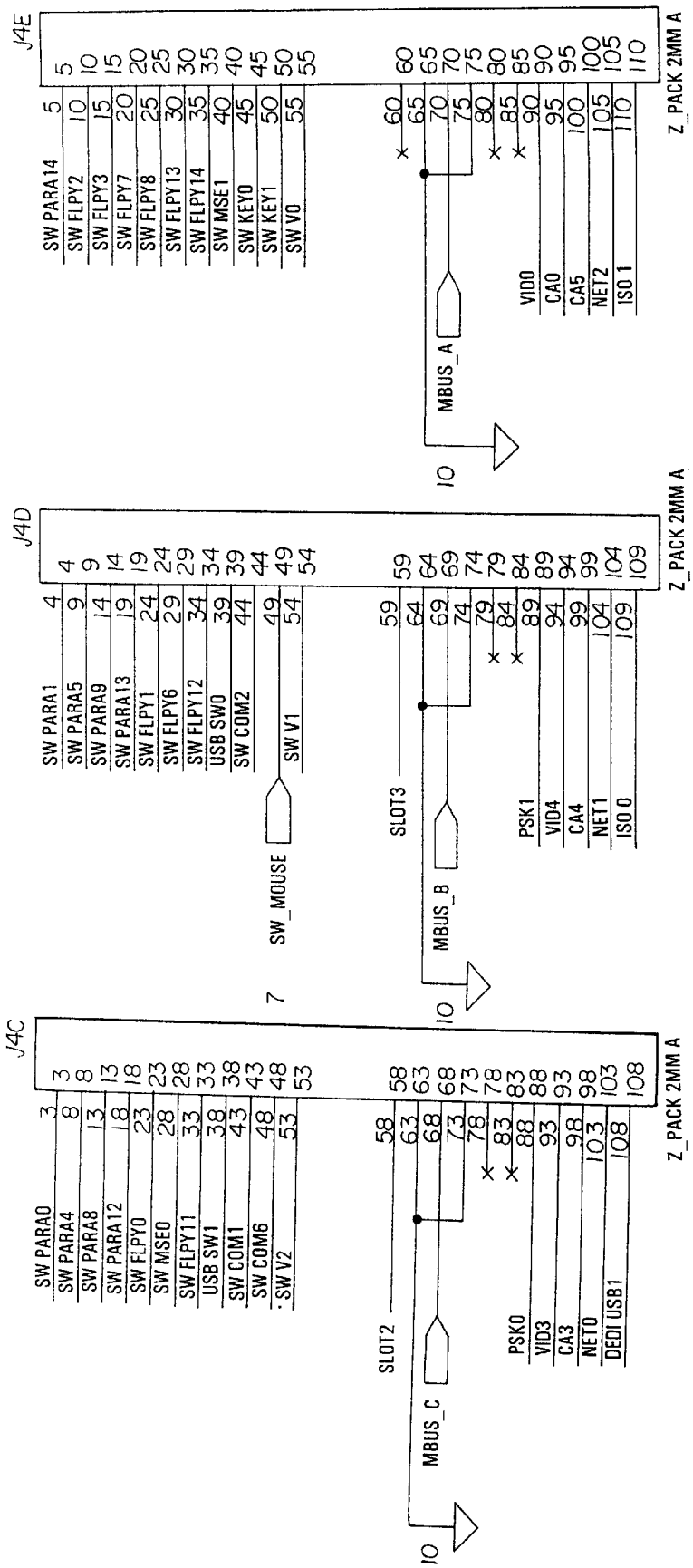
Figure 23C:
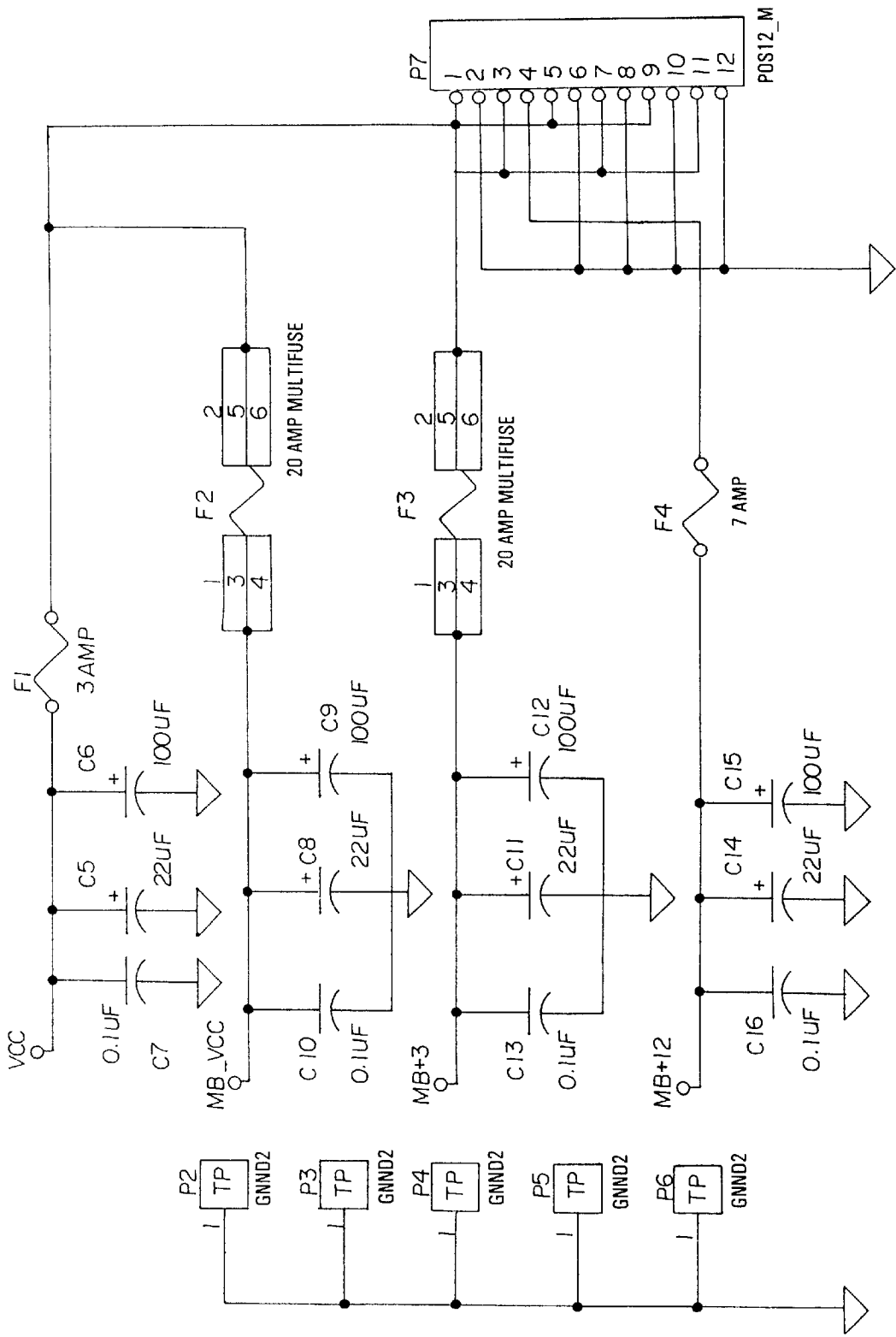
Figure 24C:
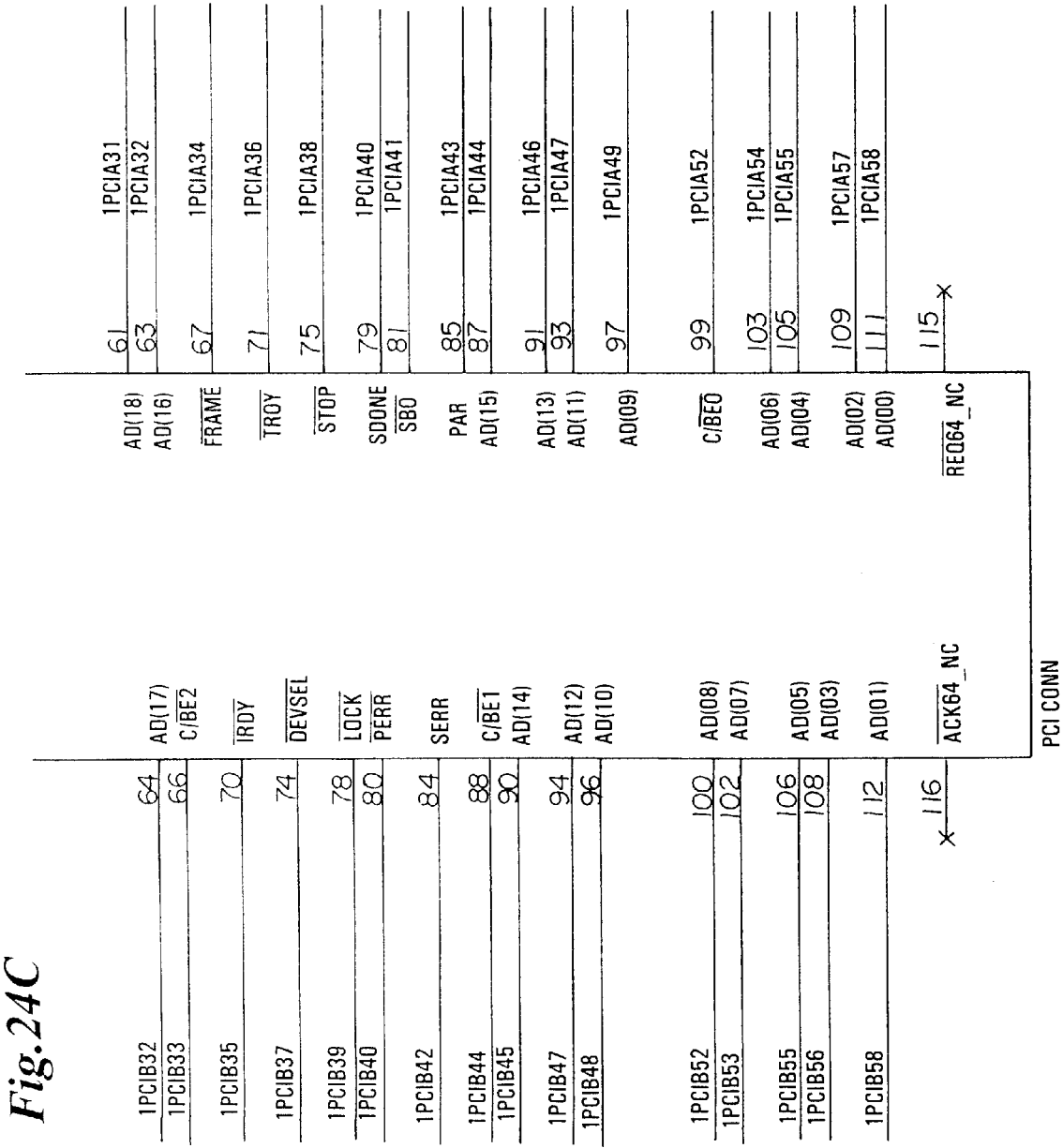
Figure 24D:
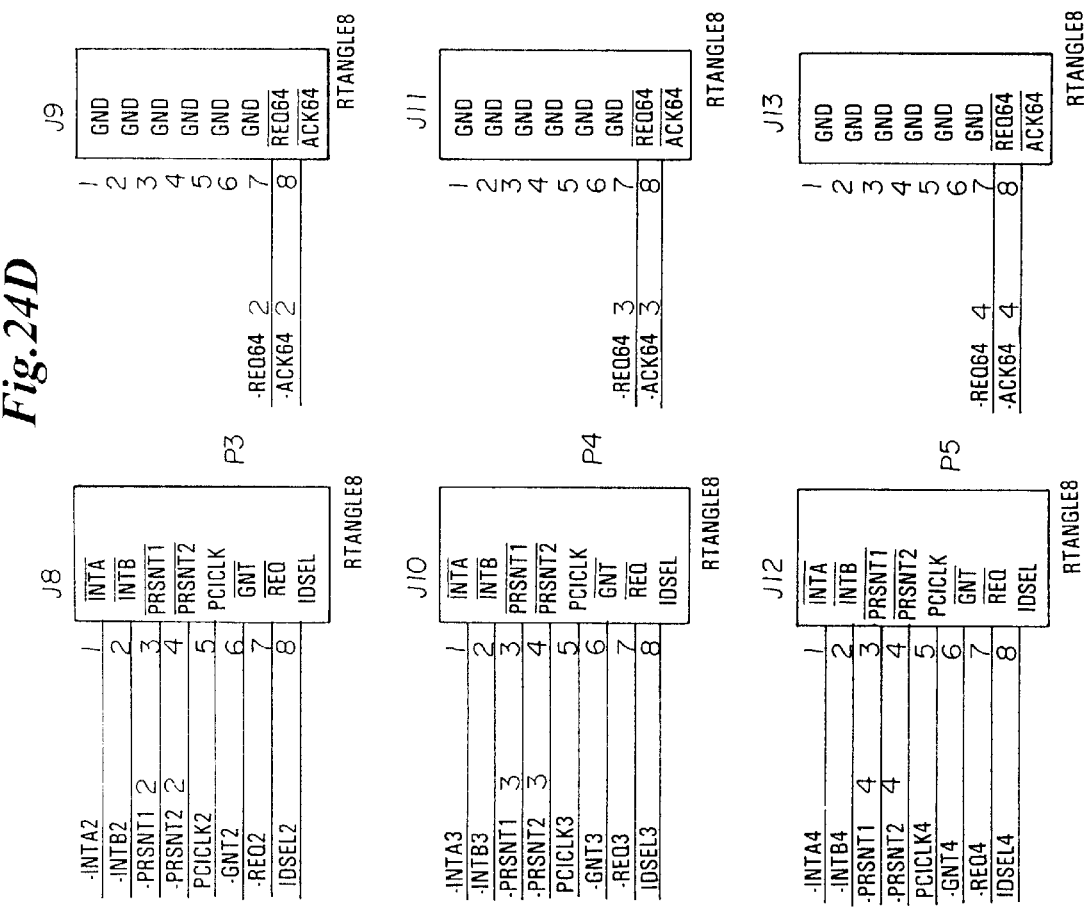
Figure 25:
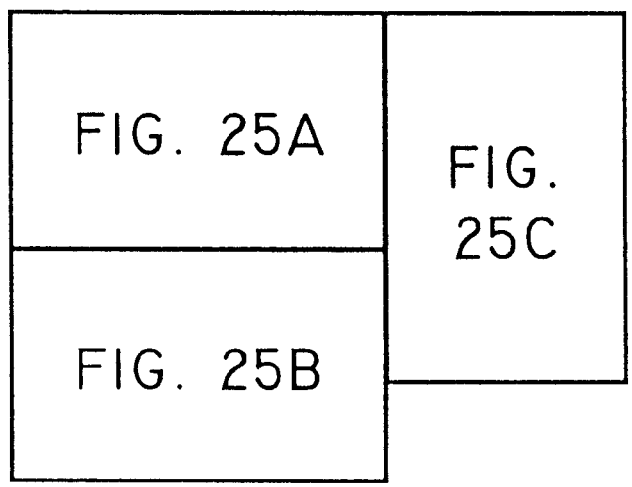
Figure 26:
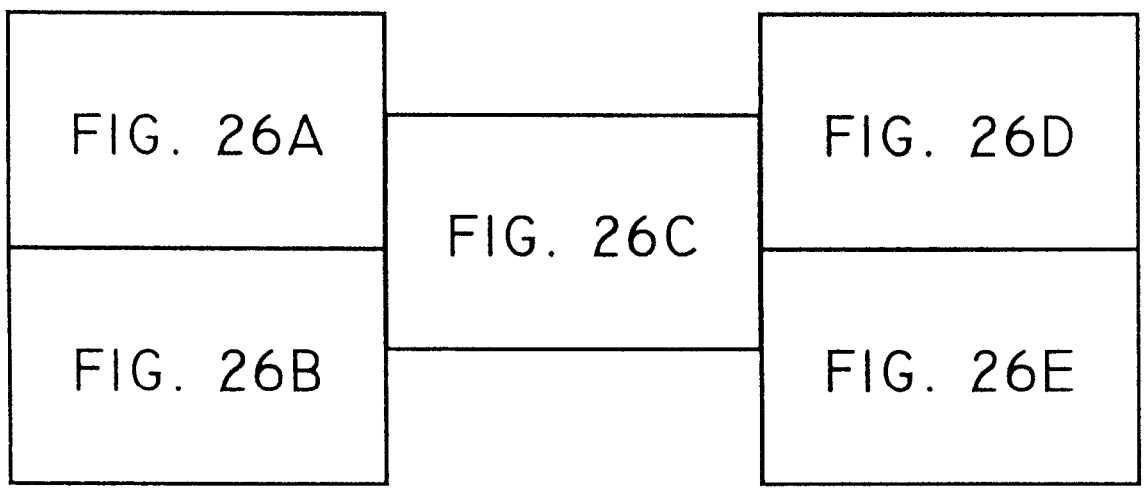
Figure 25A:
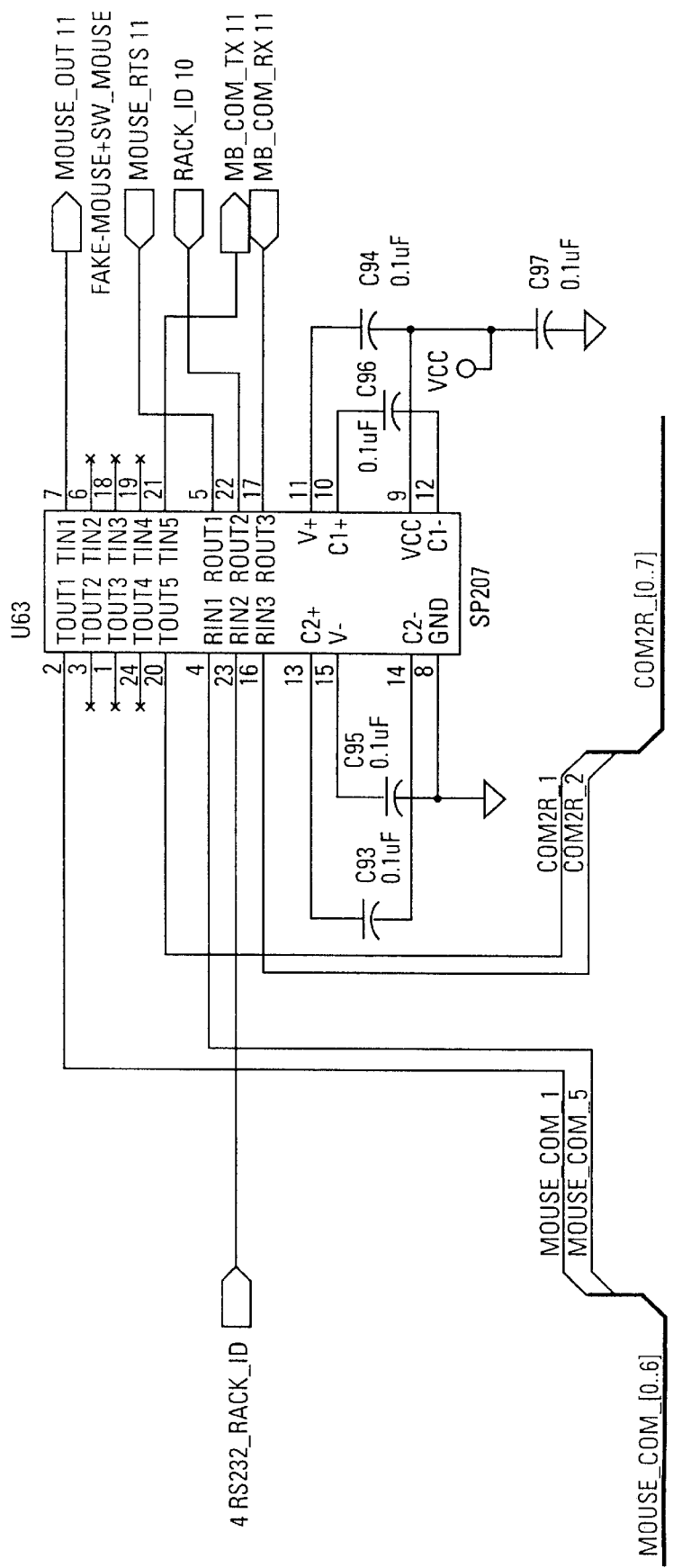
Figure 25B:
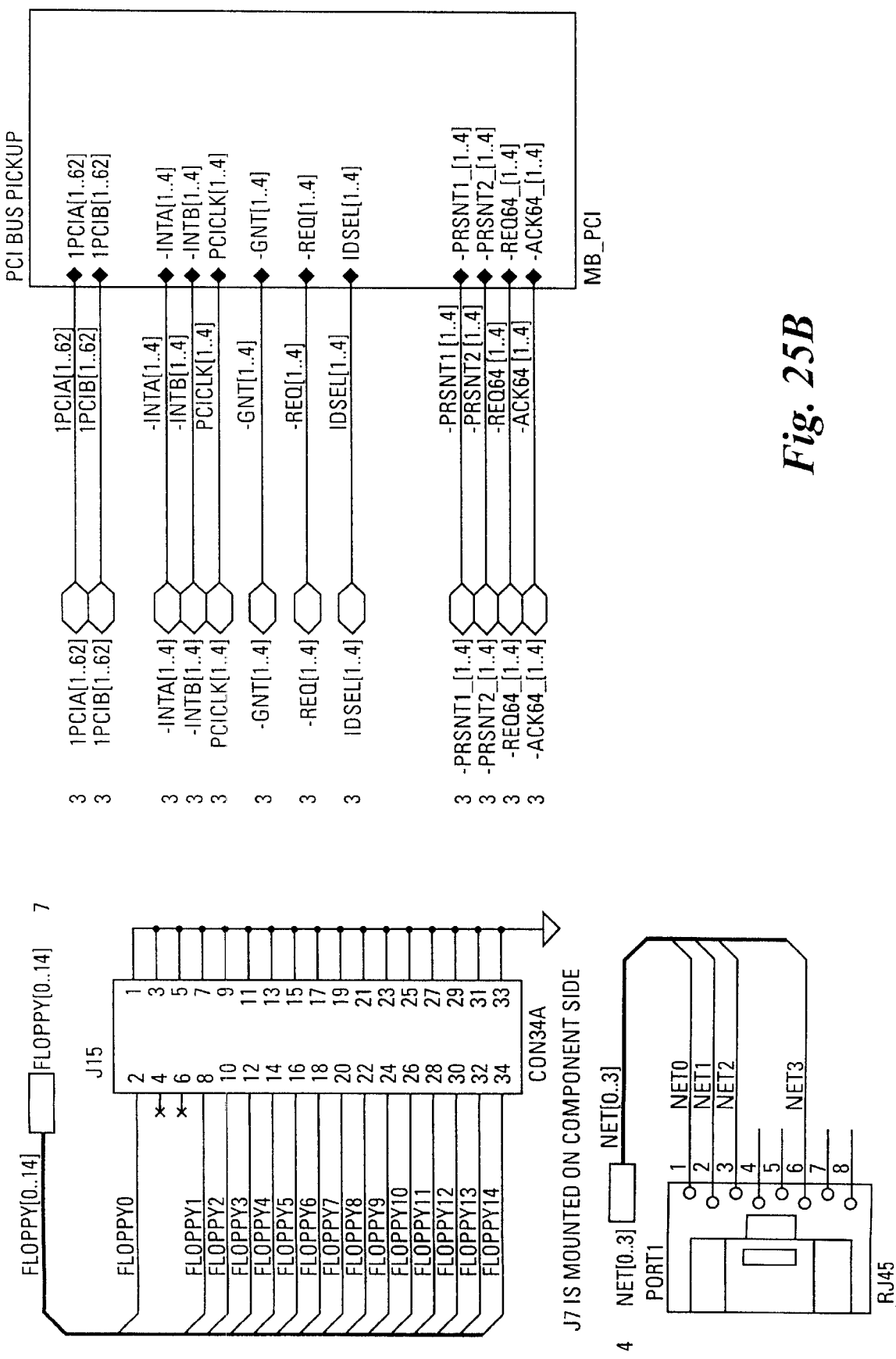
Figure 26A:
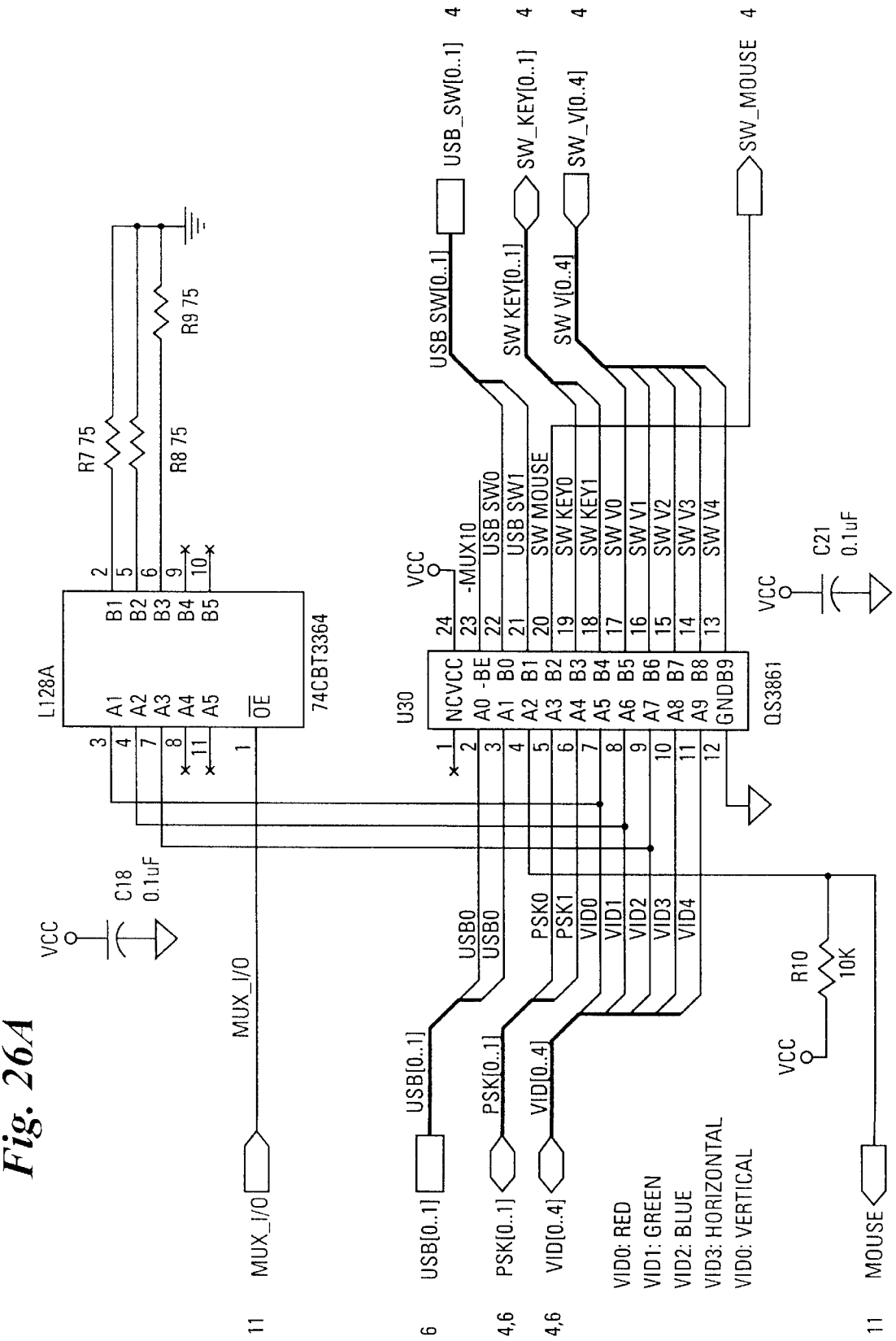
Figure 28:
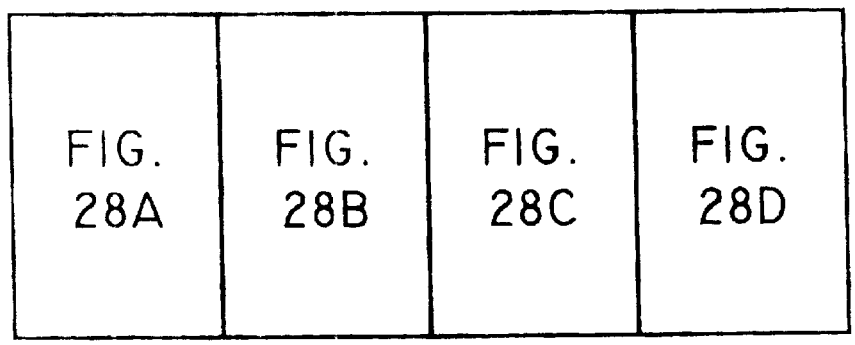

Referring now to FIGS. 21–31, the schematic details of a preferred embodiment of the connectors 204, host board 210 and I/O backplane 310 will be presented. FIG. 21 shows an overview of the signal routing among the management processor 260 on the host board 210, the motherboard PCI connector 205 and the backplane signal connector 209. FIGS. 22 and 23 show the detailed signal routing of the PCI bus signal and other signals to the I/O backplane 310 via connector 306 consistent with the principals previously described for how the PCI signals need to be routed. FIG. 24 shows the detailed routing of how the PCI signals are picked up from the mother board 200 via connector 205. FIG. 25 shows an overview of the routing of the peripheral signals from the motherboard 200 to the host board 210 and onto the connector 209. FIG. 26 shows the details of how these peripheral signals are switched to implement the shared peripheral I/O arrangement as previously described. FIGS. 27 and 28 show the details of how the peripheral signals are routed from the motherboard 200 to the host board 210 and onto the connector 209. FIG. 31 shows the preferred embodiment of the management bus interface.

Figure 29:
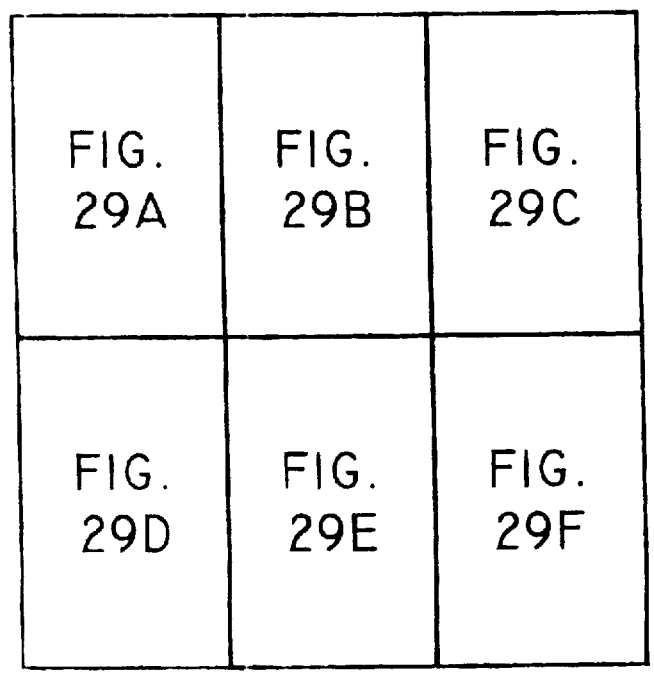
Figure 28A:
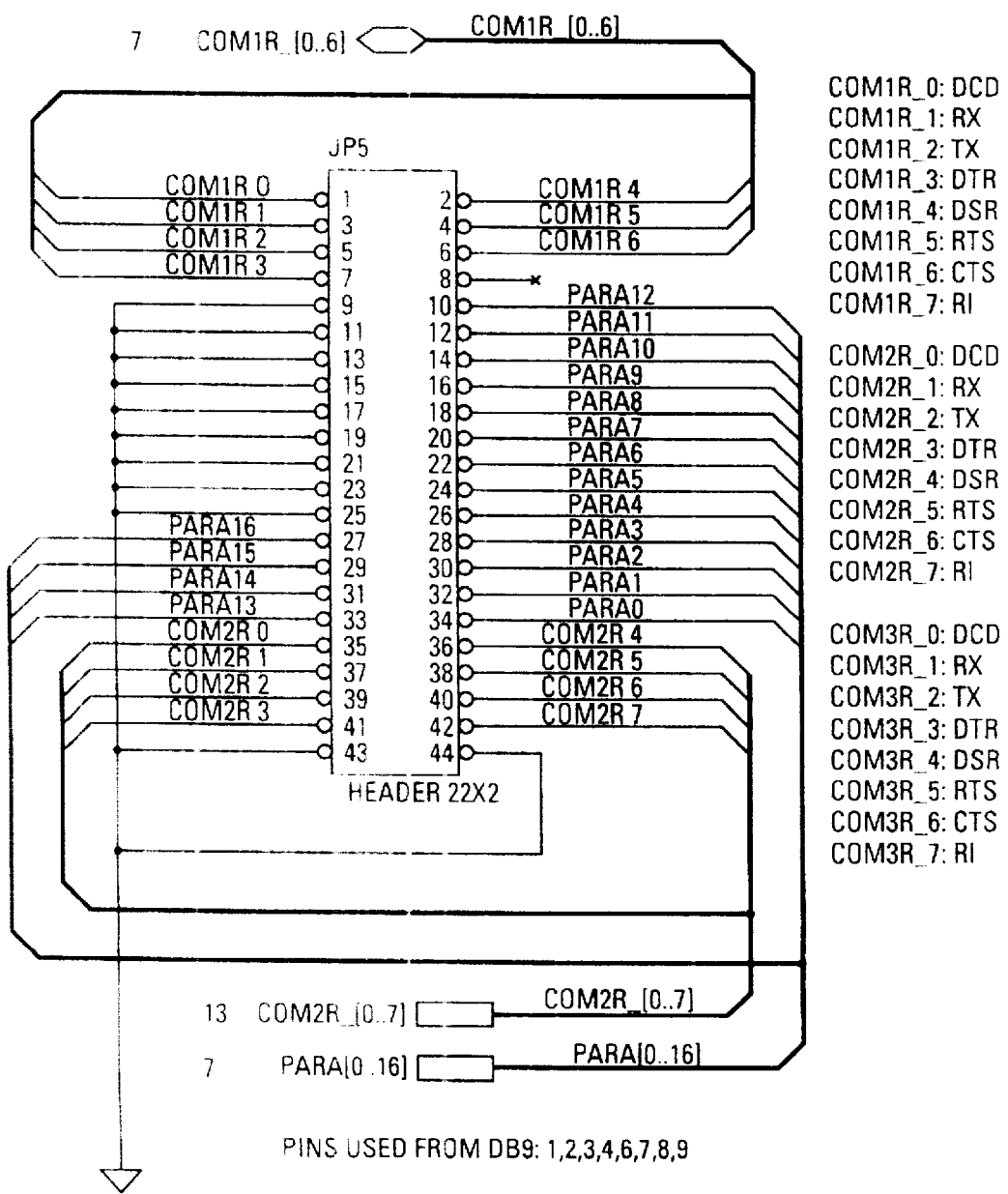
Figure 28C:
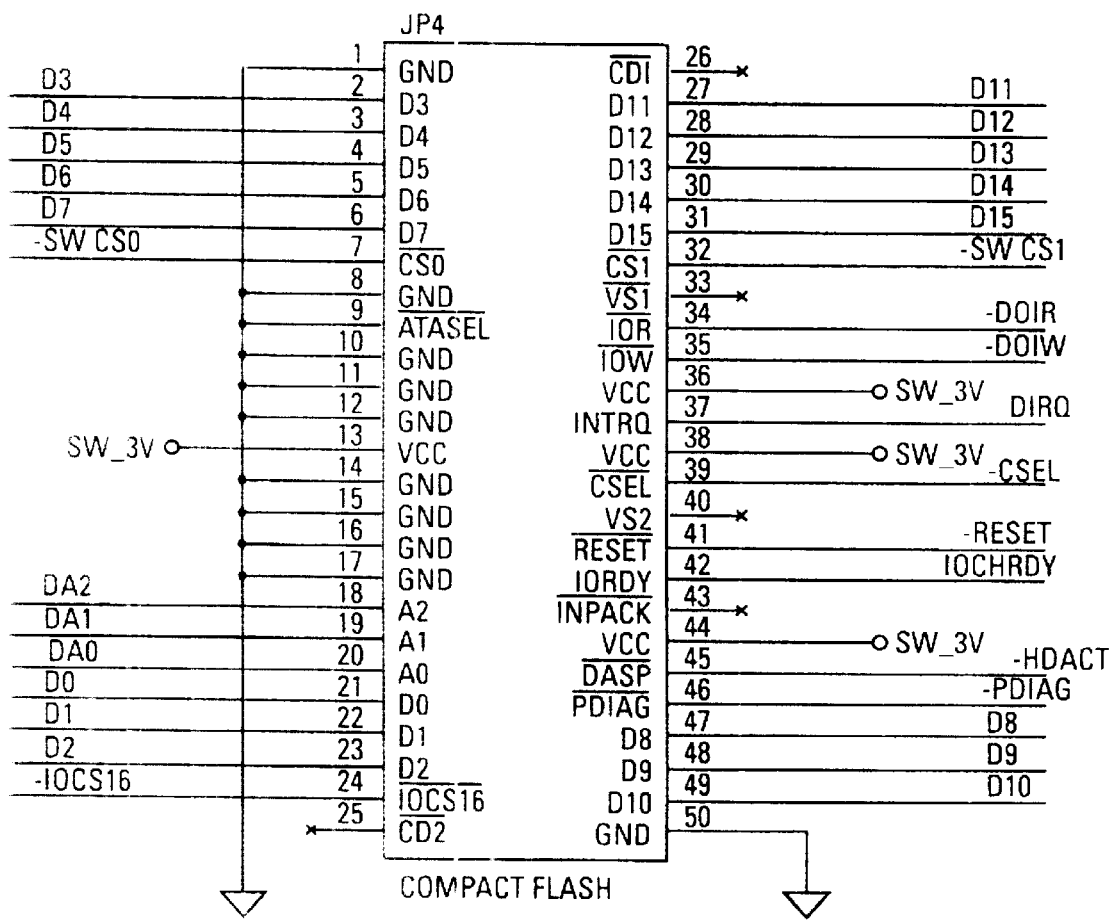
Figure 28D:
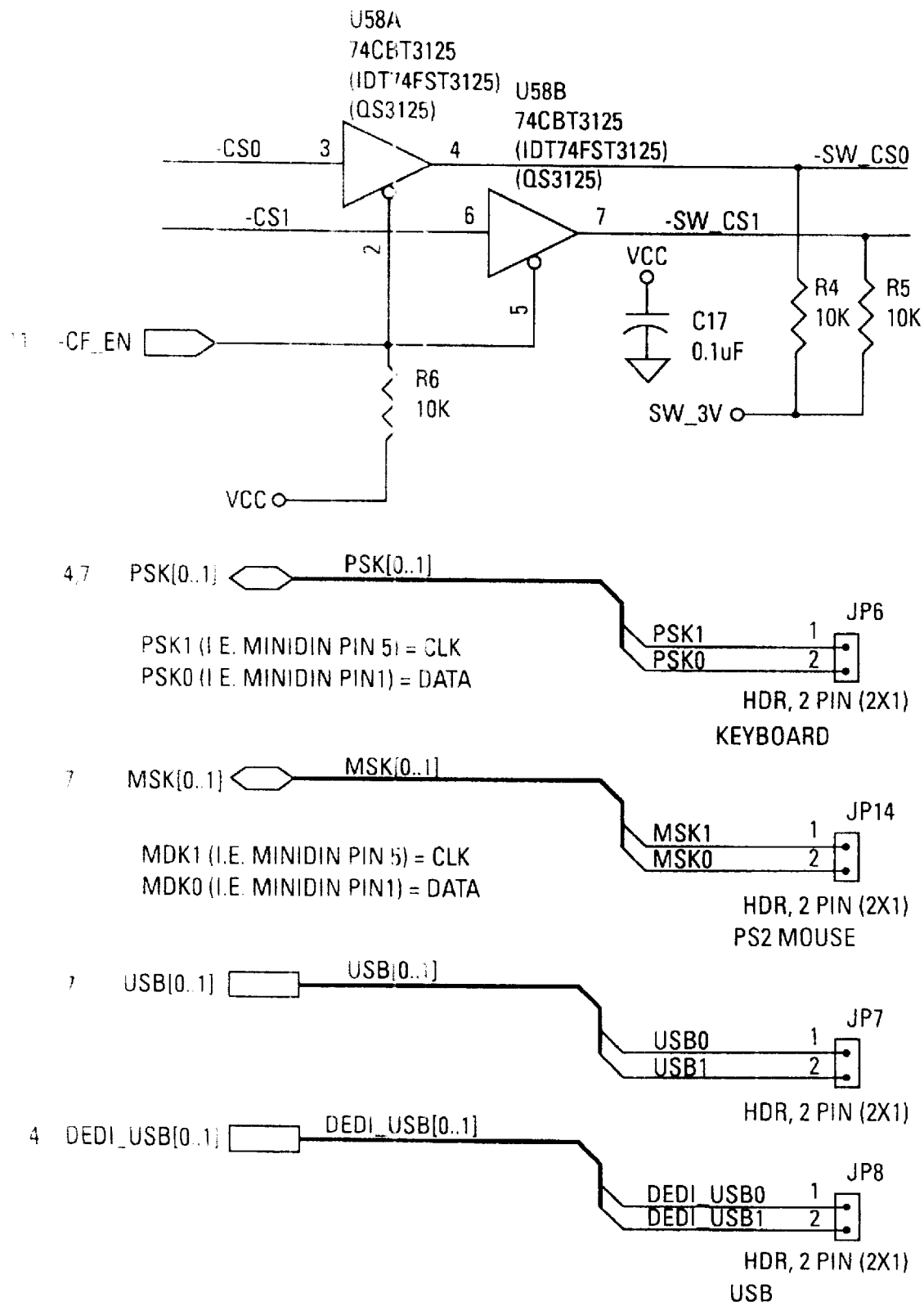
Figure 29A:
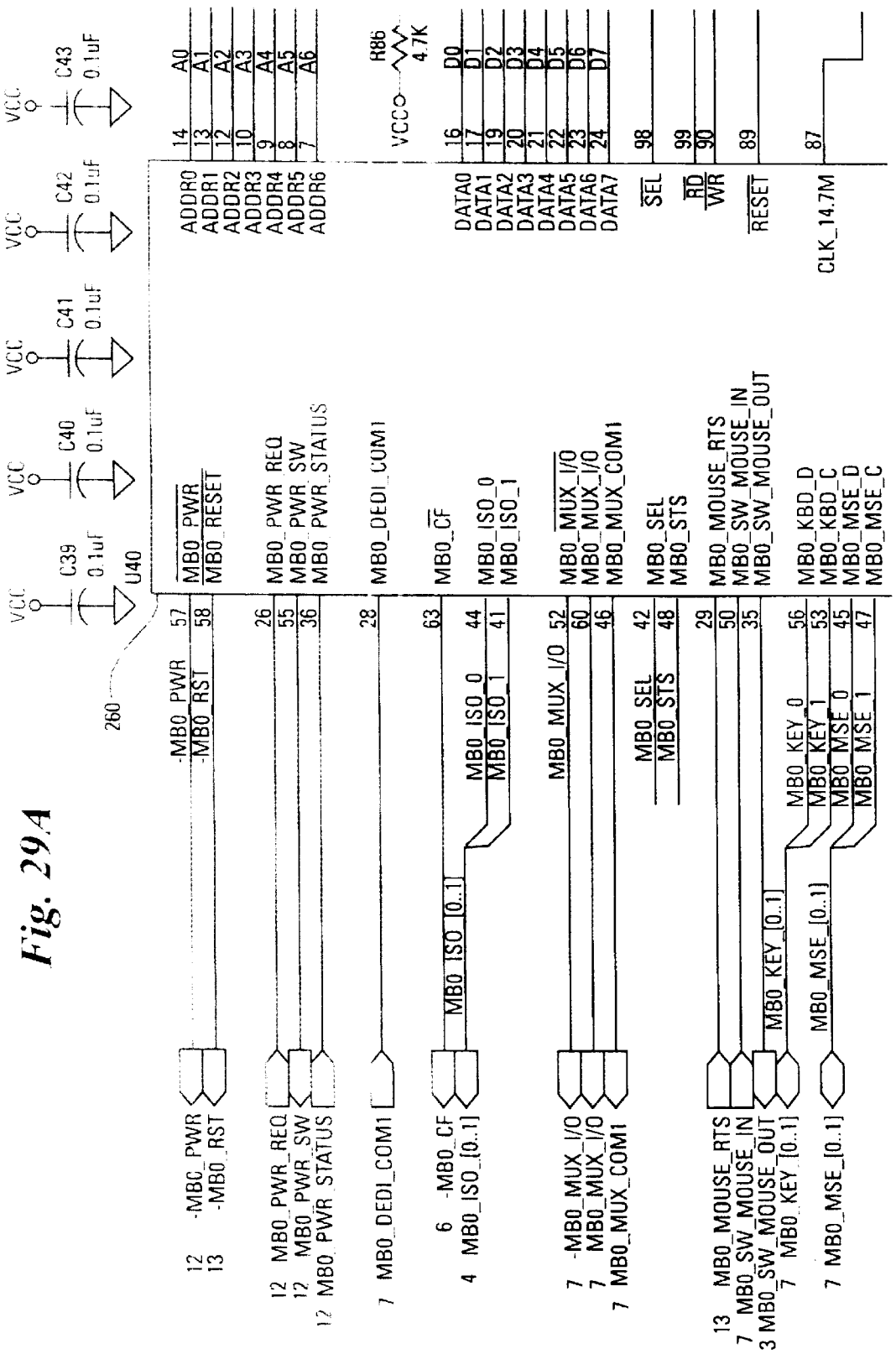
Figure 29B:
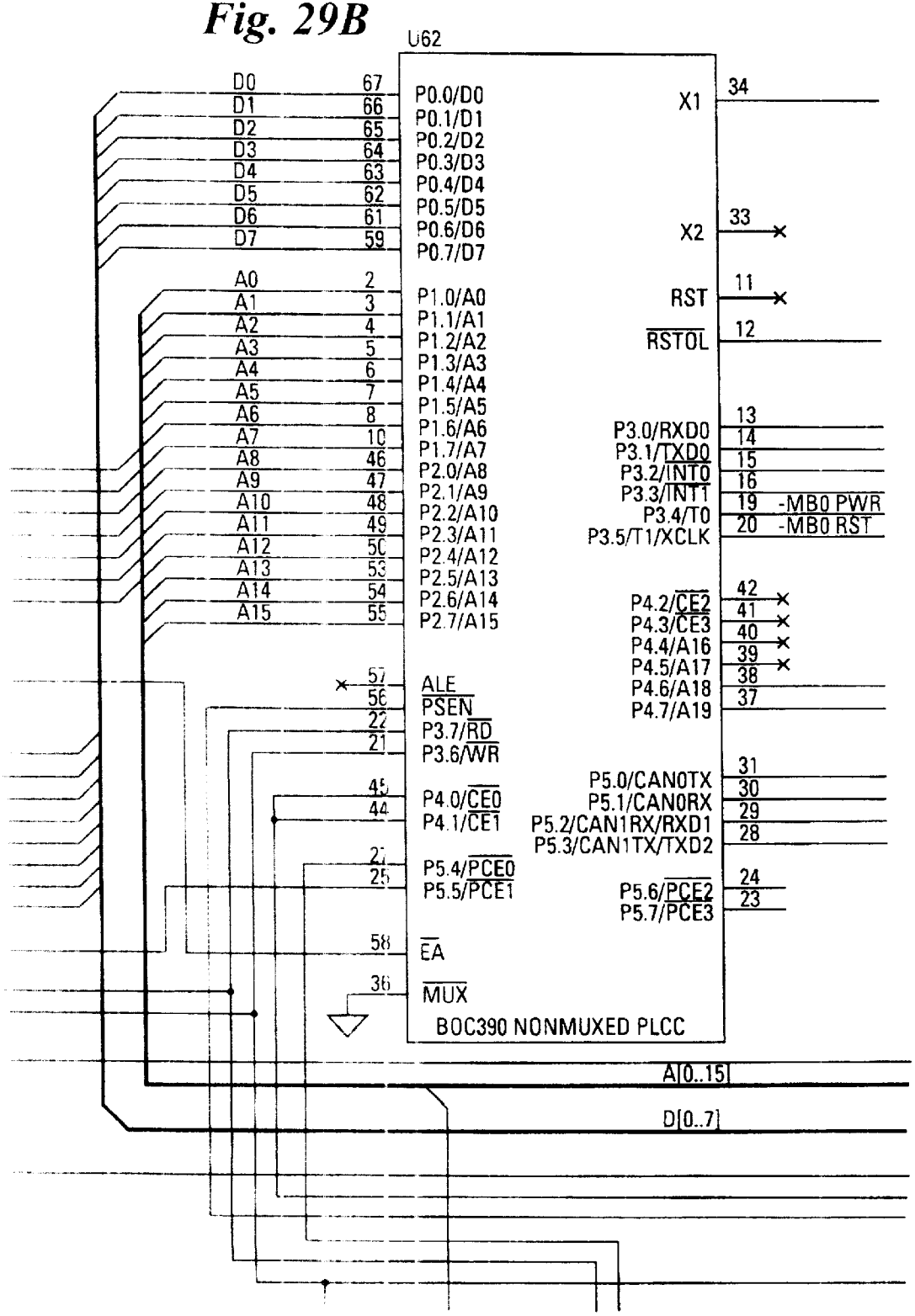
Figure 29C:
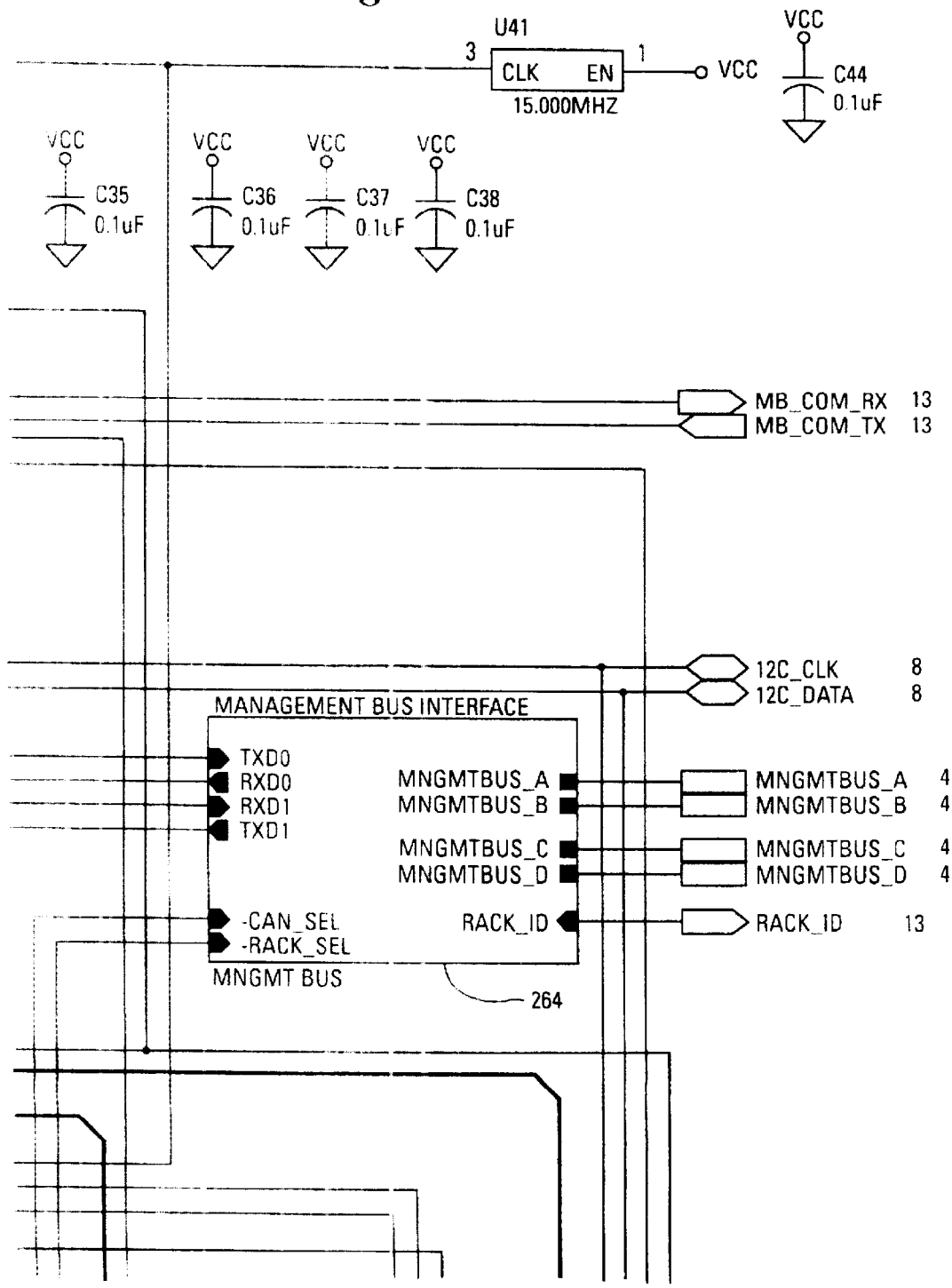
Figure 29D:
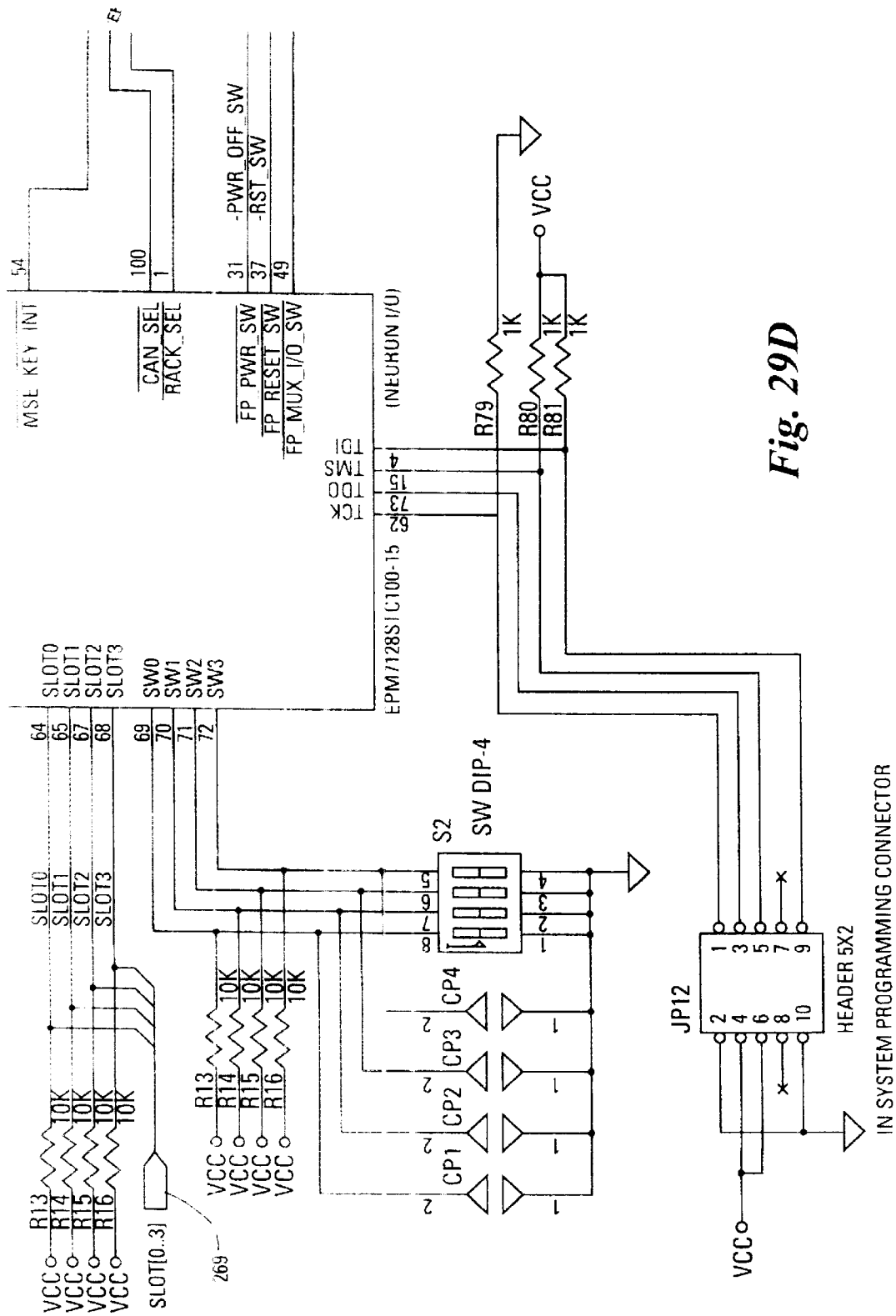
Figure 29F:
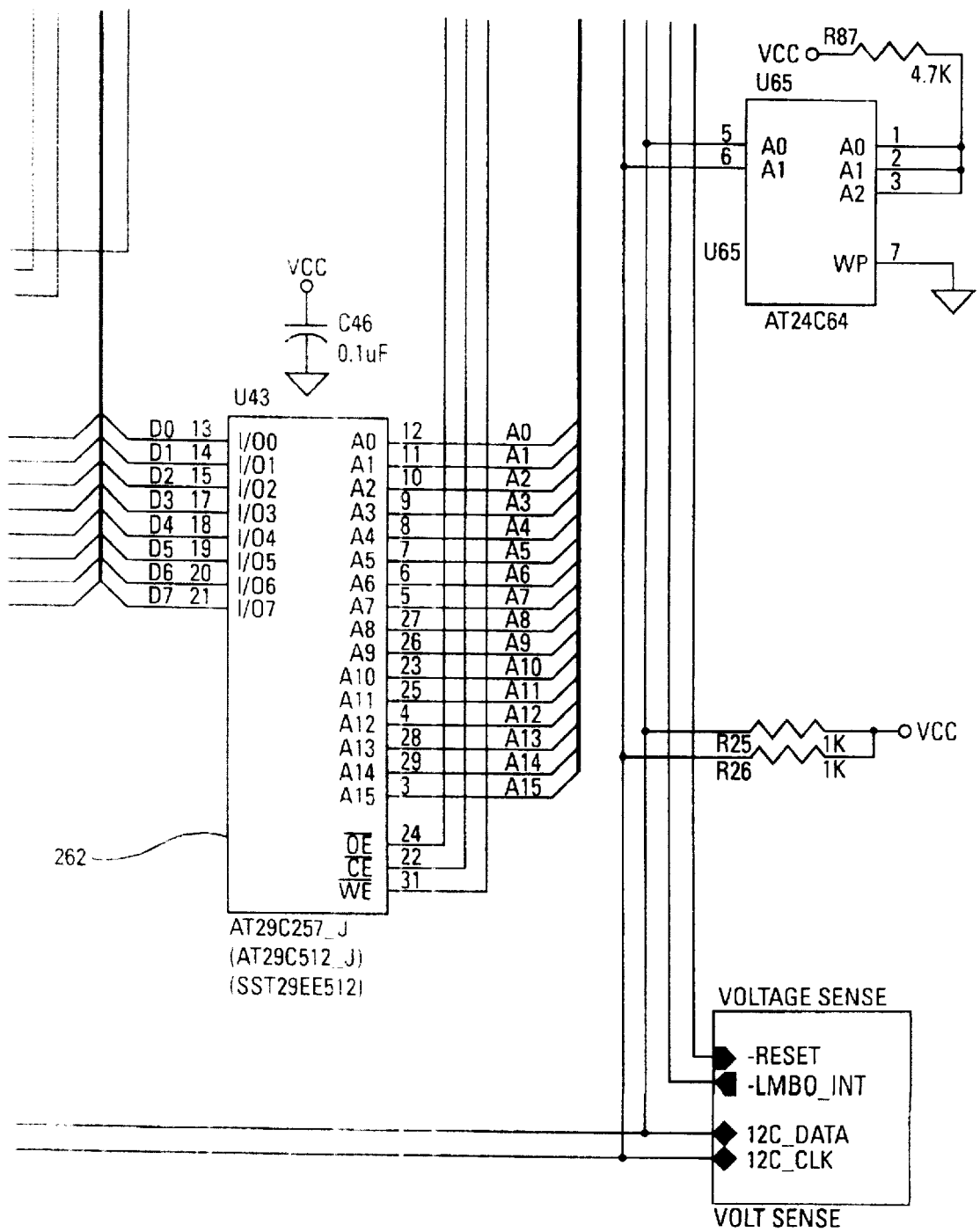
Figure 30A:
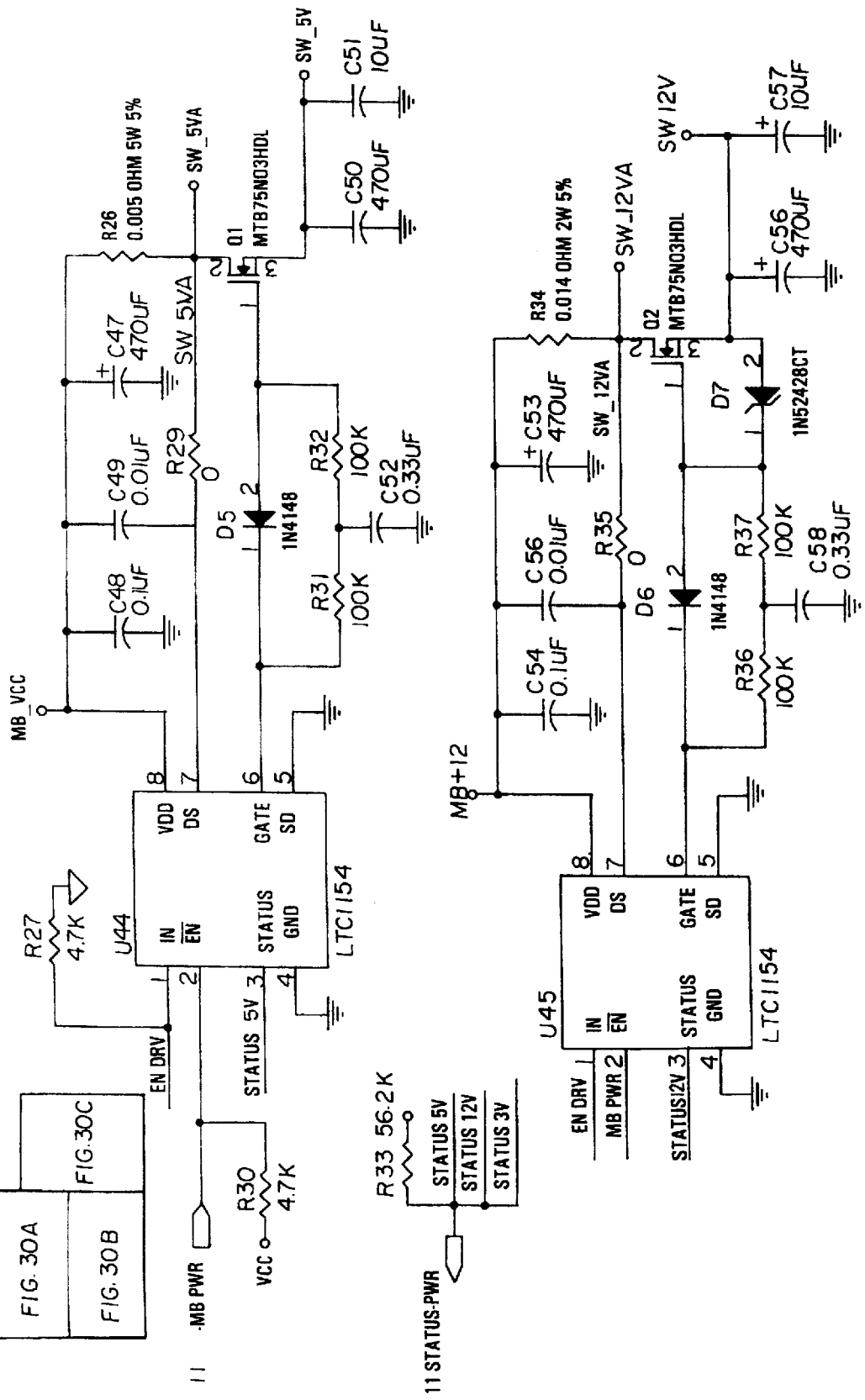
Figure 30:
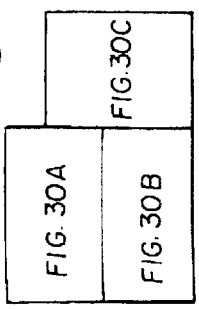
Figure 30B:
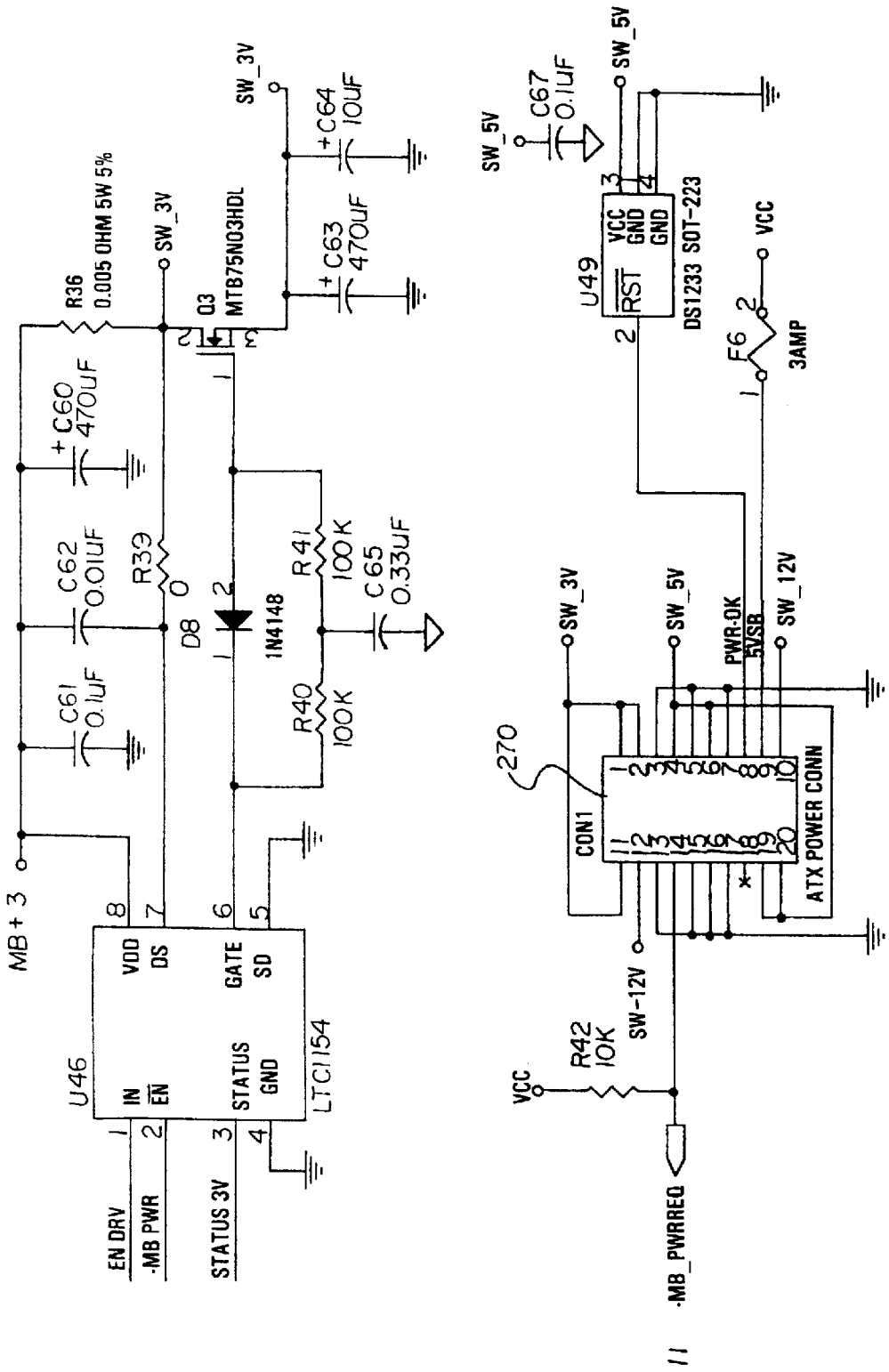

FIG. 29 shows the schematic details of the management processor 260. Flash memory 262 stores the power up sequences and configuration information to be utilized by the management processor 260 in the manner as described more fully in the previously identified co-pending application entitled "Method and System For Providing Dynamic Hosted Service Management Across Disparate Accounts/Sites." The power up sequences, configuration information and other control channel information are communicated to the host management processor over a an out-of-band communication channel referred to as a management bus that is managed by a management bus interface 264 on the host board 210. Voltage sense information is collected by circuitry 266 and routed to the front panel connector 267 for display along with other status information. A switch 268 allows for manual selection of the motherboard 200 and host board 210 for control of the shared peripheral signals. Slot identifier 269 produces a unique signal for each engine blade 132 in a sub-chassis 128. FIG. 30 shows the schematic details of how the power levels are sensed for circuitry 266 and also the details for the ATX power connections 270. It should be understood that the ATX power connections 270 emulate the ATX power up sequence that is normally present for an ATX motherboard 200. Preferably, this power up sequence is stored in the flash memory 262 to allow the power up sequence to be altered in the event of changes in the protocol or standard for the ATX form factor motherboards 200. The design takes advantage of the protocol handshake between each motherboard and its associated ATX power supply, such that the microprocessor on the host board can use the standard ATX power-up sequence of communications to communicate with its associated motherboard, while still allowing industry standard management software, such as LANsite, to communicate with the motherboard as well.

While it would be possible to simultaneously power on all of the engine blades 132 in a given chassis assembly 128, it is preferable to sequence the power up processing so as to minimize the possibility of overloading the power supplies 144. Because the power supplies 144 need to be designed for and selected to handle the surge currents and voltages associated with the power-up sequence, the power-up sequence minimizes the need to overdesign the power supplies 144 for this situation. Preferably, power is simultaneously applied to all of the host boards 210 upon initial power being provided to the engine 100. Each host board 210 then delays a predetermined period of time before initiating the ATX power on sequence to its associated motherboard 200. The time period is preferably established by delaying a fixed time value multiplied by a slot identifier value has generated by the slot identifier 269. The fixed time value is selected to allow the spikes and transients associated with powering on the motherboard 200 to settle out sufficiently before the next motherboard 200 is brought online. Alternatively, each host board 210 can be programmed to wait until it receives a power-up request from the management network 264 or from a manual invocation of the front panel power switch 268 for that engine blades 132 before applying power to the motherboard 200.

Although the preferred embodiment has been described, it will be recognized that numerous changes and variations can be made and that the scope of the present invention is intended to be defined by the claims.

What is claimed is:

1. A scalable Internet engine comprising:
   a cabinet having a front side and a rear side; and
   a plurality of engine blades housed in the cabinet, each engine blade including a motherboard removably positioned in the front side of the cabinet with a planar surface of the motherboard in a generally vertical orientation and having a first connector and a second connector operably positioned along a rear edge of the engine blade;
   a through plane mounted in the cabinet between the front side and the rear side, the through plane including:

a plurality of through plane connectors each adapted for mating with the first connector of one of the plurality of engine blades; and p2 a plurality of apertures each defined in the through plane corresponding to one of the through plane connectors and through which the second connector for the corresponding one of the plurality of engine blades is accessible; and a plurality of interface cards housed in the cabinet, each interface card removably positioned in the rear side of the cabinet with a planar surface of the interface card in a generally vertical orientation and having a interface card connector adapted for mating with at least a portion of the second connector of one of the plurality of engine blades via a corresponding one of the plurality of apertures in the through plane.

2. The engine of claim 1 wherein the first connector includes connections for power and control peripheral signals common to each of the plurality of engine blades on the through plane and the second connector includes connections for I/O signals to the corresponding interface card for that engine blade.

3. The engine of claim 2 further comprising a plurality of hot swappable power supplies removably positioned in the cabinet and operably connected to the connections for power on the through plane.

4. The engine of claim 3 wherein the motherboard is a commercially available ATX motherboard that includes a PCI connector and wherein each engine blade further comprises a host board operably connected to the PCI slot and oriented with a planar surface generally parallel to the planar surface of the motherboard, the host board having the first connector and the second connector on a rear edge of the host board and management circuitry that emulates an ATX power management protocol to supply power to the motherboard.

5. The engine of claim 1 further comprising a passive I/O backplane interposed between the second connector and the interface card on a rear side of the through plane.

6. The engine of claim 1 wherein the motherboard is a commercially available mother board that includes a PCI connector and wherein each engine blade further comprises a host board operably connected to the PCI slot, the host board having the first connector and the second connector on a rear edge of the host board.

7. The engine of claim 1 wherein each motherboard is mounted in a common blade carrier structure that provides a uniform mechanical interface to the cabinet such that the scalable server engine can accommodate different types of motherboards in the same cabinet.

8. The engine of claim 1 further comprising a plurality of fan trays removably mounted below the engine blades in the cabinet to cool the server engine, each fan tray including a plurality of fans therein.

9. The engine of claim 1 comprising at least four engine blades wherein the engine blades are housed in at least one chassis assembly mounted within the cabinet and wherein the engine blades are arranged in a plurality sub-chassis within each chassis assembly, each sub-chassis housing a plurality of engine blades arranged in a row.

10. A scalable computing engine comprising:
a chassis having a front side and a rear side;
a plurality of engine blades housed in the chassis, each engine blade including a motherboard mounted in a common blade carrier structure that provides a uniform mechanical interface to the chassis wherein the blade carrier structure is removably positioned in the front side of the chassis and having connectors operably positioned along a rear edge of the engine blade, the plurality of engine blades including:

a first engine blade has a first type of motherboard with a first type of processor; and
a second engine blade has a second type of motherboard with a second type of processor that is different than the first type of motherboard and first type of processor; and
a plurality of interface cards housed in the chassis, each interface card removably positioned in the rear side of the chassis and having a interface card connector adapted for mating with at least a portion of the connectors of one of the plurality of engine blades,
whereby the scalable computing engine can accommodate different types of motherboards in the same chassis.

11. The engine of claim 10 wherein the engine blades are positioned within the chassis with a planar surface of the motherboards in a generally vertical orientation and wherein the interface cards are positioned within the chassis with a planar surface of the interface cards in a generally vertical orientation.

12. The engine of claim 10 wherein each type of motherboard is a commercially available motherboard that includes a PCI connector and wherein each engine blade further comprises a host board operably connected to the PCI connector and oriented with a planar surface generally parallel to the planar surface of the motherboard, the host board providing the connectors on a rear edge of the host board.

13. A scalable engine system comprising:
a plurality of chassis, each chassis having a front side and a rear side;
a plurality of engine blades housed in each chassis, each engine blade including a motherboard mounted in a common blade carrier structure that provides a uniform mechanical interface to the chassis wherein the blade carrier structure is removably positioned in the front side of the chassis and includes connectors operably positioned along a rear edge of the engine blade;
a plurality of interface cards housed in the chassis, each interface card removably positioned in the rear side of the chassis and having a interface card connector adapted for mating with at least a portion of the connectors of one of the plurality of engine blades;
a midplane mounted in each chassis between the front side and the rear side and including a connector for each of the plurality of engine blades in that chassis adapted for mating with at least a portion of the connectors of that engine blade to provide connections for control peripheral signals common to each of the plurality of engine blades on the midplane; and
at least one signal path connecting the control peripheral signals between each of the plurality of chassis.

14. The server engine system of claim 13 further comprising a control console wherein one of the engine blades in one of the chassis is a management engine blade that manages the control peripheral signals to all of the other engine blades and selective connection of at least a portion of the control peripheral signals to the control console.

15. The server engine system of claim 13 wherein the midplane is a through plane including a plurality of apertures each defined in the through plane corresponding to one of the connectors for one of the plurality of engine blades and through which the portion of the connectors for the one of the plurality of engine blades that mate with the interface card is accessible.

* * * * *

UNITED STATES PATENT AND TRADEMARK OFFICE
CERTIFICATE OF CORRECTION

PATENT NO. : 6,452,809 B1
DATED : September 17, 2002
INVENTOR(S) : Russell A. Jackson, Steve S. Chen and Philip S. Smith It is certified that error appears in the above-identified patent and that said Letters Patent is hereby corrected as shown below:

<u>Title page,</u>
Item [73], Assignee should be -- Galactic Computing Corporation, BV --.
Item [57], ABSTRACT, please insert a comma -- , -- following the word "networks".

Figure 26B:
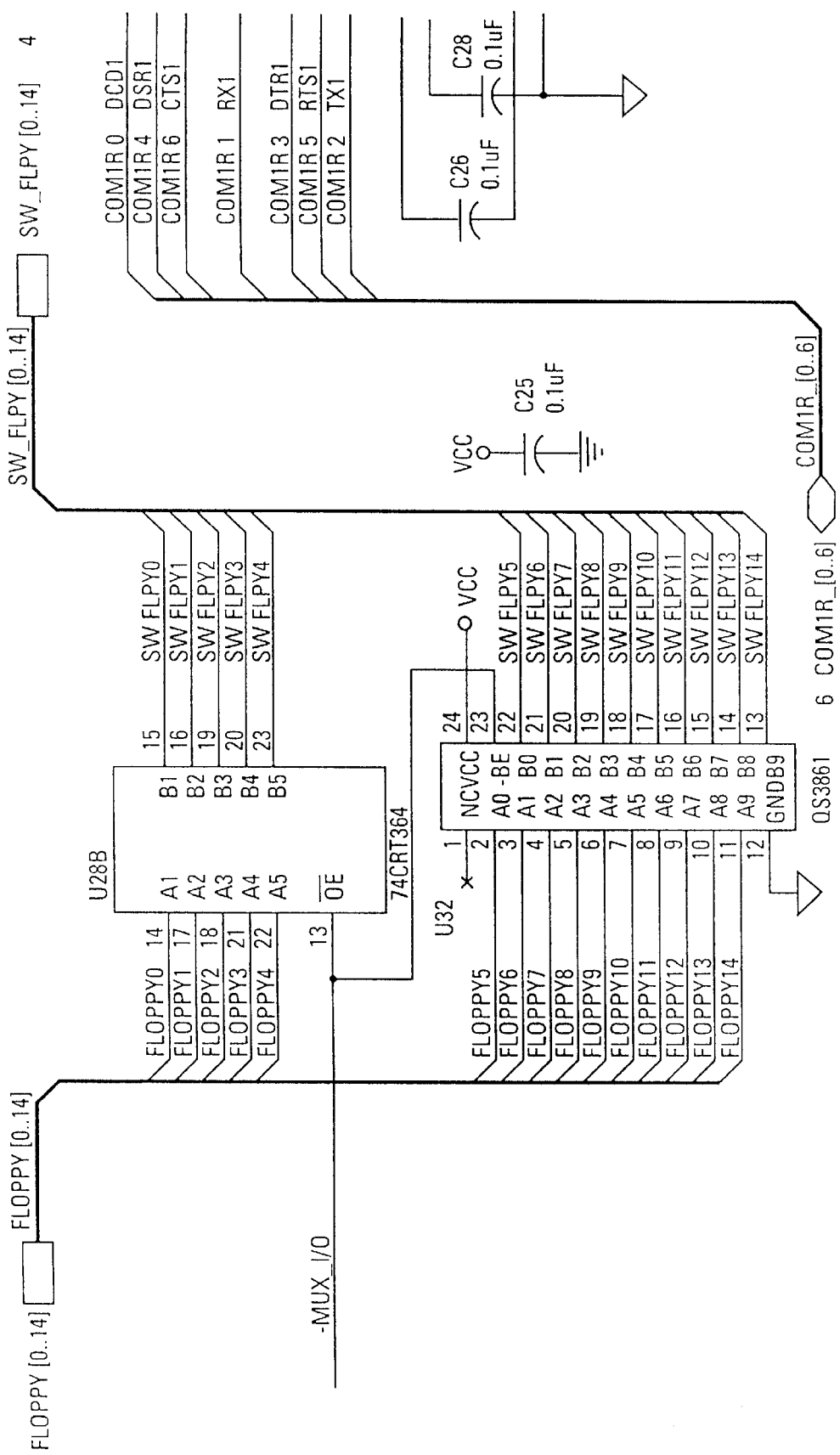
Figure 26C:
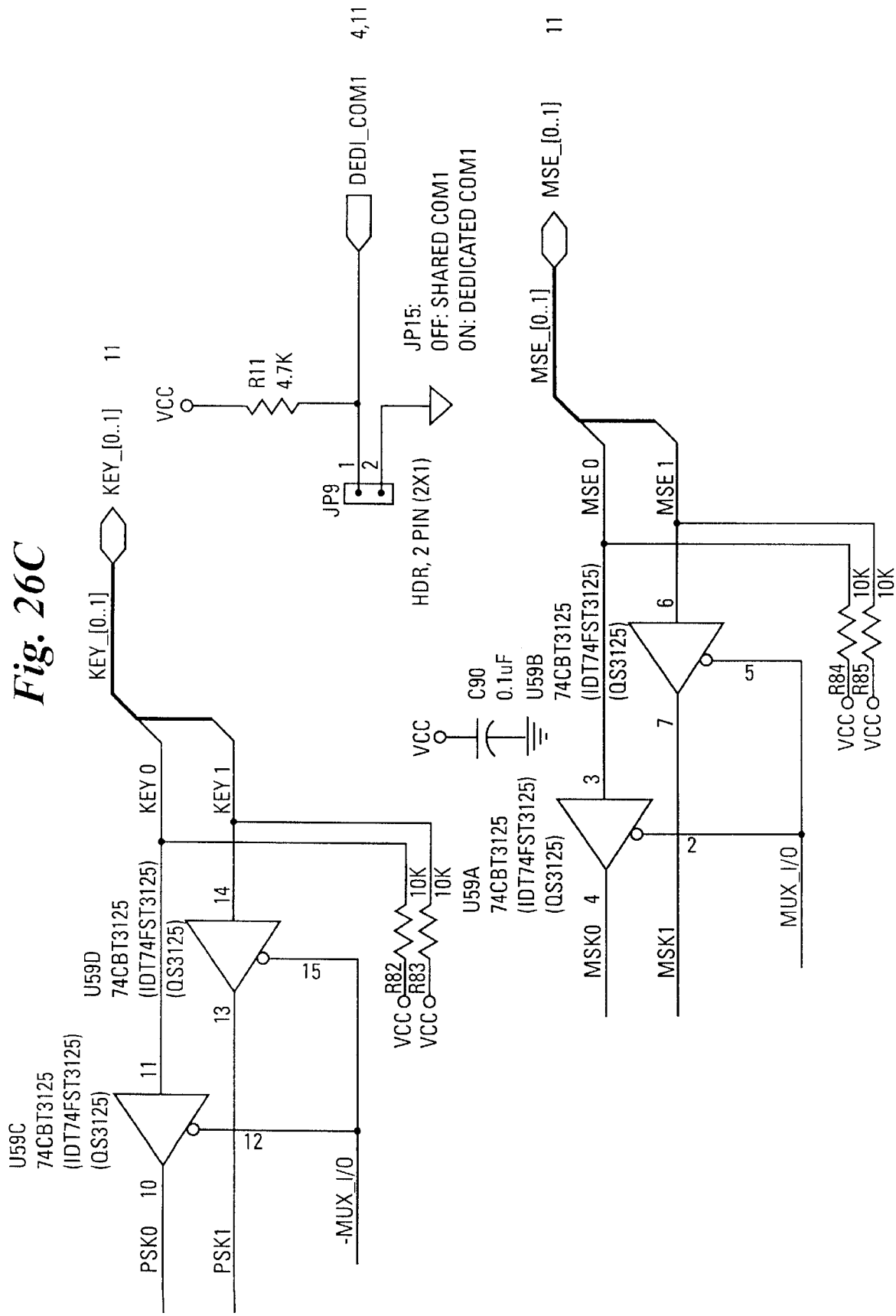
Figure 26D:
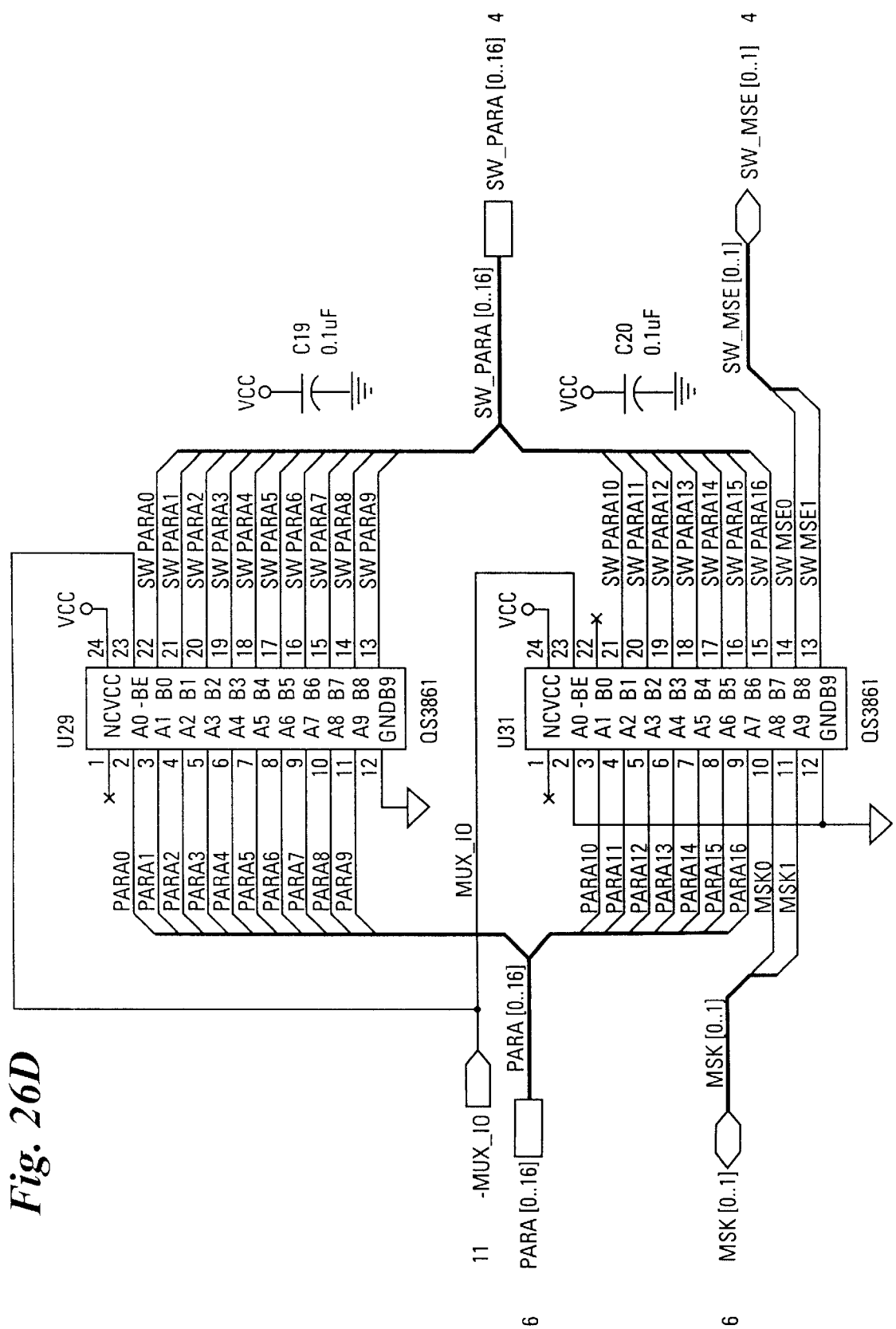
Figure 26E:
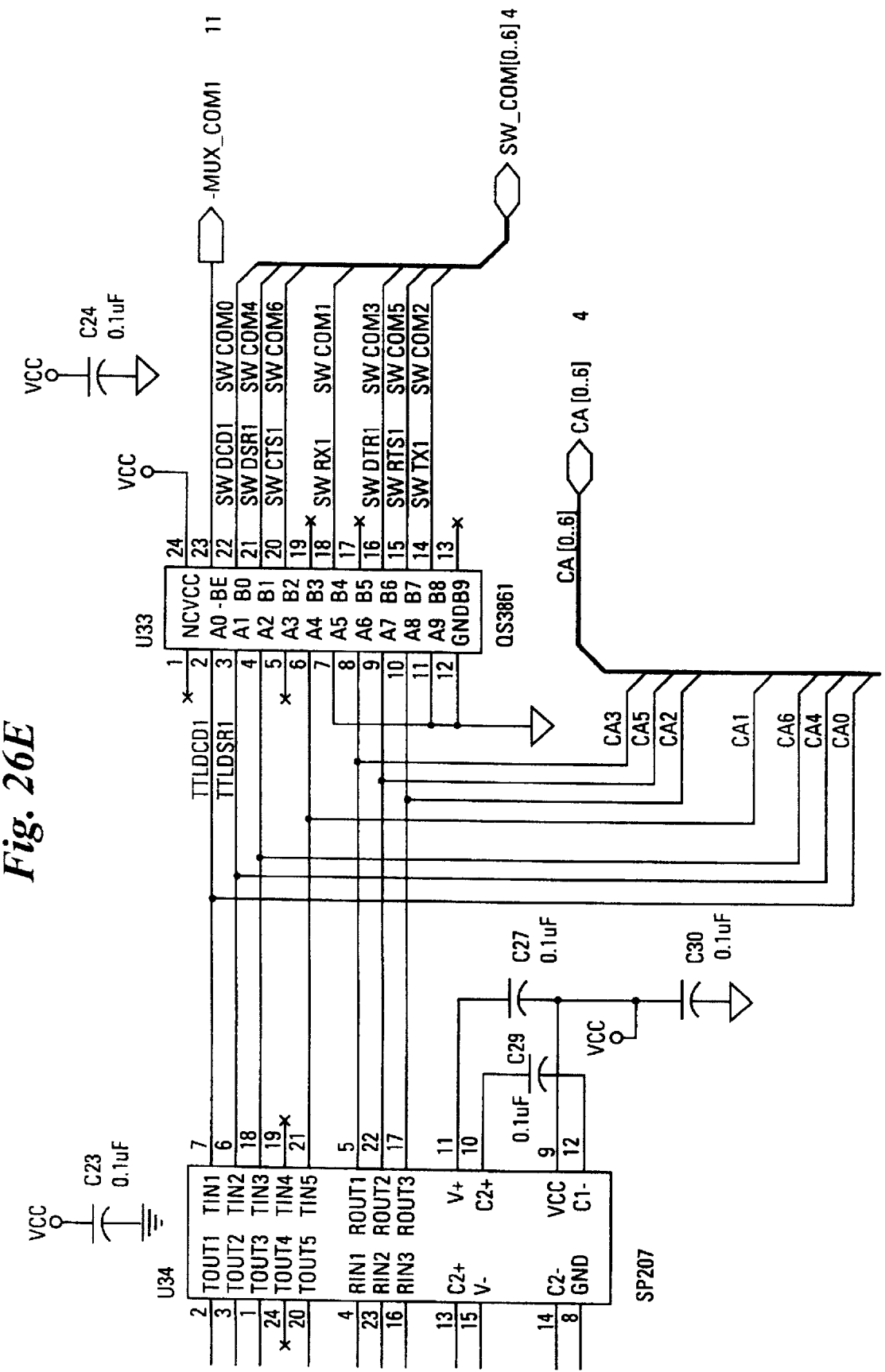
Figure 27C:
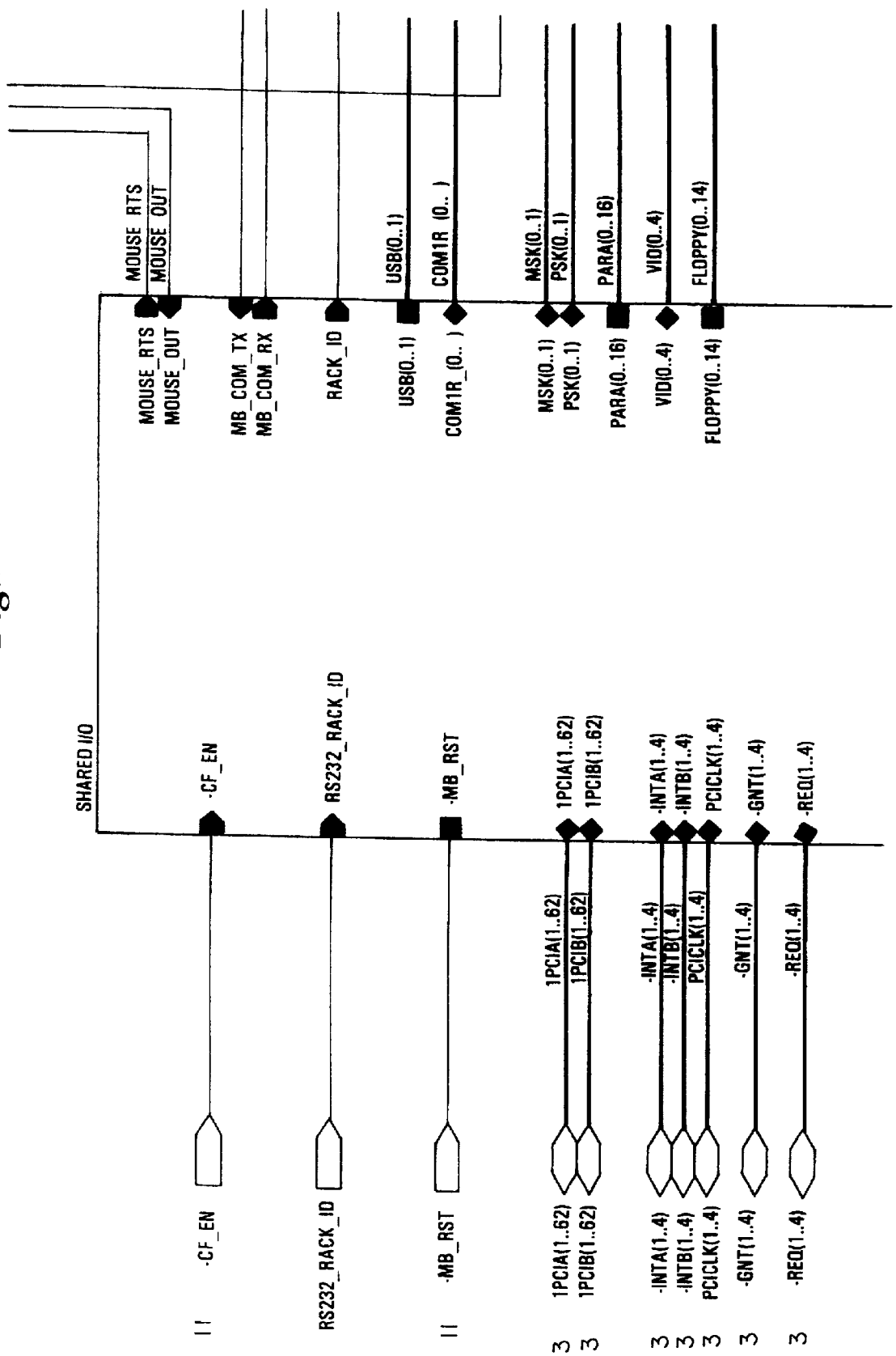
Figure 27D:
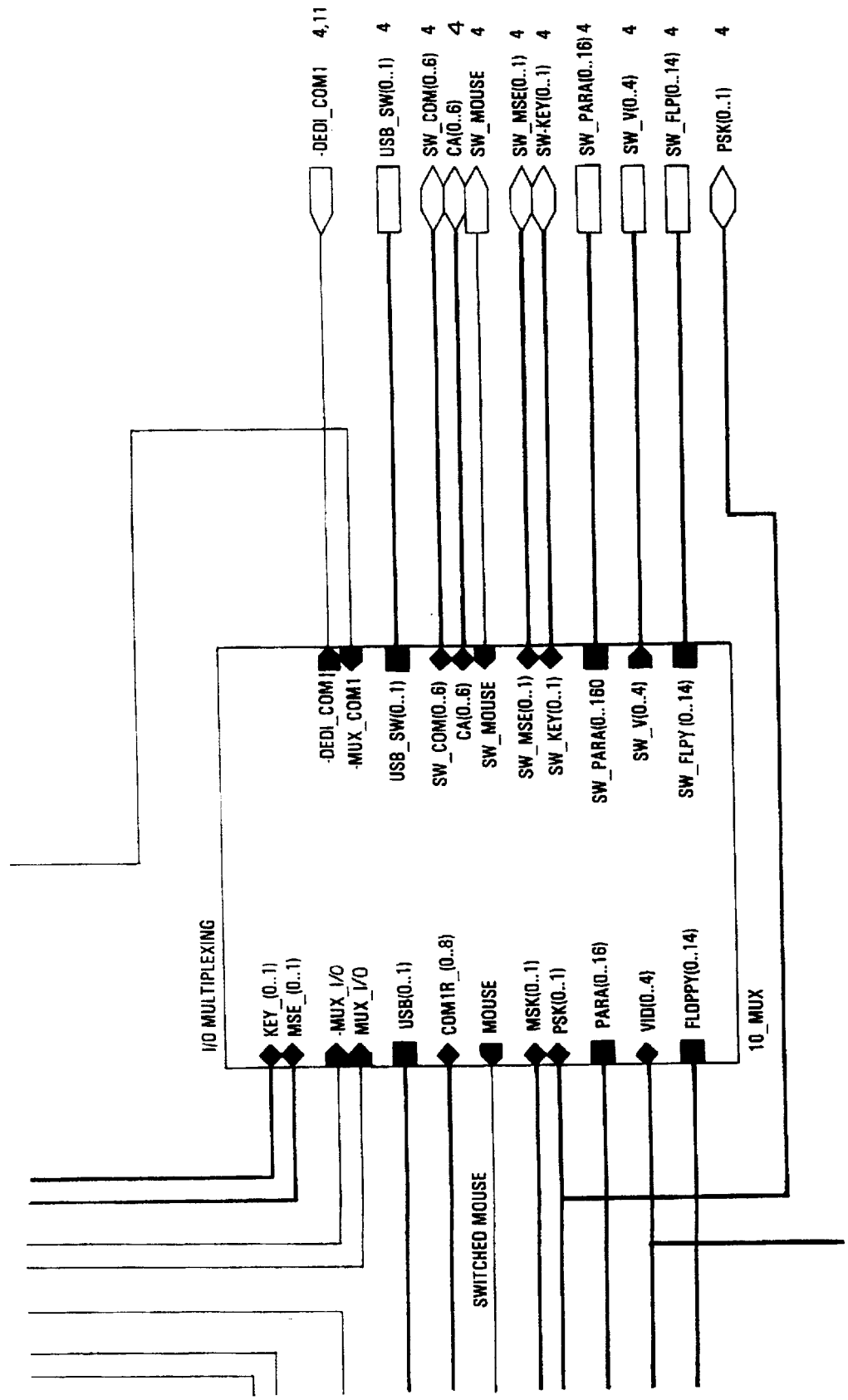
Figure 27E:
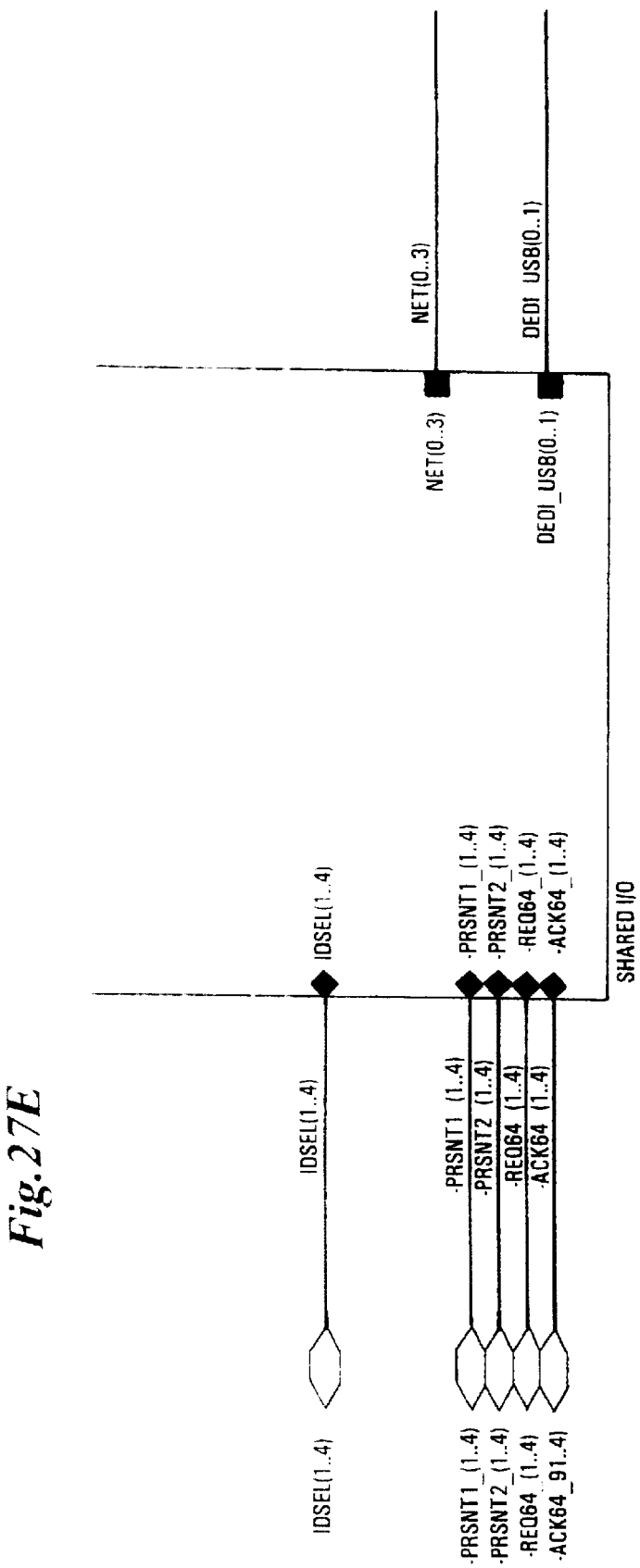
Figure 27F:
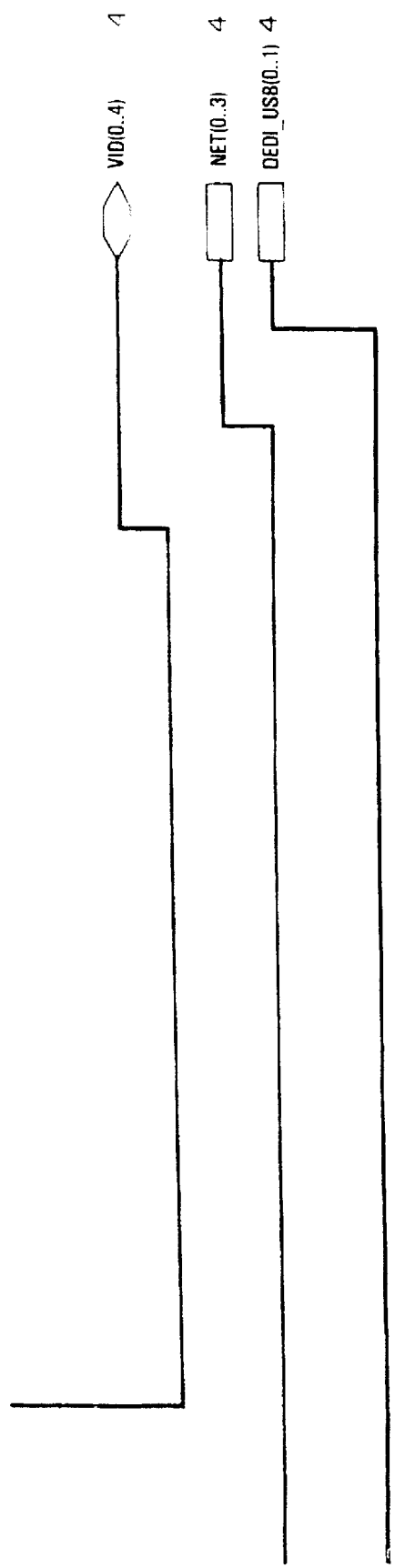

<u>Drawings,</u>
Fig. 26B appears twice in the patent.
Fig. 30C is not marked as such on the patent.
Fig. 31 was not included in the patent (please see attached).

<u>Column 3,</u>
Line 49, "har" should be -- had --.
Line 51, "chasses" should be -- chassis --.

<u>Column 5,</u>
Line 4, please insert a comma -- , -- following the word "networks".

<u>Column 6,</u>
Line 57, "comer" should be -- corner --.

<u>Column 8,</u>
Line 62, "1 U" should be -- 1U --.

<u>Column 9,</u>
Line 32, please insert a period -- . -- following the word "circle".

<u>Column 10,</u>
Line 56, insert -- of -- between "types" and "engines".

UNITED STATES PATENT AND TRADEMARK OFFICE
CERTIFICATE OF CORRECTION

PATENT NO. : 6,452,809 B1
DATED : September 17, 2002
INVENTOR(S) : Russell A. Jackson, Steve S. Chen and Philip S. Smith It is certified that error appears in the above-identified patent and that said Letters Patent is hereby corrected as shown below:

Column 13,
Lines 2 and 50, "mother board" should be -- motherboard --.
Line 27, the word "a" should be -- is --.
Line 31, "construction" should be -- construct --.

Column 14,
Line 2, please delete the word "a".
Line 43, "has" should be -- as --.
Line 50, "blades" should be -- blade --.

Column 15,
Line 3, "p2" should be deleted and a new paragraph should begin at "a plurality of …".
Line 11, the word "a" should be -- an --.
Line 39, "mother board" should be -- motherboard --.

Column 16,
Line 9, the word "a" should be -- an --.
Line 41, the word "a" should be -- an -- to read -- an interface … --.

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,452,809 B1
DATED          : September 17, 2002
INVENTOR(S)    : Russell A. Jackson, Steve S. Chen and Philip S. Smith It is certified that error appears in the above-identified patent and that said Letters Patent is hereby corrected as shown below:

<u>Title page,</u>
Item [73], Assignee, should be -- Galactic Computing Corporation, BVI/IBC --.

Signed and Sealed this

Sixth Day of January, 2004

JAMES E. ROGAN
*Director of the United States Patent and Trademark Office*